(12) United States Patent
Kosaka et al.

(10) Patent No.: US 6,400,475 B1
(45) Date of Patent: Jun. 4, 2002

(54) OPTICAL TRANSMISSION SYSTEM AND OPTICAL COMMUNICATIONS DEVICE

(75) Inventors: Junya Kosaka; Takayuki Suzuki, both of Yokohama (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/191,051

(22) Filed: Nov. 12, 1998

(30) Foreign Application Priority Data

Nov. 14, 1997 (JP) .............................................. 9-313492

(51) Int. Cl.[7] .............................................. H04B 10/08
(52) U.S. Cl. ...................... 359/110; 359/177; 359/187; 359/161; 359/341; 359/337
(58) Field of Search ................................ 359/110, 177, 359/187, 161, 341, 337

(56) References Cited

U.S. PATENT DOCUMENTS

| | | | | |
|---|---|---|---|---|
| 5,225,922 A | * | 7/1993 | Chraplyvy et al. | 359/124 |
| 5,500,756 A | * | 3/1996 | Tsushima et al. | 359/174 |
| 5,502,810 A | * | 3/1996 | Watanabe | 359/177 |
| 5,535,037 A | * | 7/1996 | Yoneyama | 359/177 |
| 5,644,423 A | * | 7/1997 | Iwano | 359/337 |
| 5,675,432 A | * | 10/1997 | Kosaka | 359/341 |
| 5,790,289 A | * | 8/1998 | Taga et al. | 359/124 |
| 5,859,725 A | * | 1/1999 | Sugiya et al. | 359/341 |
| 5,870,217 A | * | 2/1999 | Itoue et al. | 359/179 |
| 5,907,420 A | * | 5/1999 | Chraplyvy et al. | 359/179 |

OTHER PUBLICATIONS

The Institute of Electronics, Information and Communication Engineers, Technical Report of IEICE, OCS94–72, OPE94–95.

* cited by examiner

Primary Examiner—Leslie Pascal
Assistant Examiner—Hanh Phan
(74) Attorney, Agent, or Firm—Kenyon & Kenyon

(57) ABSTRACT

An optical transmission unit is comprised of an optical power control unit to adjust the optical power, an optical detection unit to detect the power of the optical signal from a transmission medium, an optical control-information generating unit to generate information relating to the size of the detected optical power monitor value, an optical control-information introduction unit to input the generated information into the transmission medium as optical control information, an optical control-information input detection unit to detect optical control information from the transmission medium, and a control unit to regulate the detected information so the optical power from the optical power adjustment device is within a specified value.

6 Claims, 34 Drawing Sheets

OPTICAL TRANSMISSION SYSTEM AND OPTICAL COMMUNICATIONS DEVICE

BACKGROUND OF THE INVENTION

Field of the Invention

This invention relates to an optical communications system comprising an end terminal unit, a plurality of optical communications devices such as an optical amplifier units, and an optical transmission media such as optical fibers connected to the optical communications devices used in an optical communications system and long-distance optical transmission system.

Along with demands for optical communications systems of low cost, optical transmission frequency multiplexing systems are being studied for transmission of two or more multiplexed optical signals of different wavelengths on one optical fiber. The optical amplifier is well suited for use as an amplifier in multiplexed optical transmissions on account of the capability to amplify signal with low noise and having a wide available bandwidth for amplification.

In the rare-earth doped optical fibers and semiconductor amplifier comprising the optical amplifier, the gain is dependent on wavelength so that after amplification, a deviation appears in the optical output or gain between each wavelength. The deviation between wavelengths in particular, is summed in the multiple stages of the optical amplifier, so that a large deviation in optical power occurs after transmission. As a result, after transmission, the wavelength signal of the lowest power from among the multiplexed wavelengths must be considered as the receive power lower limit value. In other words, the maximum distance of a relayed transmission is limited by the wavelength signal having the lowest power.

Accordingly, when inputting multiplex signal into end terminal units or optical relay amplifier units, it is important that an optical transmission system be provided having no gain deviation due to the wavelength so that the maximum relay transmission distance can be expanded.

Technology relating to the above is known as the "Society of Electronic Information Communication Signal Transmission Technique" OCS94-72, OPE94-95 (1994-11) in "10 Gbit/s, 4 ch. 200 km, 16 ch. 150 km, 1.3 um zero dispersion fiber relay transmission test" in the method shown in FIG. 1. In the figure, the reference numeral 82 denotes a distributed feedback laser diode (DFB-LD) used as the light source. The polarization of the light from each DFB-LD is fixed by a polarization controller 83.

The deviation in frequency gain on the receive side can be compensated by setting the optical power of this DFB-LD. In other words, in order to simplify pre-emphasis, the four light sources on both sides (ch.1 through ch.4, and ch.13 through ch.16) are merged by means of a 4×1 coupler 84, and the eight light sources in the center (ch.5 through ch.12) are merged by using an 8×1 coupler 85 having greater loss. The signals from these 16 diodes merged using a 3×1 coupler 86 and then strongly modulated for 10 Gbit/s NRZ ($2^{23}-1$) by means of an LN(LiNbO$_3$) modulator 87. The optical signal is amplified to +21 dBM (total optical output) by a high output optical post amplifier 88 utilizing four 1.48 um laser diodes and the result input to a single mode fiber 89.

After amplification with a 0.98 um common optical pre-amp 90 on the receive side, batch dispersion compensation of the 16 signals is performed by means of a dispersion compensation fiber (DCF) 91. After splitting the signals with a 1×16 splitter 92, the output is passed through a 0.8 nm and 0.3 nm interference filter 93 of three decibels in width to eliminate ASE noise and frequency selection then performed. The optical amplifier 95 is inserted between two types of optical filter for the purpose of compensating the gain tilt in the optical amplifier 90 and maintaining the input power to the O/E converter 94 at a constant level.

FIG. 2 shows an optical spectrum of the 16 WDM signal obtained with the system configuration of FIG. 1. FIG. 2(a) is the optical spectrum prior to input to the postamplifier 88, on which the approximately 10 dB difference in maximum levels is due to the application of pre-emphasis. In FIG. 2(b), the optical spectrum after passing the signal through DCF91 is shown. A 13 dB difference in level occurs due to the gain tilt in the optical amplifier 90. However, due to the effect of pre-emphasis, the ratio of signal to ASE noise is nearly the same value for each channel.

As related above, the optical loss at each wavelength during transmission varies due to the difference in fiber loss over the relay space and the difference in optical power between adjacent wavelengths, etc. In fact, the fiber loss over the relay space and the space within the fiber is not always a fixed amount during actual use so that the estimating the total optical signal power after transmission, and the deviation between wavelengths and optical power of each wavelength is difficult. The total optical signal power, and the deviation between wavelengths and optical power of each wavelength fluctuate due to temperature variations and deterioration over time. Further, non-uniformities in the equipment comprising the different optical systems will cause differences in test equipment reading to occur when measuring total optical signal power, deviation between wavelengths and optical power of each wavelength and the system transmission functions may easily be lost due to changes in transmission conditions of the optical transmission system.

SUMMARY OF THE INVENTION

In order to achieve a practical optical transmission system, an optical transmission system is required in which the optical output or the gain, or both are easily controllable and not dependent on total signal optical power, or deviation between wavelengths and optical power of each wavelength after transmission.

In view of the above problems, it is therefore an object of this invention to provide an optical transmission system of high reliability that is both practical and operates stably as a frequency multiplexing optical transmission system by providing an automatically controlled optical communications device whose total pre-established optical signal power, deviation between wavelengths and optical power at each wavelength can be controlled as needed after transmission.

In order to resolve the above mentioned problems, one basic feature of this invention in an optical transmission system configured to connect optical communications devices by means of an optical transmission medium, wherein the optical transmission system is comprised of: a device to detect the status of the optical signal within the optical transmission system, a device to allot the optical control information equivalent to the detected status, a detection device to detect the allotted optical control information, and a device to control the optical signal according to the detected optical control information.

Also, in order to resolve the above mentioned problems, this invention is also characterized by an optical communications device such as an optical amplifier relay unit, that is, an optical line amplifier unit, or an end terminal unit connected to an optical transmission medium, wherein the optical transmission system is comprised of: an optical power adjustment device for adjusting the optical power, a transmission medium for transmitting the adjusted optical signal, an optical input detection unit for detecting the power of the optical signal from the transmission medium, an optical control-information generating unit for generating information involving the size of the detected optical power monitor value, an optical control-information input introduction unit for introducing the generated information to the transmission medium as optical control information, an optical control-information input detection unit for detecting optical control information from the transmission medium, and a control unit for controlling the adjusted optical power of the optical power control unit within a specified value by means of the detected information.

DETAILED DESCRIPTION OF THE PREFERRED EMBODIMENTS

The preferred embodiments of the invention for resolving the above problems will next be described in detail while referring to the accompanying drawings.

Figure 1:
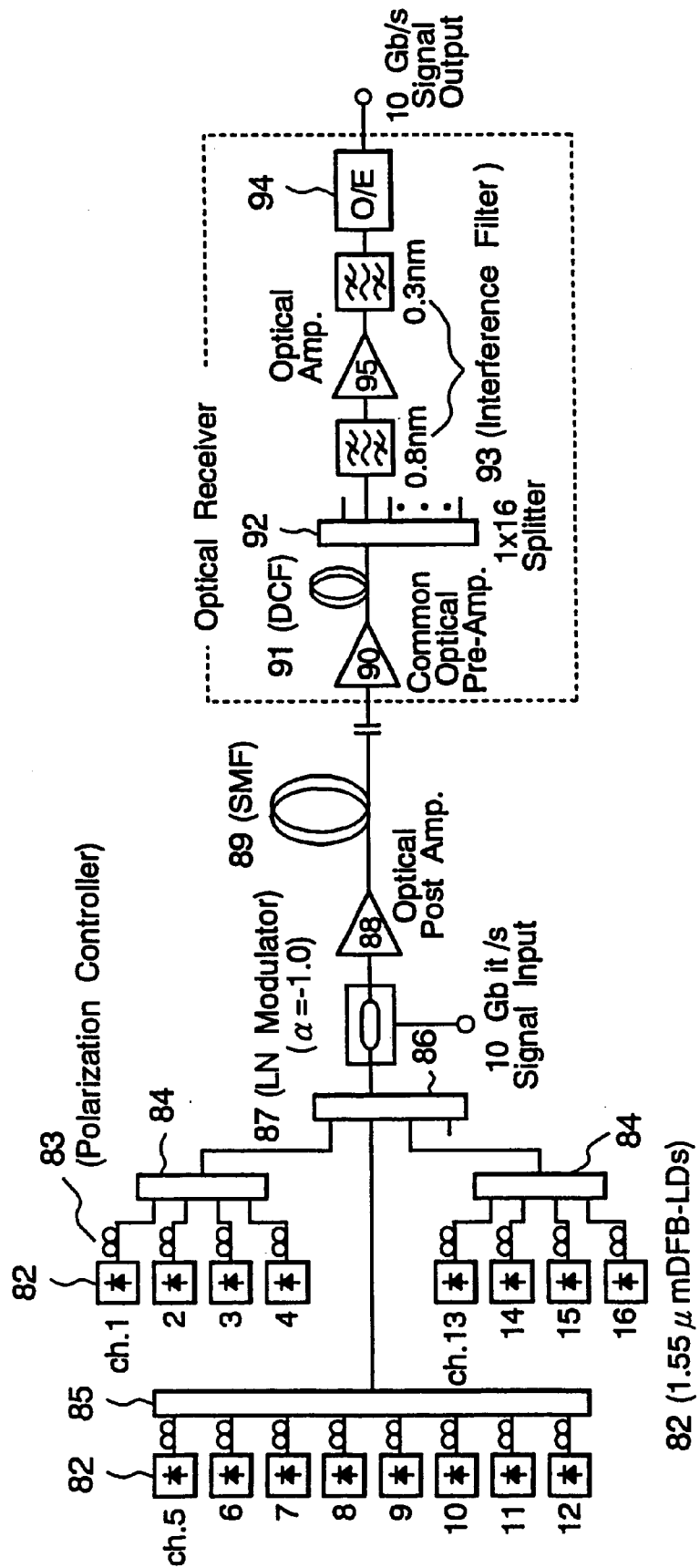
FIG. 1 is a structural block diagram of the wavelength multiplexed transmission system of the related art.
Figure 2A:
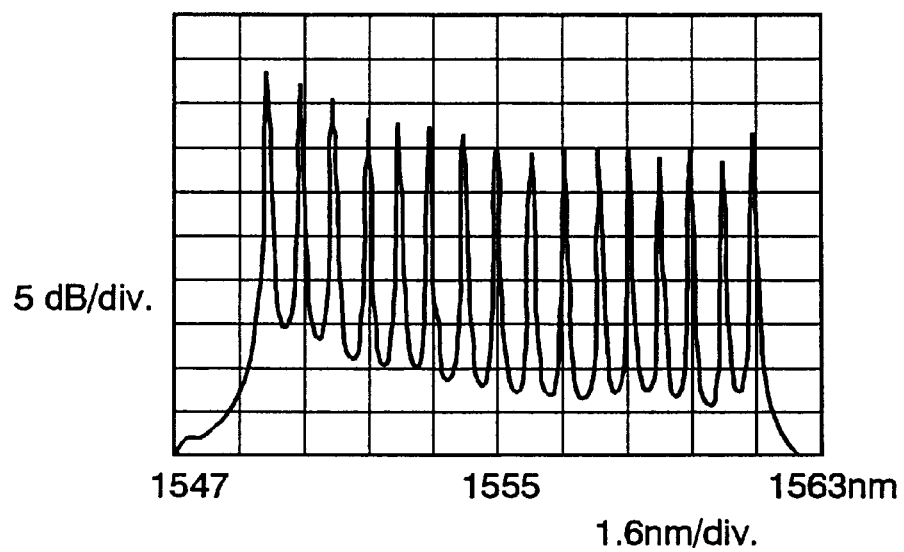
FIG. 2 is drawings showing the light spectrum of the wavelength multiplexed transmission system of the related art.
Figure 2B:
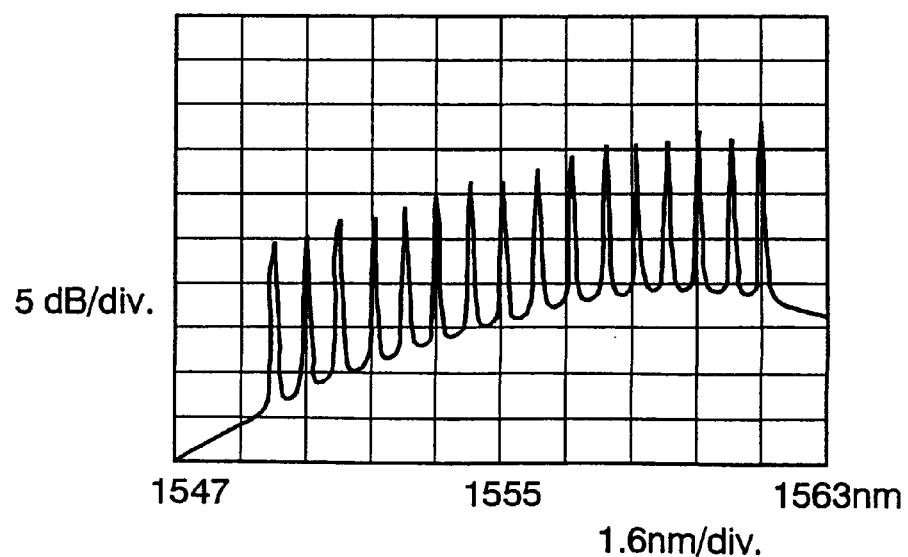
Figure 3:
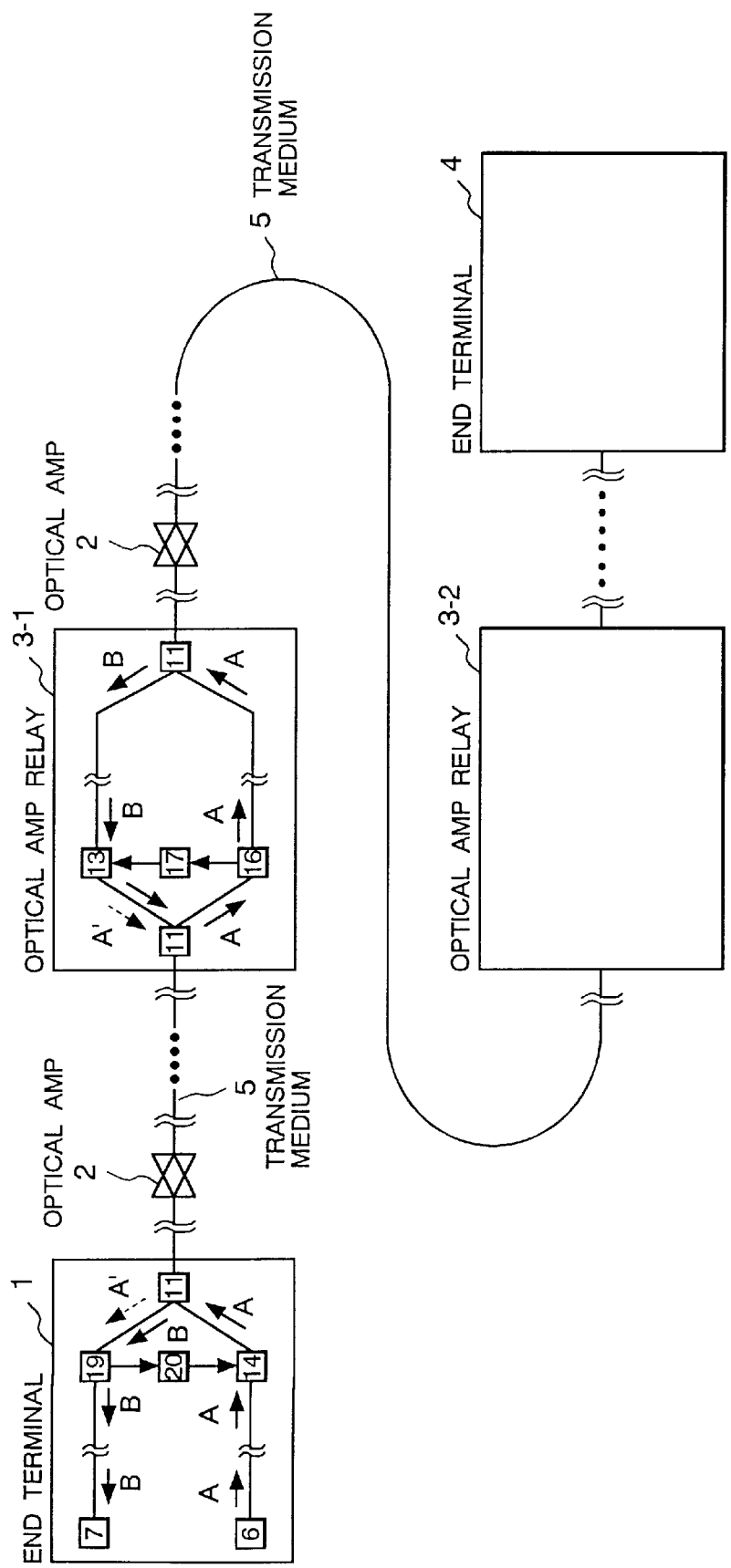
FIG. 3 is a basic functional block diagram of the bidirectional transmission system of this invention.

A functional block diagram of the bidirectional (two-way) optical transmission system of this invention is shown in FIG. 3. In this figure, an end terminal unit 1, an optical amplifier unit 2, an optical amplifier relay unit 3 and an end terminal unit 4 are connected by way of a transmission medium 5. The optical signal is transmitted bidirectionally between the end terminal unit 1 and end terminal unit 4 (A direction and B direction).

A more detailed explanation of the end terminal unit and the optical amplifier relay unit reveals that the A transmission direction comprises three functions which are described next.

First is a signal input (introduction) function input to the transmission medium 5 in which the end terminal unit 1 and optical amplifier relay unit 3, input the optical signal A from the optical power adjustment unit 14 to the transmission medium 5 by means of the optical splitter unit (optical splitter called hereinafter) as seen from the end terminal unit 1 positioned at one end.

Second is an optical control information introduction function in which the optical power of the optical signal A is detected (monitored) by means of the optical input detection unit 16 as seen from the optical amplifier relay unit 3 positioned at one end, and information then generated relating to the sized of the monitor value by means of the optical control-information generating unit 17 and input to the transmission medium 5 by way of the optical wavelength division multiplexer (optical coupler called hereinafter) 11 from the optical control-information introduction unit 13 as optical control information A'.

Third is a function for automatic control of power by optical control information A' input to the transmission medium 5 from a mating device as seen from the end terminal unit 1, detecting optical control information A' at the optical control-information detection unit 19 by way of the optical coupler 11, and performing automatic control with the control unit 20 so that by means of the detected information, the power from the optical power control unit 14 is adjusted to within a specified value.

The above description of the three functions is for a configuration for transmission direction A. However, the above configuration is also identical to the transmission direction B. (See FIG. 4)

Figure 4:
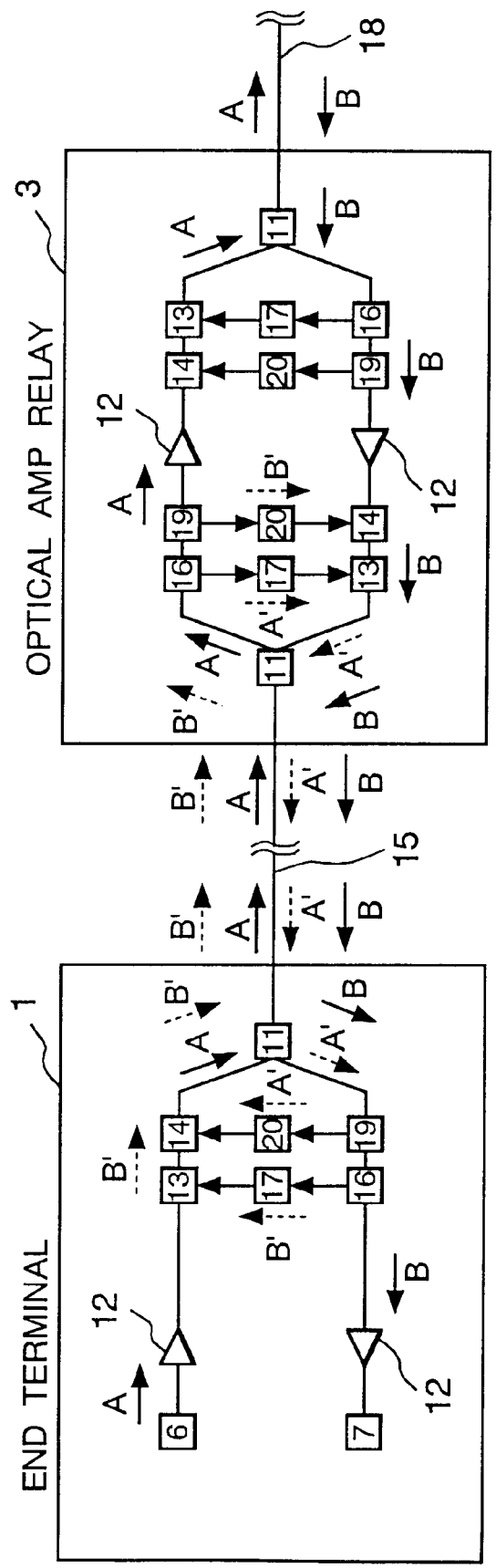
FIG. 4 is a block diagram showing specific functions relating to the end terminal unit and the optical amplifier relay unit for the configuration shown in FIG. 3.

A specific working example is shown in FIG. 4 for the configuration in FIG. 3 in order to provide a more detailed description of the bidirectional optical transmission system of FIG. 3.

FIG. 4 is a block diagram specifically showing the functions relating to the end terminal unit 1 and the optical amplifier relay unit 3 for the configuration shown in FIG. 3.

The equipment that may be provided for the transmission medium 5 and the optical amplifier unit 2 between the end terminal unit 1 and the optical amplifier relay unit 3 are just as explained for FIG. 3.

The optical signal A is transmitted from an optical transmission unit 6 inside the end terminal unit 1. After the optical signal A is amplified in an optical amplifier 12 in order to boost the transmitted optical signal, this output is passed through the optical control-information introduction unit 13 and the optical power adjusted by means of the optical power control unit 14. This regulated optical signal. A is input to the first optical fiber 15 by way of the optical coupler 11.

The optical amplifier 12 however is not needed and the order of the optical control-information introduction unit 13 and the optical power control unit 14 can be changed as desired or can be integrated into one unit.

The first optical fiber 15 is approximately 80 kilometers and in this interval the optical signal power decreases about ¹⁄₁₀th to ¹⁄₁₀,₀₀₀th. The optical signal A passed through the first optical fiber 15 is input to the optical amplifier unit 3. After passing through the coupler 1 in the optical amplifier unit 3, the optical power of the optical signal A is detected by the optical input detection unit 16.

The detected power monitor value is conveyed to the optical control-information generating unit 17. Information relating to the size of the optical power monitor value in optical control-information generating unit 17 is sent to the optical control-information introduction unit 13. The optical control information A' from the optical control-information introduction unit 13 is input to the first optical fiber 15 by means of the optical coupler 11 in a direction opposite the previous optical information A.

Here, the optical information A passed through the optical input detection unit 16 is passed through the optical control-information input detection unit 19 and after being amplified in the optical amplifier 12, is passed through the optical power control unit 14 and the optical control-information introduction unit 13 and then input to the second optical fiber 18 by means of the coupler 11.

However, the optical control-information introduction unit 13 and the optical power control unit 14 are required for sending optical control information and for optical signal control with the end terminal unit 3 and the optical amplifier relay unit 4 after (downstream) the second optical fiber 18.

Also, the order of the optical control-information introduction unit 13 and the optical power control unit 14 or the optical input detection unit 16 and the optical control-information input detection unit 19 may be rearranged or may be integrated into one unit.

The optical information A' sent through the optical fiber 15 arrives at the end terminal unit 1. The optical information A' is detected by means of the optical control-information input detection unit 19 after passing through the optical coupler 11 inside the end terminal unit 1, and the detected information is sent to the control unit 20. The control unit 20 complies with this information and functions to maintain the power from the optical control unit 14 within a specified value.

In other words, in order for the optical power of the optical signal A input to the optical amplifier relay unit 3 to reach a specified value, the optical information A' is allotted from the optical amplifier relay unit 3 and by detecting this information at the end terminal unit 1, the optical power of the optical signal A detected at the end terminal unit 1 is regulated and controlled by means of the optical power control unit 14.

An optical signal B however from the second optical fiber 18, passes through the optical coupler 11 in the optical amplifier relay unit 3, the optical control-information input detection unit 19 and is then amplified by the optical amplifier 12.

However, the optical input detection unit 16 and the optical control-information input detection unit 19 are required for sending optical control information and control of the optical signal with the end terminal unit 4 or the optical relay amplifier 3 downstream of the second optical fiber 18.

The optical power of the optical signal B amplified in the optical amplifier 12 is regulated by the optical power control unit 14. The now adjusted optical signal B is passed through the optical control-information introduction unit 13 and input to the first optical fiber 15 by means of the optical coupler 11.

Further, the order of the optical control-information introduction unit 13 and the optical power control unit 14 or the optical input detection unit 16 and the optical control-information input detection unit 19 may be rearranged or may be integrated into one unit.

The optical signal B passed through the first optical fiber 15 is input to the end terminal unit 1. The optical signal B is then passed through the optical coupler 11 inside the end terminal unit 1 is then passed through the optical control-information input detection unit 19 and the optical power detected by the optical input detection unit 16.

The detected power monitor value is conveyed to the optical control-information generating unit 17. Information relating to the size of the optical power monitor value in optical control-information generating unit 17 is sent to the optical control-information introduction unit 13. The optical control information B' from the optical control-information introduction unit 13 is input to the first optical fiber 15 by means of the optical coupler 11 in a direction opposite the previous optical information B.

Here, the optical information B passed through the optical input detection unit 16, after being amplified in the optical amplifier 12 is input to the optical receiving unit 7. However the optical amplifier 12 is not required and the optical input detection unit 16, the optical control-information input detection unit 19 and the optical receiving unit 7 may be integrated-into one unit.

The optical information B' sent through the optical fiber 15 arrives at the optical amplifier relay unit 3. The optical information B' is detected by means of the optical control-information input detection unit 19 after passing through the optical coupler 11 inside the optical amplifier relay unit 3, and the detected information is sent to the control unit 20. The control unit 20 complies with this information and functions to maintain the power from the optical control unit 14 within a specified value.

In other words, in order for the optical power of the optical signal B input to the end terminal unit 1 to reach a specified value, the optical control information B' is sent from the optical amplifier relay unit 3 and by detecting this information at the end terminal unit 1, the optical power of the optical signal B sent from the end terminal unit 1 is detected at the optical amplifier relay unit 3 and regulated and controlled by means of the optical power control unit 14.

As is obvious from the above description, an optical signal A transmitted bidirectionally, and an optical signal B, and both can simultaneously be controlled in a stable operation however control may also be achieved with a signal in only one direction.

As is also obvious to one skilled in the related art, the optical power can be stably controlled in a manner separate from that described above, by devices for transmission of optical signals such as from respective optical amplifiers 12 and optical transmission units 6 so that operation stability can be even further improved.

As is clearly shown in FIG. 4, the optical signal A and optical control information B', and the optical signal B and optical control information A' are transmitted on the first optical fiber 15 in the same direction however the optical signal A can also be included with the optical control information B'. Similarly, the optical signal B may also include the optical control information A'.

Further, the example in FIG. 4 showed an optical fibers 15 and 18 as the transmission medium 15 however an optical amplifier or an optical switch may also be utilized as the transmission medium 15. Further, a plurality of devices functioning as transmission medium 15 may be connected together. Also, the optical control-information input detection unit 19 and the optical input detection unit 16 need not always be positioned in the end terminal unit 1 or the optical relay amplifier unit 3 and if stable optical signal is necessary may for instance be positioned in the transmission optical fibers 15 and 18.

Also, the optical control information is configured to be transmitted by way of the optical fibers 15 and 18 however, these optical fibers need not always be utilized if the optical control information is capable of being allotted to the other end of the transmission medium 5. For instance, when an optical amplifier or an optical switch is contained inside the transmission medium, a optical fiber for allocation of the optical control information separate from the transmission medium 5 can be provided so that fast and reliable transmission of optical control information can be assured without any effects on the optical amplifier unit or the optical switch.

On the other hand, the optical control-information introduction unit 13 and the optical power control unit 14 should preferably not be placed in the prestage of the optical amplifier 12. For instance when the connected in serial with the optical amplifier 12, the optical control-information introduction unit 13 and the optical power control unit 14 are preferably placed subsequent (downstream) of the first (pre) stage of the optical amplifier 12. The reason is that the optical power of the optical signal is extremely weak in the first stage of the optical amplifier 12 and adjustment of weak optical signal is very difficult. Another reason is that the optical information at this point is also very susceptible to adverse effects from a weak optical signal. The optical power of the signal from the optical transmission unit 6 is sufficiently strong so that in the configuration shown above, the optical control-information introduction unit 13 and the optical power control unit 14 are installed in a prestage of the optical amplifier 12. However in the view of the above listed reasons, the positional relationship of the optical amplifier 12, the optical control-information introduction unit 13 and the optical input detection unit 16 may be changed as needed.

As related above, a critical point in improving the safety and reliability of the optical transmission system at the point where the optical power is weak after having passed through the transmission medium 5, is maintaining the required power and signal to noise ratio (S/N) for all the optical signals that are transmitted, and making the operation stable.

As shown above, simple and also stable transmission of optical signals can be achieved at the signal emission point for information on optical signal power after transmission through the transmission medium 5 by feeding back the signal and controlling the signal to reach a specified value.

Figure 5:
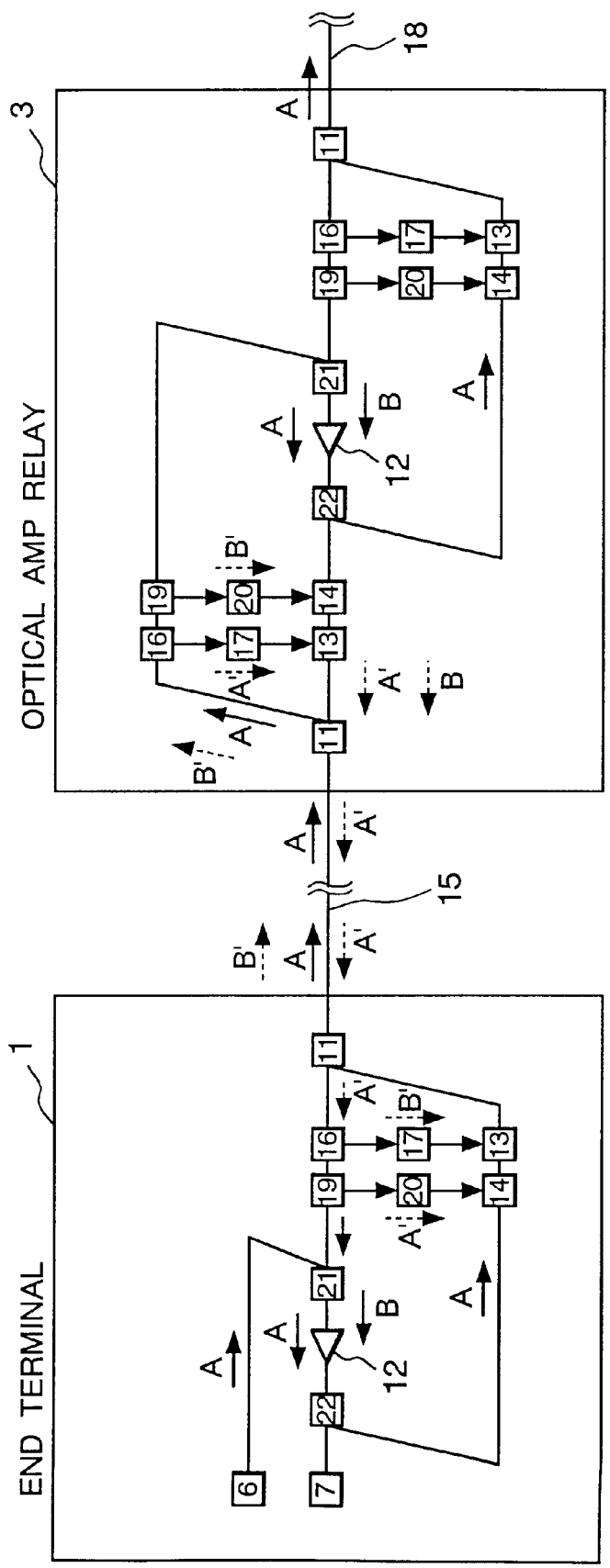
FIG. 5 is a structural block diagram showing another embodiment of the end terminal unit and the optical amplifier relay unit.

Another specific example for the end terminal unit 1 and the optical amplifier relay unit 3 is shown in FIG. 5. The point where this example differs from the configuration of FIG. 4 is that the optical signal A and the optical signal B are both amplified by means of the optical amplifier 12.

The optical signal A is transmitted from the optical transmission unit 6 installed in the end terminal unit 1. After the optical signal A is passed through the optical coupler 21, amplification is performed in the optical amplifier 12. The optical signal A then passes through the optical coupler 22 and the optical power of the optical signal A is adjusted by the optical power control unit 14. The now adjusted optical signal A passes through the optical control-information introduction unit 13 and is input to the first optical fiber 15 by way of the optical coupler 11.

Also, the order of the optical control-information introduction unit 13 and the optical power control unit 14 or the optical input detection unit 16 and the optical control-information input detection unit 19 may be rearranged or may be integrated into one unit just as shown in FIG. 4.

The optical signal A passed through the first optical fiber 15 is input to the optical amplifier relay unit 3. The optical signal A is then passed through the optical coupler 11 inside the optical amplifier relay unit 3 and the optical power detected by the optical input detection unit 16.

The detected power monitor value is conveyed to the optical control-information generating unit 17. Information relating to the size of the optical power monitor value in optical control-information generating unit 17 is sent to the optical control-information introduction unit 13. The optical control information A' from the optical control-information introduction unit 13 is input to the first optical fiber 15 by means of the optical coupler 11 in a direction opposite the previous optical information A.

Also, the order of the optical control-information introduction unit 13 and the optical power control unit 14 or the optical input detection unit 16 and the optical control-information input detection unit 19 may be rearranged or may be integrated into one unit just as shown in FIG. 4.

Here, the optical signal A is passed through the optical input detection unit 16 and after passing the optical coupler 21 and being amplified by the optical amplifier 12, passes the optical coupler 22, the optical power control unit 15 and the optical control-information introduction unit 13 and the optical signal A is input to the second fiber 18 by means of the optical coupler 11.

However, the optical control-information introduction unit 13 and the optical power control unit 14 are required for sending optical control information and for optical signal control with the end terminal unit 4 and the optical amplifier relay unit 3 after (downstream of) the second optical fiber 18.

The optical information A' sent through the optical fiber 15 arrives at the end terminal unit 1. The optical information A' is detected by means of the optical control-information input detection unit 19 after passing through the optical coupler 11 and the optical input detection unit 16 and the detected information is sent to the control unit 20. The control unit 20 complies with this information and functions to maintain the power from the optical control unit 14 within a specified value.

In other words, in order for the optical power of the optical signal A' input to the end terminal unit 1 to reach a specified value, the optical control information A' is sent from the optical amplifier relay unit 3 and by detecting this information at the end terminal unit 1, the optical power of the optical signal A sent from the end terminal unit 1 is regulated and controlled by means of the optical power control unit 14.

On the other hand, in order for the optical signal B from the second optical fiber 18 input to the end terminal unit 1 to reach a specified value of optical power just as above, the optical control information B' is sent from the end terminal unit 1. The optical power for the optical signal B sent from the optical relay amplifier unit 3 is then regulated by the optical power control unit 14 based on the optical control information B' that is received at the optical relay amplifier unit 3.

A configuration of this type allows the number of optical amplifiers 12 to be decreased and a bidirectional transmission system capable of easily and stably transmitting optical signals to be achieved.

Figure 6:
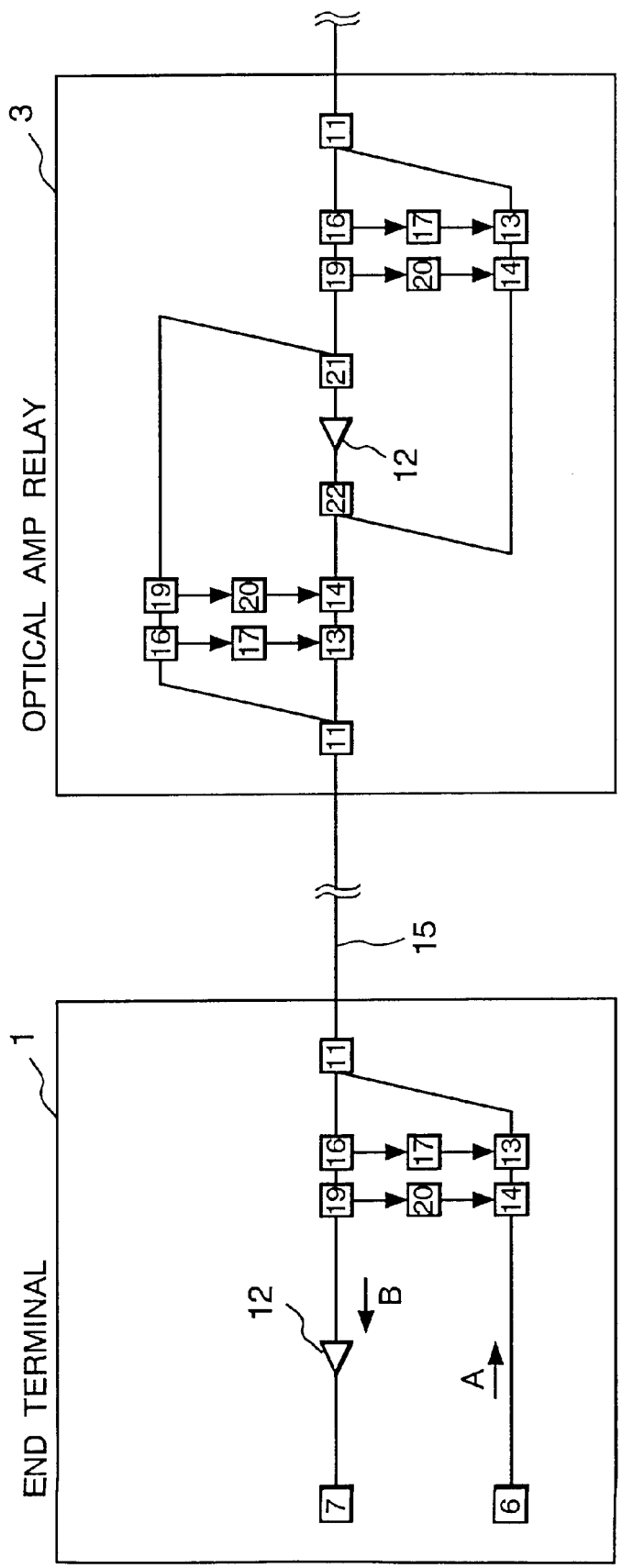
FIG. 6 is a structural block diagram showing still another embodiment of the end terminal unit and the optical amplifier relay unit.

Further, if there is no need to amplify the optical signal A from the optical transmission unit 6, then as shown in FIG. 6, the optical coupler 21 and 22 can be omitted and the optical signal A from the optical transmission unit 6 connected to the optical power control unit 14 and the optical control-information introduction unit 13. Also if there is no need to amplify the optical signal B from the first optical fiber 15, then the optical signal B can be connected to the optical receiving unit 7 from the optical input detection unit 16 or the optical control-information input detection unit 19.

With this kind of arrangement, a bidirectional transmission system capable of easily and stably transmitting optical signals can be achieved with the configuration in the end terminal unit 1.

Figure 7:
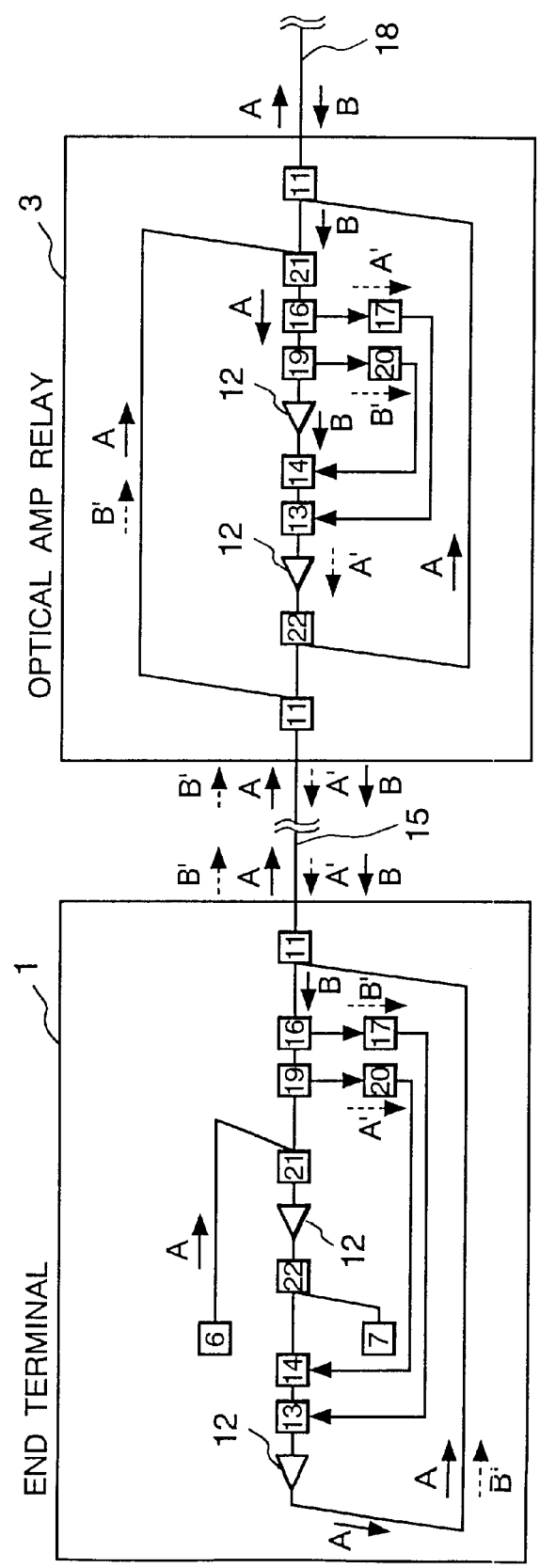
FIG. 7 is a structural block diagram showing yet still another embodiment of the end terminal unit and the optical amplifier relay unit.

The example shown in FIG. 7 may also be considered. The example in FIG. 7 is different from the previous configuration in that a direct connection is made to the optical amplifier 12 and the positional relationship of the optical amplifier 12 versus the optical input detection unit 16, the optical control-information input detection unit 19, the optical power control unit 14 and the optical control-information introduction unit 13 has changed.

An optical signal A is transmitted from the optical transmission unit 6 in the end terminal unit 1. After this optical signal A is passed through the optical coupler 21 input to the first optical amplifier 12 and amplified in the first optical amplifier 12, the optical signal A is passed through the optical couple 22 and the optical power adjusted in the optical power control unit 14. The now adjusted optical signal A is passed through the optical control-information introduction unit 13 and amplified in the second optical amplifier 12 and then input to the first optical fiber 15 by way of the optical coupler 11.

The optical signal A passed through the first optical fiber 15 is input to the optical relay amplifier unit 3. The optical signal B that passes through the optical coupler 11 then passes through the optical coupler 11 and the optical power detected in the optical input detection unit 16.

The detected power monitor value is conveyed to the optical control-information generating unit 17. Information relating to the size of the optical power monitor value in optical control-information generating unit 17 is sent to the optical control-information introduction unit 13. The optical control information A' is amplified in the second optical amplifier 12 and then input to the first optical fiber 15 by means of the optical coupler 11 in a direction opposite the previous optical information A.

Also, the order of the optical control-information introduction unit 13 and the optical power control unit 14 or the optical input detection unit 16 and the optical control-information input detection unit 19 may be rearranged or may be integrated into one unit.

The optical signal A that passed the optical input detection unit 16 is passed through the optical control-information input detection unit 19 and after being amplified in the first optical amplifier 1, is passed through the optical control-information introduction unit 13 and the optical power control unit 14 and amplified in the second optical amplifier 12 and then input to the second optical fiber 18 by means of the optical coupler 22 and the optical coupler 11.

The optical information A1 sent through the optical fiber 15 arrives at the end terminal unit 1. The optical information A' is detected by means of the optical control-information input detection unit 19 after passing through the optical coupler 11 and the optical input detection unit 16 and the detected information is sent to the control unit 20. The control unit 20 complies with this information and functions to maintain the power from the optical control unit 14 within a specified value.

In the configuration in FIG. 7, after adjustment by the optical power control unit 14, amplification is performed by the second optical amplifier unit 12 and the optical signal A' transmitted by the end terminal unit 1. In other words, in order that the optical power of the optical signal A input from the optical amplifier relay unit 3 reaches a specified value, the optical control information A' is allotted by the optical amplifier relay unit 3, by receiving this optical control information A' at the end terminal unit 1, regulation of power is performed by the optical power control unit 14 of the optical power of the optical signal A sent from the end terminal unit 1.

On the other hand, the optical signal B from the second optical fiber 18 passes through the optical coupler 11 and the optical coupler 21 of the optical amplifier relay unit 3, the optical input detection unit 16 and the optical control-information input detection unit 19 and is then amplified in the first optical amplifier 12. The optical power of the optical signal B amplified in the first optical amplifier 12 is adjusted by the optical power control unit 14. The now adjusted optical signal B passes the optical control-information introduction unit 13, is amplified by the second optical amplifier and then input to the first optical fiber 15 by way of the optical coupler 22 and the optical coupler 11.

However, the order of the optical control-information introduction unit 13 and the optical power control unit 14 or the optical input detection unit 16 and the optical control-information input detection unit 19 may be rearranged or may be integrated into one unit.

The optical signal B passed through the first optical fiber 15 is input to the end terminal unit 1. The optical signal B is then passed through the optical coupler 11 inside the end terminal unit 1 and the optical power detected by the optical input detection unit 16. The detected power monitor value is conveyed to the optical control-information generating unit 17. Information relating to the size of the optical power monitor value in optical control-information generating unit 17 is sent to the optical control-information introduction unit 13. The optical control information B' from the optical control-information introduction unit 13, is amplified by the second optical amplifier 12 and input to the first optical fiber 15 by means of the optical coupler 11 in a direction opposite the previous optical information B.

Here, the optical signal B that passed through the optical input detection unit 16, then passes through the optical control-information input detection unit 19 and the optical coupler 21 and after being amplified by the first optical amplifier 12 is input to the optical receiving unit 7 by way of the optical coupler 22.

The optical information B' sent through the optical fiber 15 arrives at the optical amplifier relay unit 3. The optical information B' is detected by means of the optical control-information input detection unit 19 after passing through the optical coupler 11 and the optical input detection unit 16 and the detected information is sent to the control unit 20. The control unit 20 complies with this information and functions to maintain the power from the optical control unit 14 within a specified value.

In other words, in order for the optical power of the optical signal B input to the end terminal unit 1 to reach a specified value, the optical information B' is sent from the end terminal unit 1 and by detecting this optical information B' at the end terminal unit 1, the optical power of the optical signal A sent detected at the end terminal unit 1 is regulated by means of the optical power control unit 14.

As shown in FIG. 7, a simpler bidirectional optical transmission system can be constructed by means of this configuration. Further, in the configuration in FIG. 7, the optical control-information introduction unit 13 and the optical power control unit 14 are installed between the first optical amplifier 12 and the second optical amplifier 12 and since the adjusted optical power is once again capable of being amplified by means of the second optical amplifier 12, highly efficient regulation becomes possible since no adjustment of an extremely weak optical signal is required.

Further, generally a transmit power for the end terminal station 1 greater than the receive power to the optical receiving unit 7 inside the end terminal station 1 is required. If a serial connection is made to the optical amplifier, and the prestage made the optical pre-position amplifier and the final stage made the optical post-position amplifier, then the power of the optical pre-position amplifier will be sufficient for the optical signal input to the optical receiving unit 7.

Conversely, the transmit power from the end terminal unit 1 requires sufficient optical power greater than the final stage optical post-position amplifier. In the configuration of FIG. 7, the signal from the final stage of the optical amplifier 12 connected in serial is isolated and input to the optical receiving unit 7 so that a transmit power can be obtained having greater optical power than does the receive power.

The positional relationship of the optical amplifier 12 installed in the final stage of the optical transmission unit 6, the optical control-information introduction unit 13 and the optical power control unit 14 may be changed.

Figure 8:
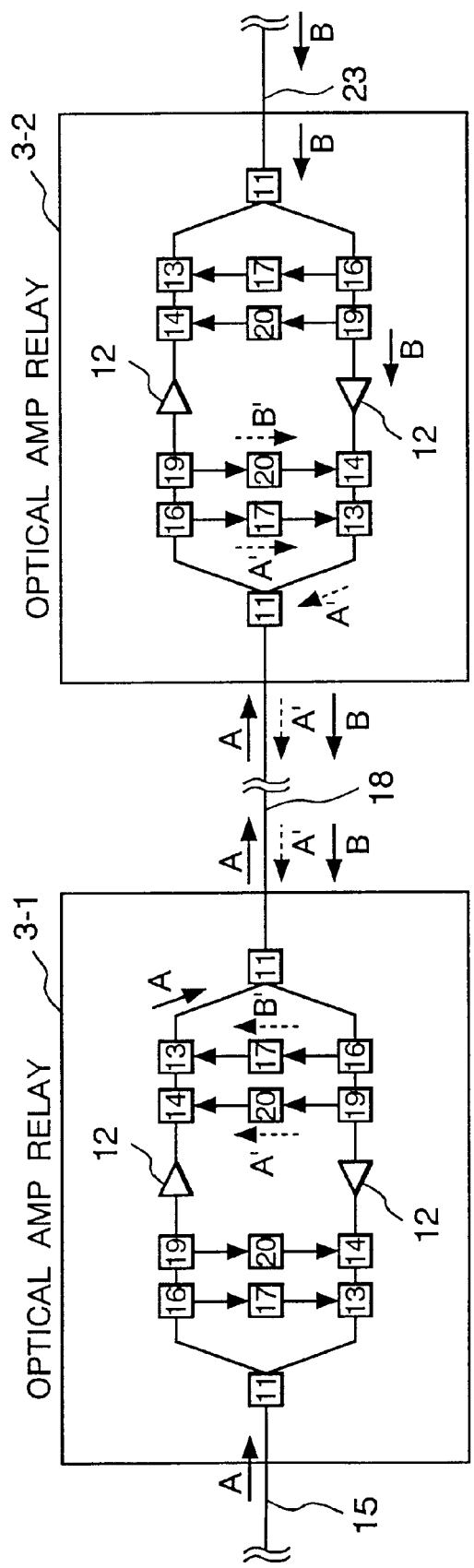
FIG. 8 is a structural block diagram showing an example of information transmission within the optical relay amplifier units enclosing the transmission medium.

FIG. 8 shows an example of information transmission in the optical amplifier relay units 3 enclosing the transmission media 5.

After the optical signal A from the first optical fiber 15 passes through the optical control-information input detection unit 19 and the optical input detection unit 16, and the optical coupler 11 inside the optical amplifier relay unit 3-1, the optical signal A is amplified by means of the optical amplifier 12. Once this optical signal A has been amplified by means of the optical amplifier 12, the optical power is adjusted by means of the optical control unit 14. This now adjusted optical signal A, passes the optical control-information introduction unit 13 and is input to the second optical fiber 18 by means of the optical coupler 11.

Also, the order of the optical control-information introduction unit 13 and the optical power control unit 14 or the optical input detection unit 16 and the optical control-information input detection unit 19 may be rearranged or may be integrated into one unit.

In the second optical fiber 18 of approximately 80 kilometers, the optical signal power attenuates approximately $1/10$th to $1/10,000$ during transmission over this distance. The optical signal A passing through the second optical fiber 18 is input to the second optical amplifier relay unit 3-2.

In the second optical amplifier relay unit 3-2, the optical power of the optical signal A that passed through the optical coupler 11 is detected by the optical input detection unit 16. The monitor value for the optical power that is detected is sent to the optical control-information generating unit 17. Information relating to the size of the power monitor value information in the optical control-information generating unit 17 is sent to the optical control-information introduction unit 13. The optical control information A' from the optical control-information introduction unit 13 is input to the second optical fiber 18 by way of the optical coupler 11 in a direction opposite the previous optical signal A.

Also, the order of the optical control-information introduction unit 13 and the optical power control unit 14 may be rearranged or may be integrated into one unit.

Here, the optical signal A is passed through the optical input detection unit 16 and after passing the optical controlled-information input detection unit 19 and being amplified by the optical amplifier 12 in the optical amplifier unit 8, through the optical control-information introduction unit 13 and the optical power control unit 14 and is input to the third optical fiber 23 by means of the optical coupler 11. However, the optical control-information introduction unit 13 and the optical power control unit 14 are required for sending optical control information and for optical signal control with the end terminal unit 4 and the optical amplifier relay unit 3 after (downstream of) the third optical fiber 23.

The optical information A' sent through the second optical fiber 18 arrives at the first optical relay amplifier unit 3-1. The optical information A' is detected by means of the optical control-information input detection unit 19 after passing through the optical coupler 11 and the optical input detection unit 16 the first optical relay amplifier unit 3-1 and the detected information is sent to the control unit 20. The control unit 20 complies with this information and functions to maintain the power from the optical control unit 14 within a specified value.

In other words, in order for the optical power of the optical signal A input to the second optical relay amplifier unit 3-2 to reach a specified value, the optical control information A' is sent from the second optical amplifier relay unit 3-2 and by detecting this information at the first optical amplifier relay unit 3-1, thus the optical power of the optical signal A sent from the optical amplifier relay unit 3 is regulated and controlled by means of the optical power control unit 14.

As for the optical signal B from the third optical fiber 23 on the other hand, in order that the optical power of the optical signal B input to the first optical amplifier relay unit 3-1 reaches a specified value, the optical control information B' of the first optical amplifier relay unit 3-1 is transmitted and by being received at the second optical amplifier relay unit 3-2, the optical power of the optical signal B transmitted from the second optical amplifier relay unit 3-2 is controlled by the optical power control unit 14.

The above description explained control of an optical signal A transmitted bidirectionally and simultaneous control with the optical signal B is also possible. Needless to say, control may also be achieved of signals in only one direction.

As is also obvious to one skilled in the related art, the optical power can be stably controlled in a manner separate from that described above, by devices for transmission of optical signals such as from respective optical amplifiers 12 operation stability can be improved since the optical power can be controlled in a stable manner.

As is clearly shown in FIG. 8, the optical signal A and optical control information B', and the optical signal B and optical control information A' are transmitted on the first optical fiber 15 in the same direction, however the optical signal A can also be included with the optical control information B'. Similarly, the optical signal B may also be made to include the optical control information A'.

Further, the example showed optical fibers as the transmission medium, however an optical amplifier or an optical switch may also be utilized as the transmission medium. Further, a plurality of devices functioning as transmission medium may be connected together. Also, the optical control-information input detection units need not always be positioned in the optical relay amplifier unit and if an optical signal with more stability is necessary, then the optical control-information input detection units may for instance be positioned inside the optical fibers.

Also, the optical control information is configured to be transmitted by way of the optical fibers 15, however, these optical fibers need not always be utilized if the optical control information is capable of being allotted to the other end of the transmission medium. For instance, when an optical amplifier or an optical switch is contained inside the transmission medium, a optical fiber for allocation of optical control information separate from the transmission medium can be provided so that fast and reliable transmission of optical control information can be assured without any effects on the optical amplifier unit or the optical switch.

On the other hand, the optical control-information introduction unit 13 and the optical power control unit 14 should preferably not be placed in the prestage of the optical amplifier 12. For instance when connected in serial with the optical amplifier 12, the optical control-information introduction unit 13 and the optical power control unit 14 are preferably placed subsequent (downstream) of the first (pre) stage of the optical amplifier 12. The reason is that the optical power of the optical signal is extremely weak in the first stage of the optical amplifier 12 and adjustment of weak optical signal is very difficult. Another reason is that the optical information at this point is also very susceptible to adverse effects from a weak optical signal.

As related above, a critical point in improving the safety and reliability of the optical transmission system at the point where the optical power is weak after having passed through the transmission medium, is maintaining the required power and signal to noise ratio (S/N) for all the optical signals that are transmitted, and making the operation stable. As shown above in this invention, simple and also stable transmission of optical signals can be achieved in the optical amplifier relay unit by feedback of information on optical signal power after transmission to the signal emission point through the transmission medium, and then controlling the signal to reach a specified value.

Figure 9:
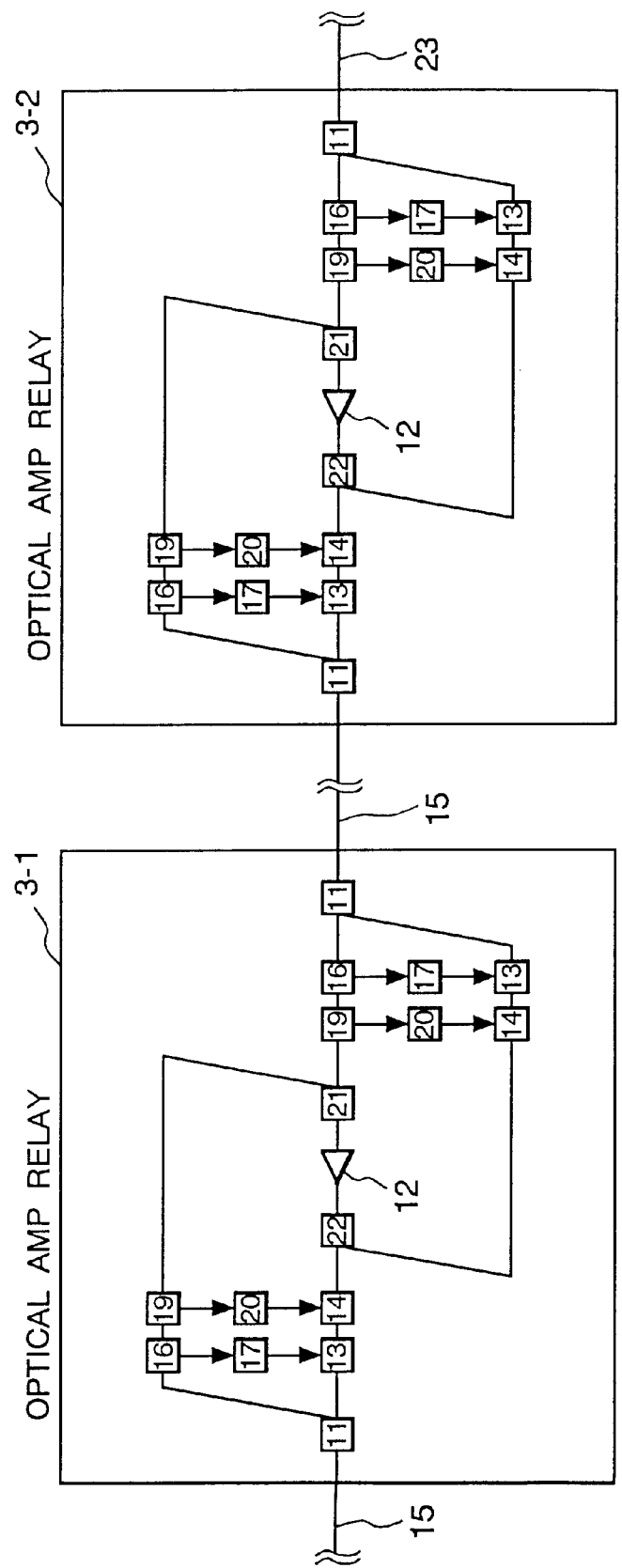
FIG. 9 is a structural block diagram showing an example of information transmission within the optical relay amplifier units enclosing the transmission medium for the configuration of FIG. 5.

Another example when performing information transfer in the optical amplifier relay units 3 enclosing the transmission medium is shown in FIG. 9. FIG. 9 is an example of information transmission between the optical amplifier relay units 3 for the configuration of FIG. 5. The information transmission method is identical to the shown in FIG. 5 and FIG. 8.

Figure 10:
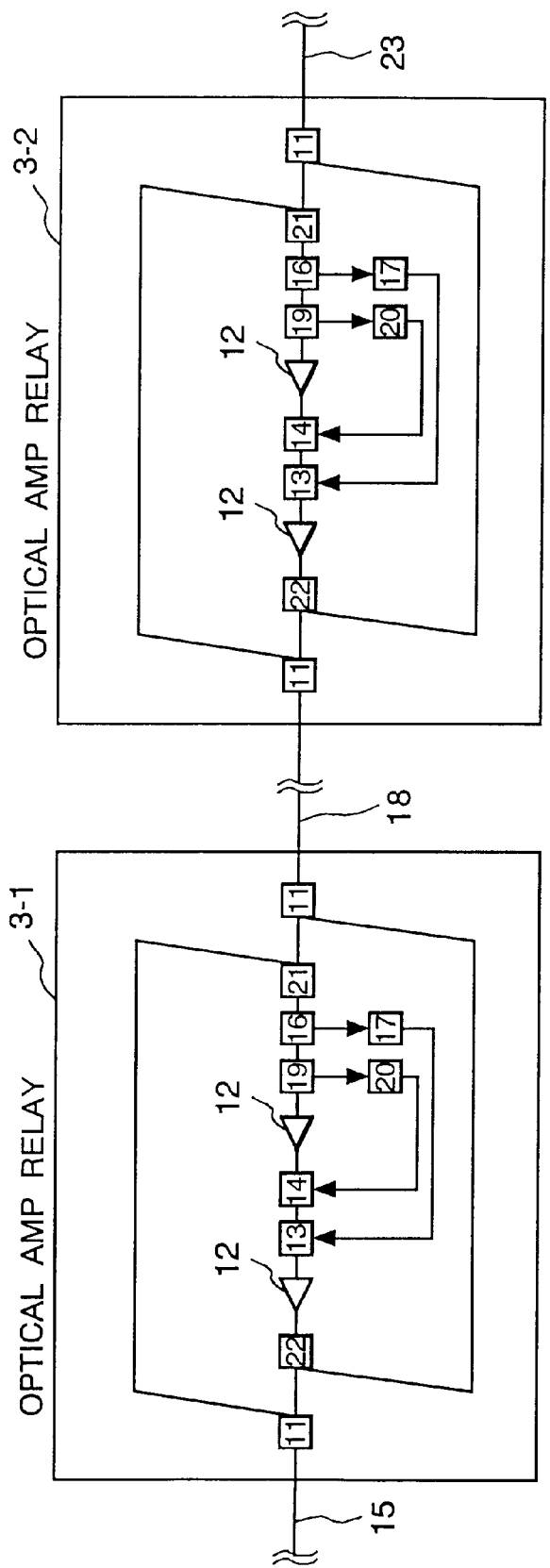
FIG. 10 is a structural block diagram showing an example of information transmission within the optical relay amplifier units enclosing the transmission medium for the configuration of FIG. 7.

Yet another specific example when performing information transfer in the optical amplifier relay units 3 enclosing the transmission medium is shown in FIG. 10. FIG. 10 is an example of information transmission between the optical amplifier relay units 3 for the configuration of FIG. 7. The information transmission method is identical to the shown in FIG. 7 and FIG. 8.

The embodiments from FIG. 5 through FIG. 10 are explained by a detailed description of the bidirectional transmission system of FIG. 3. However, systems comprising a combination of these embodiments may also be considered.

For example, a bidirectional system may be considered spanning different drawings and comprised not only of the end terminal units 1, 4 and the optical amplifier relay unit 3; end terminal units 1, 4; or companion optical amplifier relay units 3 but may also use at least one of the end terminal units 1, 4 or the optical amplifier relay unit 3.

Figure 11:
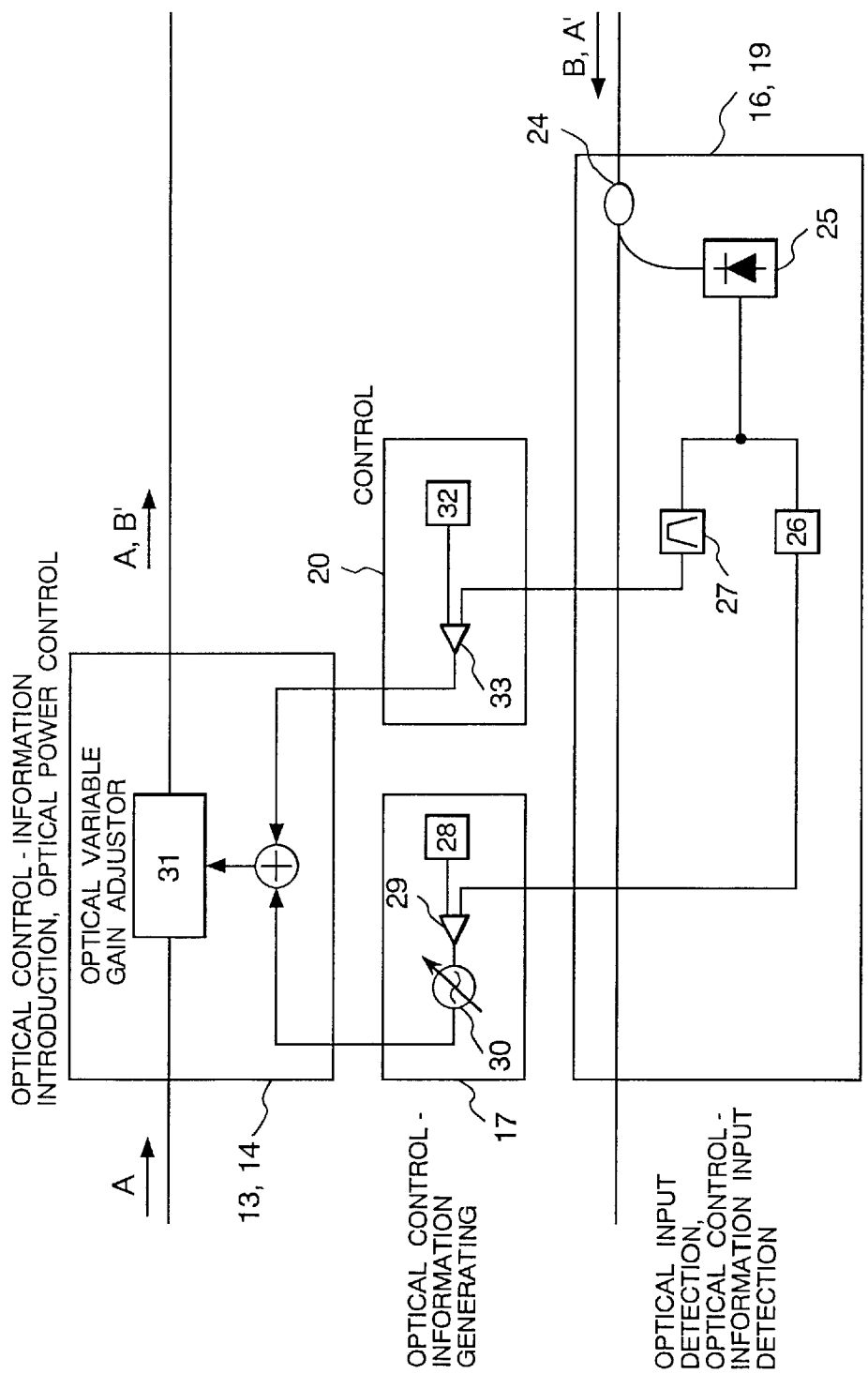
FIG. 11 is a structural block diagram showing the optical control-information introduction unit and the optical power control unit integrated as one unit within the end terminal unit or the optical amplifier relay unit.

Next a detailed actual embodiment is described utilizing FIG. 11 and having the optical input detection unit 16, the optical control-information input detection unit 19, the optical control-information generating unit 17, the control unit 20, the optical control-information introduction unit 13 and the power control unit 14 of FIG. 5 through FIG. 10.

In the embodiment shown in FIG. 11, the optical control-information introduction unit 13 and the optical power control unit 14 are integrated together inside the optical amplifier relay unit 3 or the end terminal unit 1. Not only is the amplified optical signal A adjusted to the specified power but at the same time, the optical signal B and the optical control information B' are overlapped. In this kind of configuration, the optical signal wavelengths of the optical signal B and optical control information A' or the optical signal A and optical control information B' are capable of matching each other and is achieved in this invention with a relatively simple system.

For instance, both the optical signal B and the optical control information A' may be set with an optical wavelength of 1550 nm; and both the optical signal A and the optical control information B' may be set with an optical wavelength of 1540 nm.

The optical signal B and the optical control information A' are input to the optical input detection unit 16 and the optical control-information input detection unit 19. The light that enters is tapped off by the optical splitter 24 and the optical power detected in the optical detector 25.

The detected optical signal is isolated into two signals. One of these signals is input to the average detection circuit 26 and after detecting the average value of the detected signal, is sent to the optical control-information generating unit 17 as the optical power monitor value. Also, the other signal of the two that are isolated from the detected optical signal, is input to the frequency detection circuit 27, and after detection of the frequency of the detected signal, is sent to the control unit 20.

The optical power monitor value sent to the optical control-information generating unit 17 is compared with a reference value 28 that is established beforehand in the comparator 29 and then sent to the variable oscillation circuit 30. The frequency of the oscillator signal from the variable oscillation circuit 30 is changed by means of the compared value and the frequency made equivalent to the reference value 28 and sent to the optical control-information introduction circuit 13 and the optical variable gain adjustor 31 inside the optical power control unit 14.

The optical variable gain adjustor 31 is capable of change the gain of the light by means of an external signal. The gain (value) corresponding to the light from the optical signal A (wavelength 1540 nm) of the optical variable gain adjustor 31 is modulated by means of the oscillator signal from the optical control-information generating unit 17, overlapped with optical signal A as the optical control information B' and transmitted.

The detected value transmitted to the control unit 20 is compared with a pre-established reference value 32 by means of the comparator 33. The optical control information sent as the size of the frequency per intensity modulation according to the compared value is made equivalent versus the reference value 32, and this control signal is sent to the optical control-information introduction unit 13 and the optical variable gain adjustor 31 inside the optical power control unit 14. The gain value for the light corresponding to the optical signal A (wavelength 1540 nm) of the optical variable gain adjustor 31 is thus regulated by means of a control signal from the control unit 20 and then transmitted.

Next, a description in detail of the information transmission flow by way of the optical fiber is related.

In the configuration in FIG. 11, the gain for the light of the optical variable gain adjustor 31 inside the optical power control unit 14 is modulated. This modulation signal is overlapped or multiplexed onto the optical signal as the optical control information B' and transmitted (distributed). For instance when regulating the optical power in the optical input detection unit 16 and the optical control-information input detection unit 19 for the optical signal B to −20 dBm, if the value detected by means of the average detection circuit 26 is −20 dBm then the output from the comparator 29 is set as 0 and, the 20 kHz oscillator frequency of the variable oscillation circuit 30 is made to oscillate, and the gain of the light from the optical variable gain adjustor 31 modulated at 20 kHz. By this process, a 20 kHz modulated signal is overlapped onto the optical signal A and as a result, the optical control information B' modulated at 20 kHz is sent along with the optical signal A.

Further, if for instance, the input monitor value falls below −20 dBm and reaches −20.5 dBm, a negative signal is output from the comparator 29 and the variable oscillation circuit 30 is made to oscillate in response at an oscillating frequency of 19.5 kHz and the gain value for the light of the optical variable gain adjustor 31 is modulated at 19.5 kHz. Conversely, if the input monitor value rises higher than −20 dBm and reaches 19.5 dBm, then the modulation frequency is modulates the signal at 20.5 kHz in response to the increase.

This optical signal A and the optical control information B' are input to the optical input detection unit 16 and the optical control-information input detection unit 19 at the other end of the optical fiber. When the input power of the optical signal A is sensed, the frequency of the optical signal information B' is also sensed at the same time by the frequency detection circuit 27. If the detected (sensed) frequency is 20.0 kHz, then the output from the comparator 33 is 0 and the gain value of the light of the optical variable gain adjustor 31 inside the optical power control unit 14 is maintained.

However, if the detected frequency is lower than 20.0 kHz, a negative signal is output from the comparator 33 and the gain value of the light from the optical variable gain adjustor 31 is modulated in accordance with this output to increase the optical power. Conversely if the detected frequency is higher than 20.0 kHz, positive signal is output from the comparator 33 and the gain-value of the light from the optical variable gain adjustor 31 versus the optical signal B is changed in accordance with this output to reduce the optical power.

Therefore, feedback control of the optical power of the optical signal B is now possible so that the optical power for the optical input detection unit 16 and the optical control-information input detection unit 19 is a specified value. The process is also the same in the reverse direction for the optical signal A.

The bit rate for the optical signals A and B used here is a high speed of 1 megabyte per second, however even if a modulation signal of about 20 kHz overlaps on the optical light, there is no effect on the optical signals A and B. There is no effect because a slow modulation signal of about 20 kHz is easily trapped and eliminated in the optical receiving unit 7.

Further, this modulation frequency is not limited to 20 kHz and a different frequency may be used. However, when devices are installed having functions to suppress fluctuations in optical power or the modulation frequency on the system circuit for allotting the optical control information, then for instance if even at least one optical amplifier 12 is installed to maintain the output at a fixed level, the frequency should preferably be from 1 kHz to 1 MHz. The reason being that generally, a frequency capable of suppressing optical power to a fixed level at the output of the optical amplifier 12 is 1 kHz or less and suppressing power fluctuations below 1 kHz will also eliminate the optical control information.

Therefore a frequency from 1 kHz to 1 MHz is preferable to ensure reliable transmission of information without exerting an effect on the optical signal. Conversely, when performing output control to a fixed level on the optical amplifier 12, the frequency range for suppressing power fluctuations must be a lower than the frequency for modulating the optical control information.

The configuration in FIG. 11 showed both power adjustment and modulation performed by means of a single optical power control unit 14 however these functions may be isolated and performed separately.

Also, according to the configuration of FIG. 11, the optical control signal Al is allotted (sent) along with the optical signal B in the optical power control unit 14 and the optical control-information introduction unit 13 however since optical control information (for instance C') is newly overlapped by the next optical power control unit 14 and the optical control-information introduction unit 13, the optical control information A' is automatically deleted. Accordingly, the optical control information is can be sent without being mixed with the optical control information A' of the previous stage.

Further, by simultaneously overlapping the optical control information on the optical signal moving in the opposite direction, the optical information can be easily transmitted without installing a new signal path for the optical control information.

The medium for transmitting the optical control information is an optical signal so control can be performed at an exceedingly high speed even over long distances.

Also in the configuration of FIG. 11, the information relating to optical power is sent in succession, however when the optical power in the optical input detection unit 16 is fixed continuously over a long time, the optical power can be fixed once the optical control information is sent and the optical power then controlled to a specific value by the optical power control unit 14.

In cases where fluctuations in optical power occur over a slow period in the optical input detection unit 16, the optical power control unit 14 may be adjusted intermittently over a fixed time period.

As transmission mediums this invention is further not limited to optical fibers as optical signal transmission paths or paths for transmission of information. For instance, this invention is also effective on transmission mediums in which optical power fluctuations are likely to occur after transmission of the optical signal.

The medium for sending optical control information is not limited to an optical signal in the reverse direction and a medium may be newly installed for sending optical control information. For instance, an optical control signal of a wavelength differing from that of the newly installed optical transmission unit can be transmitted and the optical control information thus sent. In this way, a control configuration can be achieved which exerts absolutely no effect on the optical signal that must be transmitted.

Figure 12:
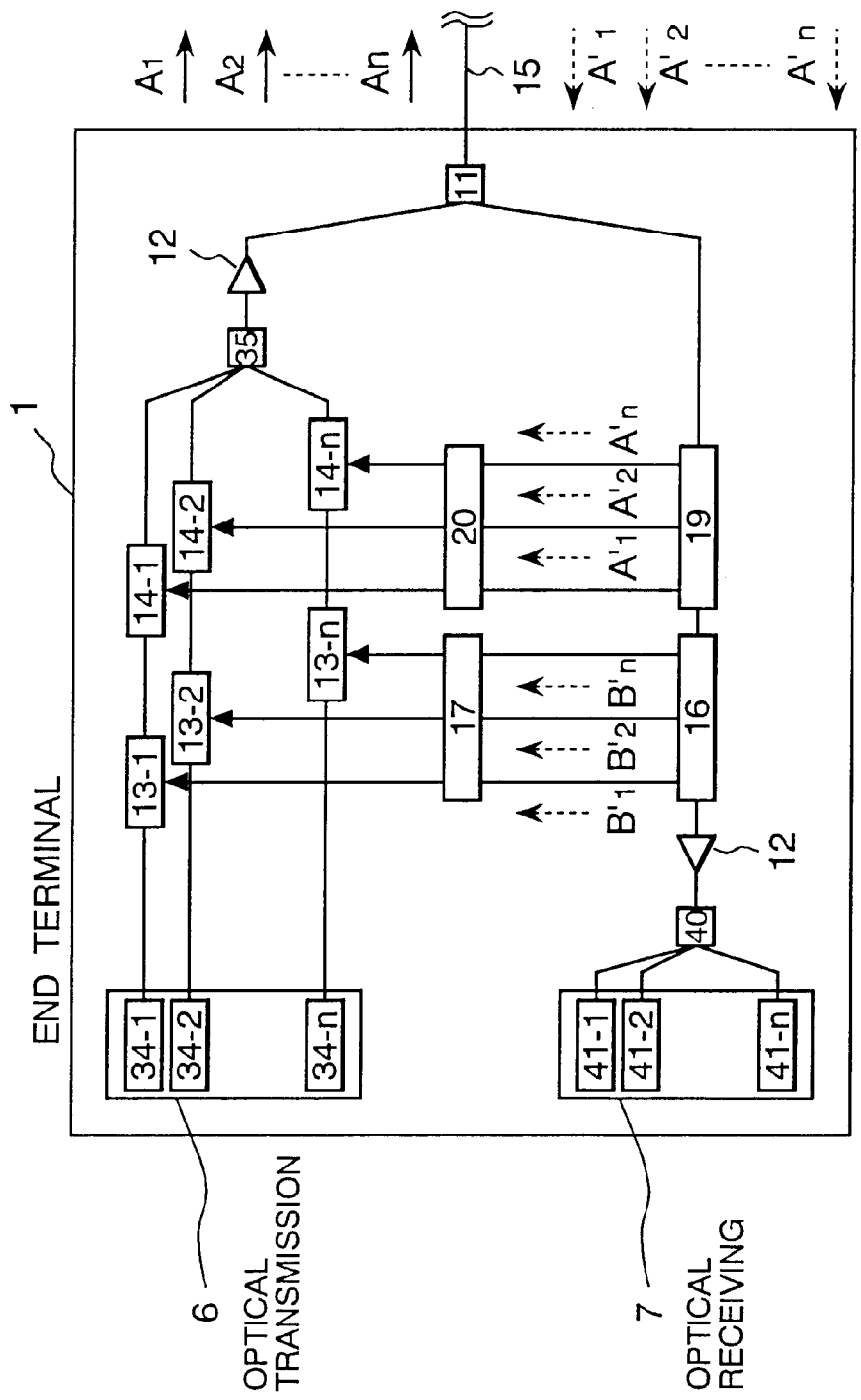
FIG. 12 is a structural block diagram showing the end terminal unit among the other specific embodiments of FIG. 3.
Figure 13:
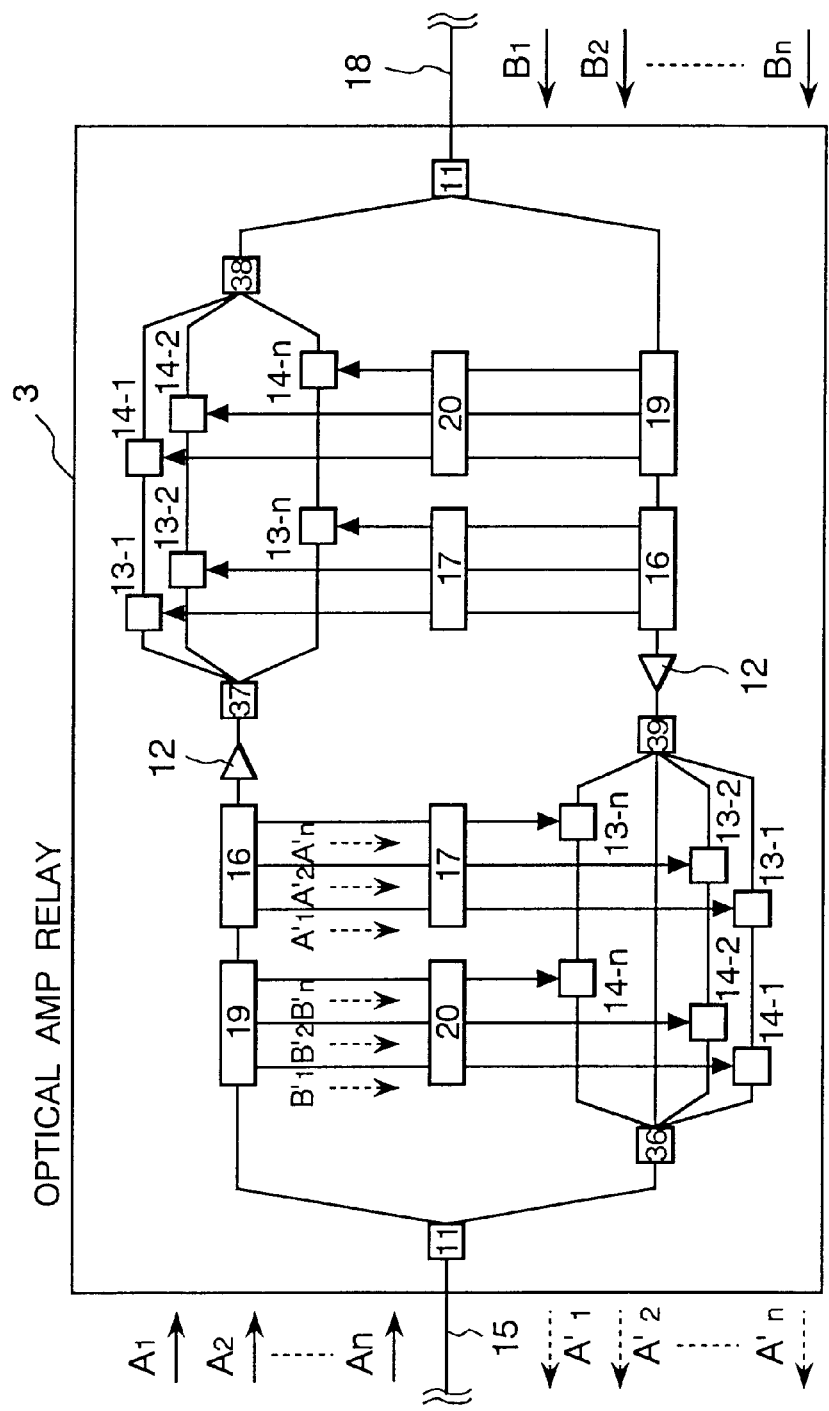
FIG. 13 is a structural block diagram showing the optical amplifier relay unit among the other specific embodiments of FIG. 3.

Specific examples of other embodiments of FIG. 3 are shown in FIG. 12A and FIG. 13. FIG. 12 shows the end terminal unit 1 and FIG. 12B shows the optical amplifier relay unit 3.

The optical transmission unit 6 inside the end terminal unit 1 of FIG. 12A send optical signals of different wavelength and includes at least one from among the optical transmitters 34-1 to 34-n. Optical signals A1, A2, A3 ... An are sent respectively from the optical transmitters 34-1 to 34-n. The optical signals A1, A2, A3 ... An pass through the respective optical control-information introduction units 13-1 to 13-n and the optical power is adjusted by the optical power control units 14-1 through 14-n. The now adjusted optical signals A1, A2, A3 ... An are summed in the optical coupler 35 and after amplification in the optical amplifier 12 are input to the first transmission fiber 15 by way of the optical coupler 11.

However the optical amplifier 12 is not necessary and the order of the optical control-information introduction units 13-1 to 13-n and the optical power control units 14-1 through 14-n may be rearranged and may also be integrated into one unit.

The first optical fiber 15 is approximately 80 kilometers and in this interval the optical signal power decreases about $\frac{1}{10}$th to $\frac{1}{10,000}$th. The optical signals A1, A2, A3 ... An passed through the first optical fiber 15 are input to the optical amplifier unit 3. After passing through the coupler 11 in the optical amplifier unit 3 shown in FIG. 13, the respective optical power of the optical signals A1, A2, A3 ... An is detected by the optical input detection unit 16 after passing the optical control input-information detection unit 19.

These detected power monitor values are conveyed to the optical control-information generating unit 17. Information relating to the size of the optical power monitor values in optical control-information generating unit 17 is sent to the optical control-information introduction units 13-1 to 13-n. The optical control information A1', A2', A3' ... An' from the optical control-information introduction units 13-1 to 13-n are summed in the optical coupler 36 and input to the first optical fiber 15 by means of the optical coupler 11 in a direction opposite the previous optical information A1, A2, A3, ... An.

However, the order of the optical input detection unit 16 and the optical control-information input detection unit 19 may be rearranged and may be integrated into one unit.

Here, the optical information A1, A2, A3, ... An that passed the optical input detection unit 16 is amplified by the optical amplifier 12 and then isolated into a specified frequency band by means of the third optical coupler 37, the outputs are then passed through the optical control-information introduction units 13-1 to 13-n and the optical power control units 14-1 through 14-n and after again summing the frequencies in the optical coupler 38 are input to the first optical fiber 18 by way of the optical coupler 11. The optical control-information introduction units 13-1 to 13-n and the optical power control units 14-1 through 14-n are however required for transmission of optical control information and optical signal control with the end control unit 4 or the optical amplifier relay unit 3 after (downstream of) the second optical fiber 18.

The optical control information A1', A2', A3', ... An' sent through the optical fiber 15 arrives at the end terminal unit 1. The optical control information A1', A2', A3', ... An' are detected by means of the optical control-information input detection unit 19 after passing through the optical coupler 11 inside the end terminal unit 1, and the detected information is sent to the control unit 20. The control unit 20 complies with this information and functions to maintain the power from the optical control units 14-1 through 14-n within a specified value.

In other words, in order for the optical power of the optical signals A1, A2, A3, . . . An input to the optical amplifier relay unit 3 to reach a specified value, the optical control information A1', A2', A3', . . . An' is sent from the optical amplifier relay unit 3 and by detecting this information at the end terminal unit 1, the optical power of the optical signals A1, A2, A3, . An sent from the end terminal unit 1 is regulated and controlled by means of the optical power control unit 14-1 to 14-n.

On the other hand, the optical signals B1, B2, B3, Bn from the second optical fiber 18 input to the end terminal unit 1 in FIG. 13, are passed through the optical coupler 11, the optical input detection unit 16 and the optical control-information input detection unit 19 inside the optical relay amplifier unit 3 and then amplified in the optical amplifier 12. The optical input detection unit 16 and the optical control-information input detection unit 19 are however required for transmission of optical control information and optical signal control with the end control unit 4 or the optical amplifier relay unit 3 after (downstream of) the second optical fiber 18.

Here, the optical signals B1, B2, B3, . . . Bn that are amplified by the optical amplifier unit 3 are then isolated into a specified frequency band by means of the third optical coupler 39, the outputs are then passed through the optical control-information introduction units 13-1 to 13-n and the optical power control units 14-1 through 14-n through various paths and after again summing the frequencies in the optical coupler 36 are input to the first optical fiber 18 by way of the optical coupler 11.

However, the order of the optical control-information introduction units 13-1 to 13-n and the optical power control units 14-1 through 14-n may be rearranged and may also be integrated into one unit.

The optical signals B1, B2, B3, . . . Bn that passed through the first optical fiber 15 are input to the end terminal unit 1 in FIG. 12.

The optical signals B1, B2, B3, . . . Bn that passed through the optical coupler in the end terminal unit 1, then pass through the optical control-information input detection unit 19 and the respective output power is detected in the optical input detection unit 16.

These detected power monitor values are conveyed to the optical control-information generating unit 17. Information relating to the size of the optical power monitor values in optical control-information generating unit 17 is sent to the optical control-information introduction unit 13. The optical control information B1', B2', B3' . . . Bn' from the optical control-information introduction unit 13 pass through the optical power control units 14-1 to 14-n are summed by means of the optical coupler 35 and the pass through the optical amplifier 12, and the optical coupler 11 and are input to the first optical fiber 15 in a direction opposite the previous optical information B1, B2, B3, . . . Bn.

Here, the optical signals B1, B2, B3, . . . Bn passed through the optical input detection unit 16 and the optical control-information input detection unit 19 are amplified in the optical amplifier 20 and then input to the optical receiving unit 7 byway of the optical coupler 40. The optical receiving unit 7 is comprised of at least one of the optical receivers 41-1 to 41-n for receiving optical signals of mutually differing wavelengths. However, the optical amplifier 12 is not required. The optical input detection unit 16 and the optical control-information input detection unit 19 and the optical receiving unit 7 may be integrated into one unit.

The optical control information B1', B2', B3', . . . Bn' sent through the optical fiber 15 arrives at the optical amplifier relay unit 3 of FIG. 13. The optical control information B1', B2', B3' . . . Bn' are detected by means of the optical control-information input detection unit 19 after passing through the optical coupler 11 inside the optical amplifier relay unit 3, and the detected information is sent to the control unit 20. The control unit 20 complies with this information and functions to maintain the power from the optical control units 14-1 through 14-n within a specified value.

In other words, in order for the optical power of the optical signals B1, B2, B3, . . . Bn input to the end terminal unit 1 to reach a specified value, the optical control information B1', B2', B3' . . . Bn' is sent from the end terminal unit 1 and by detecting this information at the optical amplifier relay unit 3, the optical power of the optical signals B1, B2, B3, . . . Bn sent from the end terminal unit 1 is regulated and controlled by means of the optical power control unit 14-1 to 14-n.

Thus, with the control process explained above simultaneous control of the bidirectionally transmitted optical signals A1, A2, A3, . . . An and the optical signals B1, B2, B3, . . . Bn is possible and of course control of only unidirectional signals is also possible.

Also, this process is adaptable to cases where the optical signals A1, A2, A3, . . . An and the optical signals B1, B2, B3, . . . Bn are not all autonomously controlled. In such cases, one optical signal can be set for one group, and control performed for separate groups, and an optical control-information introduction unit and an optical power control unit can be installed corresponding to each group.

As described above, in the configuration of FIG. 12 and FIG. 13, an optical transmission system can be constructed for automatically switching the optical power to an appropriate value when multiple changes occur in the optical signal. Accordingly, a usually stable and highly reliable optical transmission system can be provided for suppressing fluctuations in optical power for a single wavelength even if the frequency varies.

As is also obvious to one skilled in the related art, the optical power can be stably controlled in a manner separate from that described above, by devices for transmission of optical signals such as from respective optical amplifiers 12 and the optical transmission units 6 so that optical power can be stably controlled and operation stability can be even further improved.

The optical signals A1, A2, A3, . . . An and the optical control information B1', B2', B3' . . . Bn', the optical signals B1, B2, B3, . . . Bn and the optical control information A1', A2', A3' An' are transmitted in the same direction on the first optical fiber 15. The optical signals A1, A2, A3, . . . An however, can be included with the optical control information B1', B2', B3' . . . Bn'. In the same manner, the optical control information A1', A2', A3', . . . An' can be included with the optical signals B1, B2, B3, . . . Bn.

Further, the example showed optical fibers as the transmission medium, however an optical amplifier or an optical switch may also be utilized as the transmission medium. Also, the optical control-information input detection units need not always be positioned in the optical relay amplifier unit and if an optical signal with more stability is necessary, then the optical control-information input detection units may for instance be positioned inside the optical fibers.

Also, the optical control information is described as being transmitted by way of the optical fibers, however, these optical fibers need not always be utilized if the optical control information is capable of being allotted to the other end of the transmission medium. For instance, when an optical amplifier or an optical switch is contained inside the transmission medium, a optical fiber for allocation of optical control information separate from the transmission medium can be provided so that fast and reliable transmission of optical control information can be assured without any effects on the optical amplifier unit or the optical switch.

On the other hand, the optical control-information introduction unit 13 and the optical power control unit 14 should preferably not be placed in the prestage of the optical amplifier 12. For instance when connected in serial with the optical amplifier 12, the optical control-information introduction unit 13 and the optical power control unit 14 are preferably placed subsequent (downstream) of the first (pre) stage of the optical amplifier 12. The reason is that the optical power of the optical signal is extremely weak in the first stage of the optical amplifier 12 and adjustment of weak optical signals is very difficult. Another reason is that the optical information at this point is also very susceptible to adverse effects from a weak optical signal.

As related above, a critical point in improving the safety and reliability of the optical transmission system at the point where the optical power is weak after having passed through the transmission medium, is maintaining the required power and signal to noise ratio (S/N) for all the optical signals that are transmitted, and making the operation stable. As shown above in this invention, simple and also stable transmission of optical signals can be achieved in the optical amplifier relay unit by feedback of information on optical signal power after transmission to the signal emission point through the transmission medium, and then controlling the signal to reach a specified value.

Figure 14:
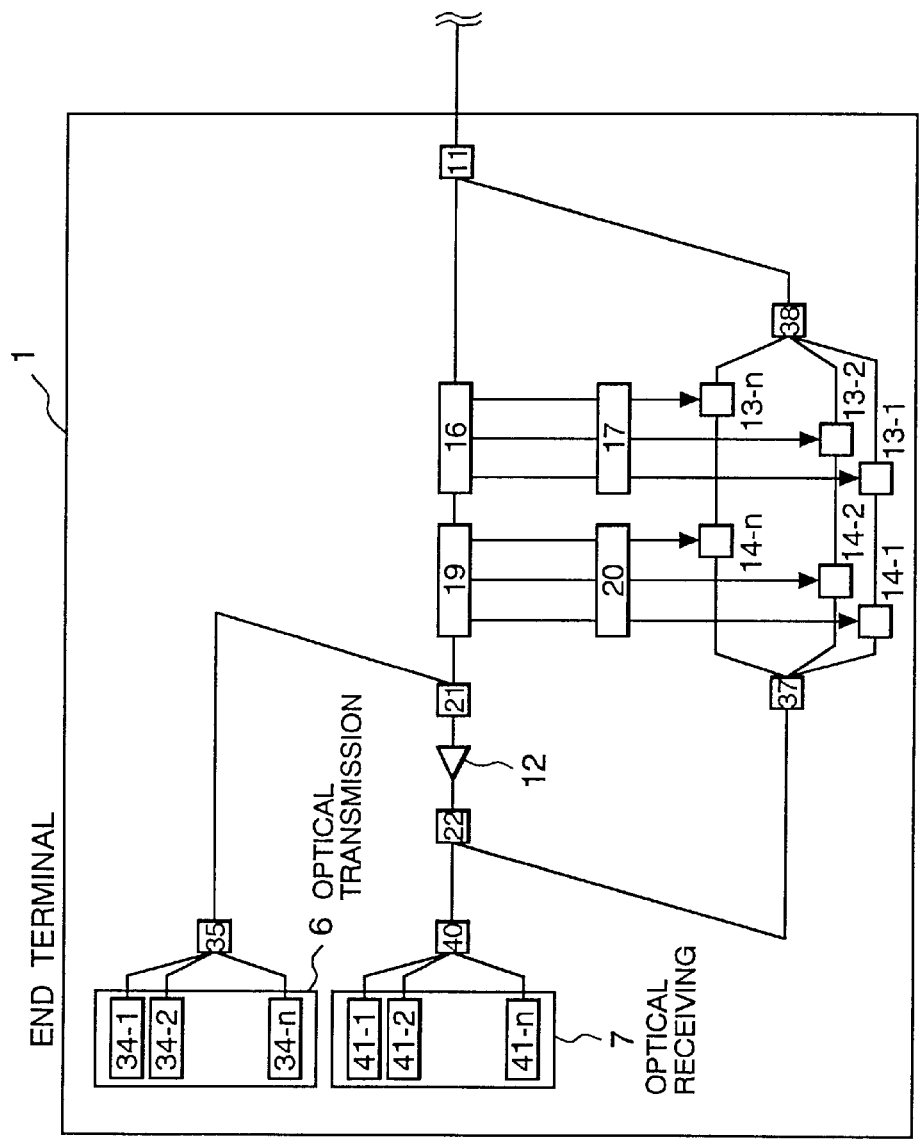
FIG. 14 is a structural block diagram showing the end terminal unit among the other specific embodiments of FIG. 3.
Figure 15:
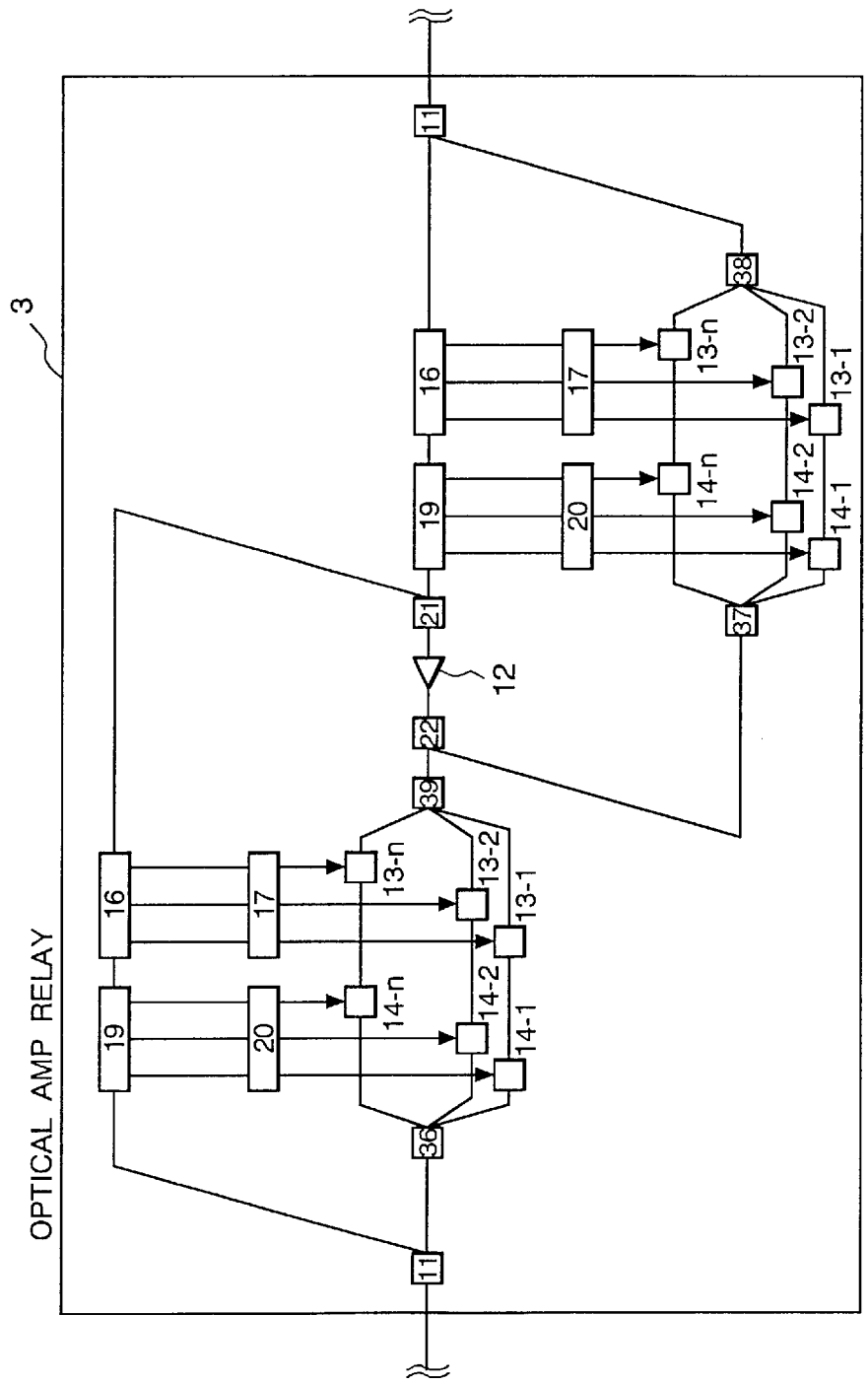
FIG. 15 is a structural block diagram showing the optical amplifier relay unit among the other specific embodiments of FIG. 3.

Another specific example of the end terminal unit 1 and the optical relay amplifier unit 3 is shown in FIG. 14 and FIG. 15.

The point where this configuration differs from FIG. 12 and FIG. 13 is that the optical signal A and the optical signal B are amplified by the same optical amplifier 12. Also in this configuration, adaptations can basically be made for the optical input detection unit 16, the optical control-information input detection unit 19, the optical control-information introduction unit 13 and the power control unit 14 of FIG. 5 as is previously explained for FIG. 12 and FIG. 13.

Figure 16:
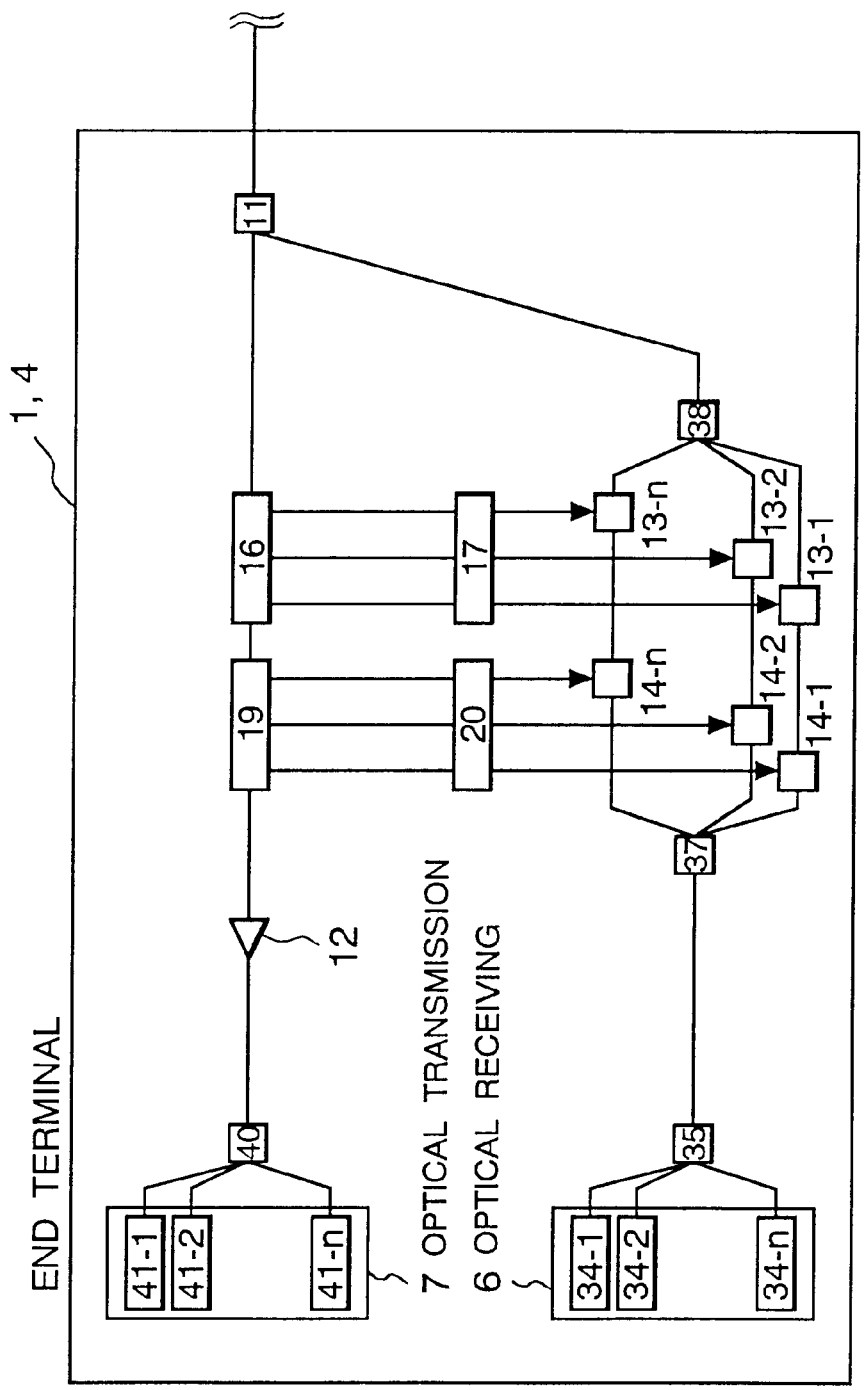
FIG. 16 is a structural block diagram showing an embodiment of the end terminal unit adopted from FIG. 12, FIG. 13 and FIG. 6.

Further, in the same manner, derivatives of the end control units 1, 4 as shown in FIG. 16 may be considered as taken from FIG. 12, FIG. 13 and FIG. 6.

Figure 17:
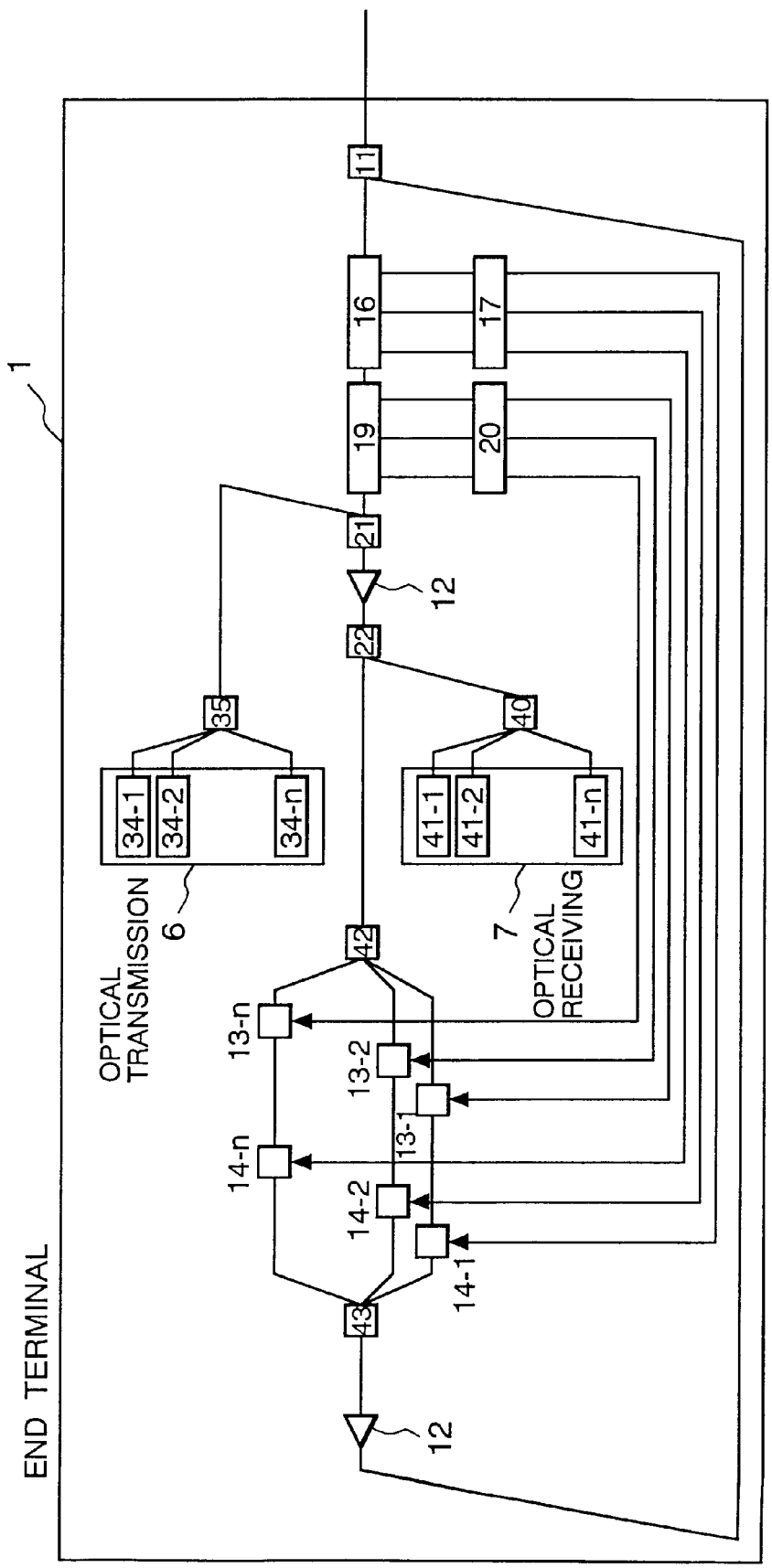
FIG. 17 is a structural block diagram showing an embodiment of the end terminal unit adopted from FIG. 12, FIG. 13 and FIG. 7.
Figure 18:
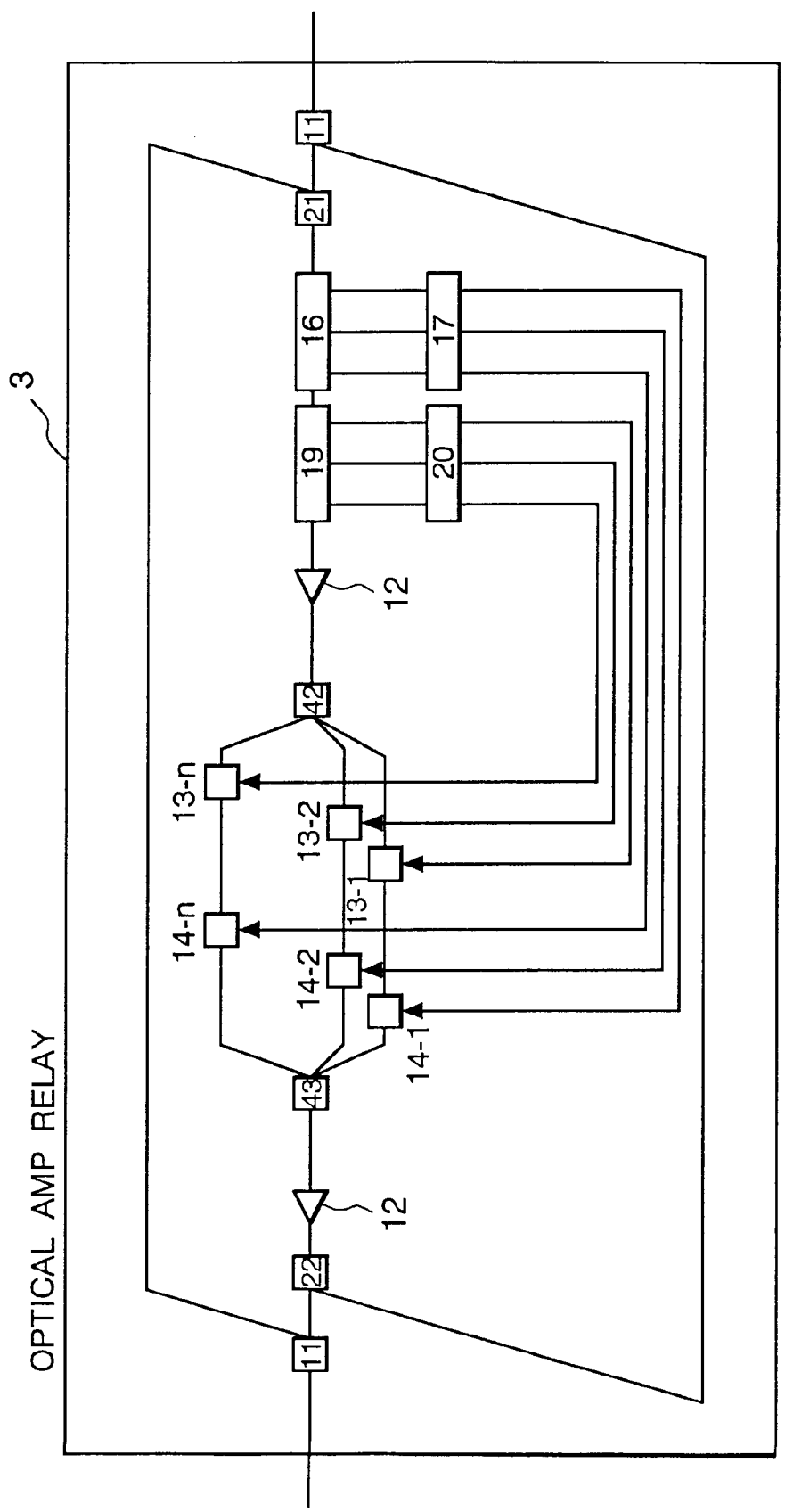
FIG. 18 is a structural block diagram showing an embodiment of the optical amplifier relay unit adopted from FIG. 12, FIG. 13 and FIG. 7.
Figure 19:
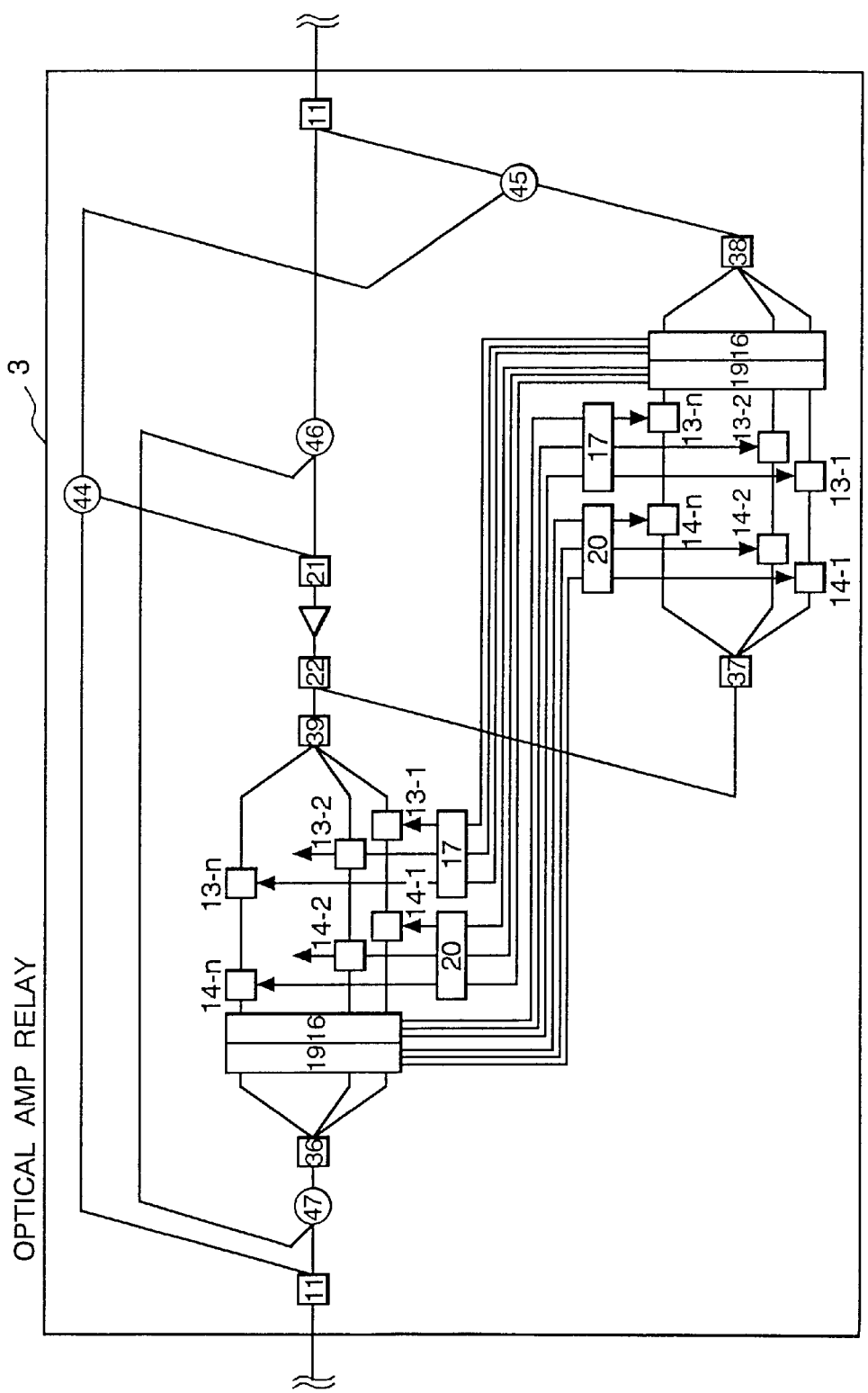
FIG. 19 is a structural block diagram showing an embodiment of the optical input detection unit and the optical control-information input detection unit adopted from FIG. 12 through FIG. 18.

Still further, a derivative example (FIG. 17) of an end terminal unit, and an optical amplifier relay unit (FIG. 18) may be considered, as taken from FIG. 12, FIG. 13 and FIG. 7. The optical input detection unit 16, the optical control-information input detection unit 19, the optical control-information introduction unit 13 and the power control unit 14 inside the optical relay amplifier unit 3 at this time must be made to correspond to the optical signals A1, A2, A3, . . . An, the optical signals B1, B2, B3, . . . Bn, the optical control information A1', A2', A3', . . . An' and the optical control information B1', B2', B3' . . . Bn'. Accordingly, use of the optical couplers 42, 43 for all of the wavelengths is necessary. Further, the portion for the optical input detection unit 16 and the optical control-information input detection unit 19 in FIG. 17 and FIG. 18 from FIG. 12 and FIG. 13 can be configured a shown in FIG. 19. The optical signals A1, A2, A3, . . . An, and the optical control information B1', B2', B3' . . . Bn' in FIG. 19, that passed the optical coupler 11 from the first optical fiber 15 have a portion tapped off by the optical splitter 44. The tapped off light is input to the latter stages of the optical coupler 38, branched off to the specified wavelength path and then input to the optical input detection unit 16 and the optical control-information input detection unit 19. In the same way, the optical signals B1, B2, B3, . . . Bn and the optical control information A1', A2', A3', . . . An' that passed the optical splitter 11 from the second optical fiber 18, are tapped off at a portion by the optical splitter 46. The tapped off (or branched off) light is then input to the latter stages of the optical coupler 36 by the optical splitter 46, and branched off to the specified wavelength path and then input to the optical input detection unit 16 and the optical control-information input detection unit 19.

The optical couplers 36, 37, 38 39 are necessary for the optical control-information introduction unit 13 and the power control unit 14 to branch off optical signals to the specified path but at the same time, optical couplers are required for branching off onto the specified wavelength path, optical signals in the optical input detection unit 16 and the optical control-information input detection unit 19. The optical couplers are commonly shared in the configuration of FIG. 16, and allow obtaining the effect of this invention with a simplified configuration.

Also, the input is from a direction different from the optical signals and optical signal control information passing the optical control-information introduction unit 13 and the power control unit 14 so that the arrangement is capable of high accuracy input detection without exerting adverse effects on the optical signals and optical signal control information.

FIGS. 12 through FIG. 19 are utilized to describe in detail the bidirectional transmission system of FIG. 3. Other adaptations and combinations of these configurations may easily be considered for use.

Figure 20:
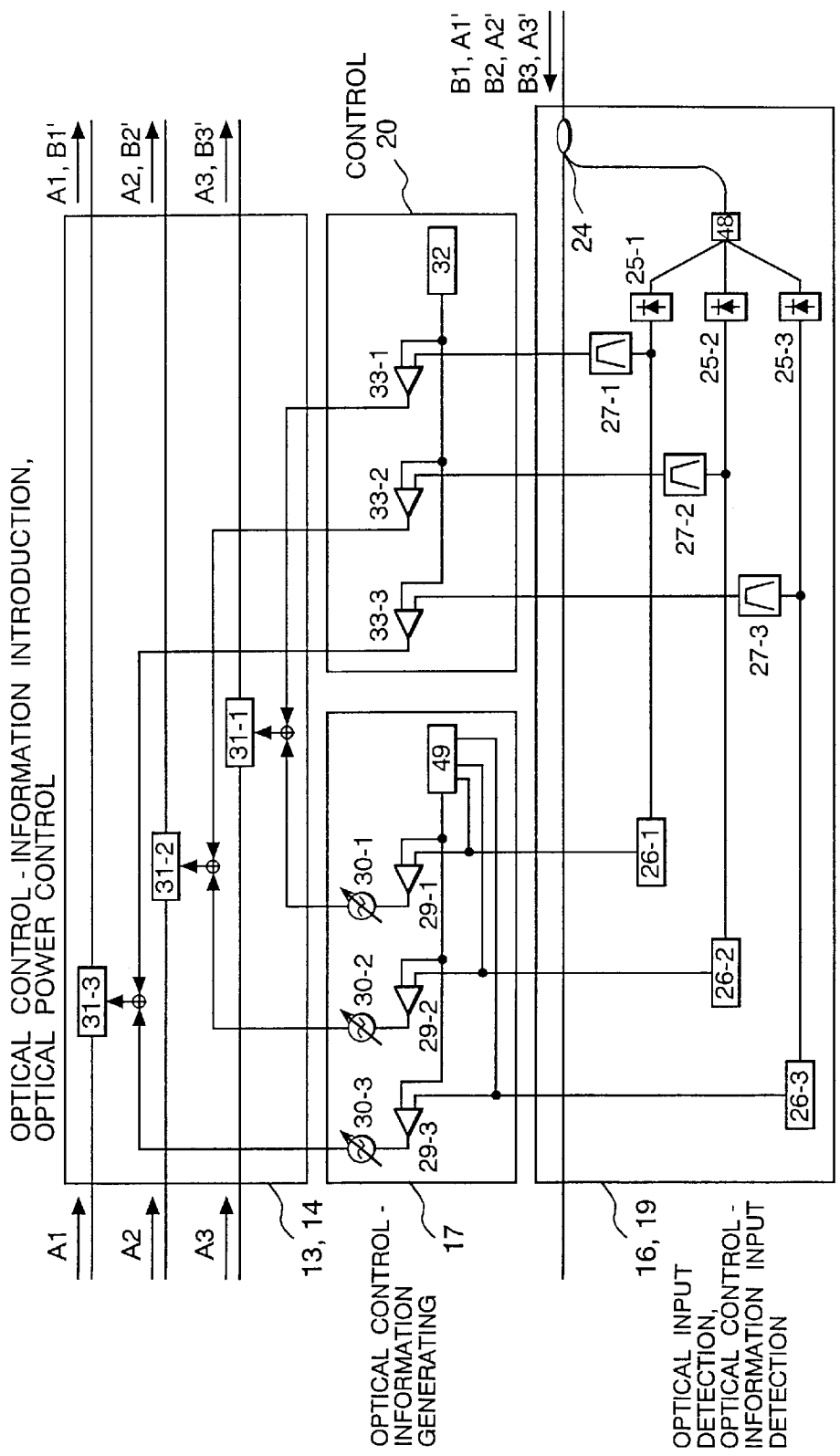
FIG. 20 is a structural block diagram illustrating in detail the optical control information allocation function for the configuration shown in FIG. 12 through FIG. 19.

FIG. 20 is an embodiment of a specific configuration for transmission of optical control information per the configurations in FIG. 12 through FIG. 19.

In the embodiment of FIG. 20, the optical control-information introduction unit 13 and the power control unit 14 in the end terminal unit 1 or the optical relay amplifier unit 3 are integrated into one unit. The optical wavelength of the optical control information is capable of being matched with the optical signal wavelength so that a simple system of this invention can be obtained.

In order to simplify this explanation, it is assumed that the optical control-information B1' (wavelength 1550 nm), B2' (wavelength 1551 nm) B3' (wavelength 1552 nm) is overlapping on the optical signal A1 (wavelength 1550 nm), A2 (wavelength 1551 nm), A3 (wavelength 1552 nm) input to the optical control-information introduction unit 13 and the power control unit 14.

Further, it is assumed that the optical control information A1l (wavelength 1530 nm), A2' (wavelength 1531 nm), A3' (wavelength 1532 nm) is overlapping on the optical signal B1 (wavelength 1530 nm), B2 (wavelength 1531 nm), B3 (wavelength 1532 nm), is input to the optical input detection unit 16 and the optical control-information input detection unit 19.

As is clearly seen, the above explanation is also valid for the optical signals A1, A2, A3 . . . An, the optical signals B1, B2, B3, ... Bn, and the optical control information B1', B2', B3' ... Bn' and the optical control information A1', A2', A3', ... An'.

Any combination may be used if the optical signal and the corresponding optical control information are established beforehand. For instance, the optical signal A1 (wavelength 1550 nm) corresponds to the optical control information A1' (wavelength 1530 nm), the optical signal A2 (wavelength 1551 nm) corresponds to the A2' (wavelength 1531 nm), and the optical signal A3 (wavelength 1552 nm) corresponds to the A3' (wavelength 1532 nm), the optical signal B1 (wavelength 1530 nm) corresponds to the optical control information B1' (wavelength 1550 nm), the optical signal B2 (wavelength 1531 nm) corresponds to the optical control information B2' (wavelength 1551 nm), the optical signal B3 (wavelength 1532 nm) corresponds to optical control information B3' (wavelength 1552) so that an optical control information Am' corresponding to a specified optical signal Am can be set beforehand to identify which optical signal (in this case Bm) is being overlapped.

The optical signals B1, B2, B3, ... Bn and the optical control information A1', A2', A3' ... An' are input to the optical input detection unit 16 and the optical control-information input detection unit 19. A portion of the input light is branched off by the optical splitter 24 and isolated into the respective wavelengths by the optical coupler 48. The optical power for each wavelength is detected in the optical detectors 25-1, 25-2, 25-3. The detected signals are next respectively isolated and one of the detected, isolated signals input to the average detection circuits 26-1, 26-2, 26-3. After detection of the average value of the detected signal, the result is transmitted as the optical power monitor value to the optical control-information generating unit 17.

The other branch of the detection signal on the other hand is input to the frequency detection circuit 27-1, 27-2, 27-3 and after detecting the frequency of the detection signal is transmitted to the control unit 20.

The optical power monitor value transmitted to the optical control-information generating unit 17 is input to the reference setting circuit 49 and the comparators 29-1, 29-2 and 29-3. Of the power monitor values that are input in the reference setting circuit 49, only the maximum power monitor value is used as the reference value and allotted to the comparators 29-1, 29-2 and 29-3.

The power monitor value and the value used as the reference value by the reference setting circuit 49 are compared by means of the comparators 29-1, 29-2 and 29-3 and then transmitted to the variable oscillation circuits 30-1, 30-2 and 30-3. The frequency of the oscillator signal from the variable oscillation circuits 30-1, 30-2 and 30-3 is changed and made equivalent to the size of the frequency corresponding to the reference value and transmitted to the corresponding optical variable gain adjustors 31-1, 31-2, 31-3 in the optical control-information introduction unit 13 and the power control unit 14.

The optical variable gain adjustors 31-1, 31-2, 31-3 are capable of changing the light gain value by means of an external signal. The gain value for the light corresponding to the optical signals A1 (wavelength 1550 nm) A2 (wavelength 1551 nm) and A3 (wavelength 1552 nm) of the optical variable gain adjustors 31-1, 31-2, 31-3 is modulated by the optical control-information generating unit 17; and the result overlapped as the optical signal B1' (wavelength 1550 nm) the optical signal B2' (wavelength 1551 nm) and the optical signal B3' (wavelength 1552 nm) onto the optical signals A1 (wavelength 1550 nm) A2 (wavelength 1551 nm) and A3 (wavelength 1552 nm).

The detected value transmitted to the control unit 20 is compared with a pre-established reference value 32 by means of the comparators 33-1, 33-2, 33-3. The optical control information sent as the size of the frequency in accordance with the compared value is made equivalent in size to the corresponding reference 32 and this control signal sent to the optical variable gain adjustors 31-1, 31-2, 31-3 for the optical control-information introduction unit 13 and the power control unit 14. The gain value for the light of the optical signals A1 (wavelength 1550 nm) A2 (wavelength 1551 nm) and A3 (wavelength 1552 nm) for the optical variable gain adjustors 31-1, 31-2, 31-3 is controlled by means of the control signal from the control unit 20 and transmitted.

When for instance, the deviation in optical wavelength power is controlled to be zero (0) in the optical input detection unit 16 and the optical control-information input detection unit 19 for optical control information B1 (wavelength 1530 nm), B2 (wavelength 1531 nm) B3 (wavelength 1532 nm); the optical power is preferably greater than any of the wavelengths B1 (wavelength 1530 nm), B2 (wavelength 1531 nm) B3 (wavelength 1532 nm).

Thus, in this configuration, of the values detected by the average detection circuits 26-1, 26-2, 26-3, by setting the wavelength of the largest monitor value as the reference value for the reference setting circuit 49, the optical power of the other two wavelengths are capable of being controlled to match the optical power of the wavelength with the largest monitor value. The reference setting circuit 49 may be configured to allow selecting the average value of the total power or the smallest value of the largest optical power, as the reference value. Also, when the deviation of zero (0) is set for the normally specified wavelength, the configuration may be designed to allow the optical power monitor value of that wavelength to be selected as the reference value.

Further, when control is needed of another wavelength having a fixed deviation, the above mentioned one optical power monitor value is set as the matching reference value for the comparator 29 and a reference value having the pre-established deviation and a reference value corresponding to the other comparator 29 may be sent.

A detailed description of the function of the configuration in FIG. 20 is related next. If the deviation for all of the optical power monitor values is zero (0), in other words, if the reference setting circuit 49 in a normal state has a reference value that is a power monitor value for one of the wavelengths, then the output from the comparator 29 is zero (0). Accordingly, all of the variable oscillation circuits 30-1, 30-2, 30-3 oscillate at an oscillation frequency of for instance 20 kHz and as a result, the gain value for the optical variable gain adjustors 31-1, 31-2, 31-3 inside the optical power control unit 14 are all modulated at 20 kHz.

Also, if for instance the optical signal B2 input monitor value has a −3 dB drop compared to the optical signal B1, and the optical signal B3 input monitor value has a −5 dB drop compared to the optical signal B1, then the reference value of the reference setting circuit 49 becomes the input monitor value for B1. At this point, the output from the comparator 29-1 is zero (0) and a minus (negative) signal is output from the comparators 29-2, 29-3. The variable oscillation circuit 30-1,oscillates at a frequency of 20.0 kHz in compliance with the above comparator output and the variable oscillation circuit 30-2 oscillates at a frequency of for instance 17.0 kHz , and the variable oscillation circuit 30-3 oscillates at a frequency of 15.0 kHz . As a result, the optical gain value of the variable optical gain adjustor 31-1 is modulated at 20.0 kHz (optical control information B1'), the optical gain value of the variable optical gain adjustor 31-2 is modulated at 17.0 kHz (optical control information B2'), and the optical gain value of the variable optical gain adjustor 31-3 is modulated at 15.0 kHz (optical control information B3').

Conversely, if for instance the optical signal B3 input monitor value has a −3 dB drop compared to the optical signal B1, and the optical signal B2 input monitor value has a −5 dB drop compared to the optical signal B1, then the reference value of the reference setting circuit 49 becomes the input monitor value for the optical signal B3. At this point, the output from the comparator 29-3 is zero (0) and a minus (negative) signal is output from the comparators 29-1, 29-2. The variable oscillation circuit 30-3 oscillates at a frequency of 20.0 kHz in compliance with the above comparator output and the variable oscillation circuit 30-1 oscillates at a frequency of for instance 17.0 kHz , and the variable oscillation circuit 30-2 oscillates at a frequency of 15.0 kHz . As a result, the optical gain value of the variable optical gain adjustor 31-3 is modulated at 20.0 kHz (optical control information B3'), the optical gain value of the variable optical gain adjustor 31-1 is modulated at 17.0 kHz (optical control information B1'), and the optical gain value of the variable optical gain adjustor 31-2 is modulated at 15. kHz (optical control information B2').

The optical signals A1, A2, A3, and the optical control information B1', B2', B3' are input to the optical input detection unit 16 and the optical control-information input detection unit 19. Along with the detection of the input power of the optical signals A1, A2, A3, the frequencies of the optical control information B1', B2', B3' are also detected in the frequency detection circuits 27-1, 27-2, 27-3. If the detected frequencies are 20.0 kHz for the optical control information B1', 17.0 kHz for the optical control information B2' and 15.0 kHz for the optical control information B3', then a zero (0) is output from the comparator 33-1 since the reference value 32 is equivalent to 20 kHz and as a result, the gain value for the light of the variable optical gain adjustor 31 is maintained.

However, when a negative signal is output from the comparators 33-2 and 33-3, the gain value of the light of variable optical gain adjustor 31-2, 31-3 corresponding to the optical signals B2, B3 responds to this negative signal is changed to increase the gain. As a result, the optical power of the optical signals B1, B2, B3 is now capable of feedback control so that the deviation in optical input detection unit 16 and the optical control-information input detection unit 19 becomes zero (0). The same operation is also performed in the reverse direction for the optical signal A.

The bit rates used here for the optical signals A1, A2, A3 and B1, B2, B3 have a high speed of at least 1 Megabyte per second and even when simultaneously overlapped with a modulation signal of about 20 kHz there is no effect on the optical signals A1, A2, A3 and B1, B2, B3. There is no effect because a slow signal of about 20 kHz is easily trapped and eliminated in the optical receiving unit 7.

Further, this modulation signal is not limited to 20 kHz and may be a different frequency. However, when devices are installed having functions to suppress fluctuations in optical power or the modulation frequency on the system circuit for allotting the optical control information, then for instance if even at least one optical amplifier 12 is installed to maintain the output at a fixed level, the frequency should preferably be from 1 kHz to 1 MHz.

The reason being that generally, a frequency capable of suppressing optical power to a fixed level at the output of the optical amplifier 12 is 1 kHz or less and suppressing power fluctuations below 1 kHz will also the adverse effect of eliminating the optical control information.

Therefore a frequency from 1 kHz to 1 MHz is preferable to ensure reliable transmission of information without exerting an effect on the optical signal. Conversely, when performing output control to a fixed level on the optical amplifier 12, the frequency range for suppressing power fluctuations must be lower than the frequency for modulating the optical control information.

This configuration showed both power adjustment and modulation performed by means of an optical control-information introduction unit 13 and an optical power control unit 14 however these functions may be isolated and performed separately.

Also, according to this configuration, the optical control information A1' A2', A3' is is allotted (sent) along with the optical signals B1, B2, B3 however since optical control information (for instance C') is newly overlapped by the next optical power control unit 14 and the optical control-information introduction unit 13, so the optical control information A1' A2', A3' is automatically deleted.

Accordingly, the optical control information can be sent without being mixed with the optical control information A1' A2', A3' of the previous stage.

Further, by simultaneously overlapping the optical control information on the optical signal moving in the opposite direction, the optical information can be easily transmitted without installing a new signal path for the optical control information.

The medium for transmitting the optical control information is an optical signal so control can be performed at an exceedingly high speed even over long distances.

Also in this configuration, the information relating to optical power is sent in succession however when the optical power in the optical input detection unit 16 is fixed continuously over a long time, the optical power maybe fixed once the optical control information is sent and the optical power may then be controlled to a specific value by the optical power control unit 14. In cases where fluctuations in optical power occur over an extremely slow period in the optical input detection unit 16, the optical power control unit 14 may be adjusted intermittently over a fixed time period.

As transmission mediums this invention is further not limited to optical fibers for optical signal transmission paths or paths for transmission of information. For instance, this invention is also effective on transmission mediums in which optical power fluctuations are likely to occur after transmission of the optical signal.

The medium for sending optical control information is not limited to an optical signal in the reverse direction and a medium may be newly installed for sending optical control information. For instance, an optical control signal of a wavelength differing from that of the newly installed optical transmission unit can be transmitted and the optical control information thus sent. In this way, a control configuration can be achieved which exerts absolutely no effect on the optical signal that must be transmitted.

On the other hand, this configuration is also adaptable to cases in which for instance, on the three wavelength paths on which the optical variable gain adjustors 31-1, 31-2, 31-3 are installed, each of the 2, 3, 4 type optical wavelength signals are grouped as (A1, A2) (A3, A4, A5), (A6, A7, A8, A9) and transmitted.

At this time, in the optical control-information introduction unit 13 since the optical control information is overlapped on each group, the same optical control information is overlapped on all the optical wavelength signals of the same group. Accordingly, these groups may normally be detected by the optical input detection unit 16 and the optical control-information input detection unit 19. In such a configuration, even in the unlikely event that an optical wavelength signal inside a group is lost, the other optical signals within the same group will transmit the optical control information so that control can still be achieved without cutting off the information transmission.

In the above configuration, an optical amplifier 12 is installed in the post stages of the optical input detection unit 16 and the optical control-information input detection unit 19 however the optical input detection unit 16 and the optical control-information input detection unit 19 may instead be installed at the rear stage of the optical amplifier 12. However, the wavelength dependence of the gain of the optical amplifier 12 is known to change according to the rate of amplification. Accordingly, when installing the optical input detection unit 16 in the rear stages of the optical amplifier 12, the amplification rate of the optical amplifier 12 should be maintained at a fixed rate. The reason being that a fixed amplification rate allows suppressing changes in the gain due to wavelength dependence and because subtracting the wavelength dependence from the optical power of the rear stages of the optical amplifier 12 allows obtaining a remaining value which matches the optical power in the front stages of the optical amplifier 12.

In the same way, when an optical input detection unit 16 or an optical control-information input detection unit 19 is installed in the rear stages of the optical amplifier unit 12, the deviation in gain within the wavelength after the optical amplifier unit 12 is affected by the optical amplifier however, the signal peak noise ratio (amplified spontaneous emission of optical components from the optical amplifier) is maintained both prior to and after the amplifier. Accordingly, a substitute figure for the deviation in gain within a wavelength in the prestages of the optical amplifier unit 12 can be obtained using the ratio of the specific peak optical power and the amplified spontaneous emission in that vicinity.

Figure 21:
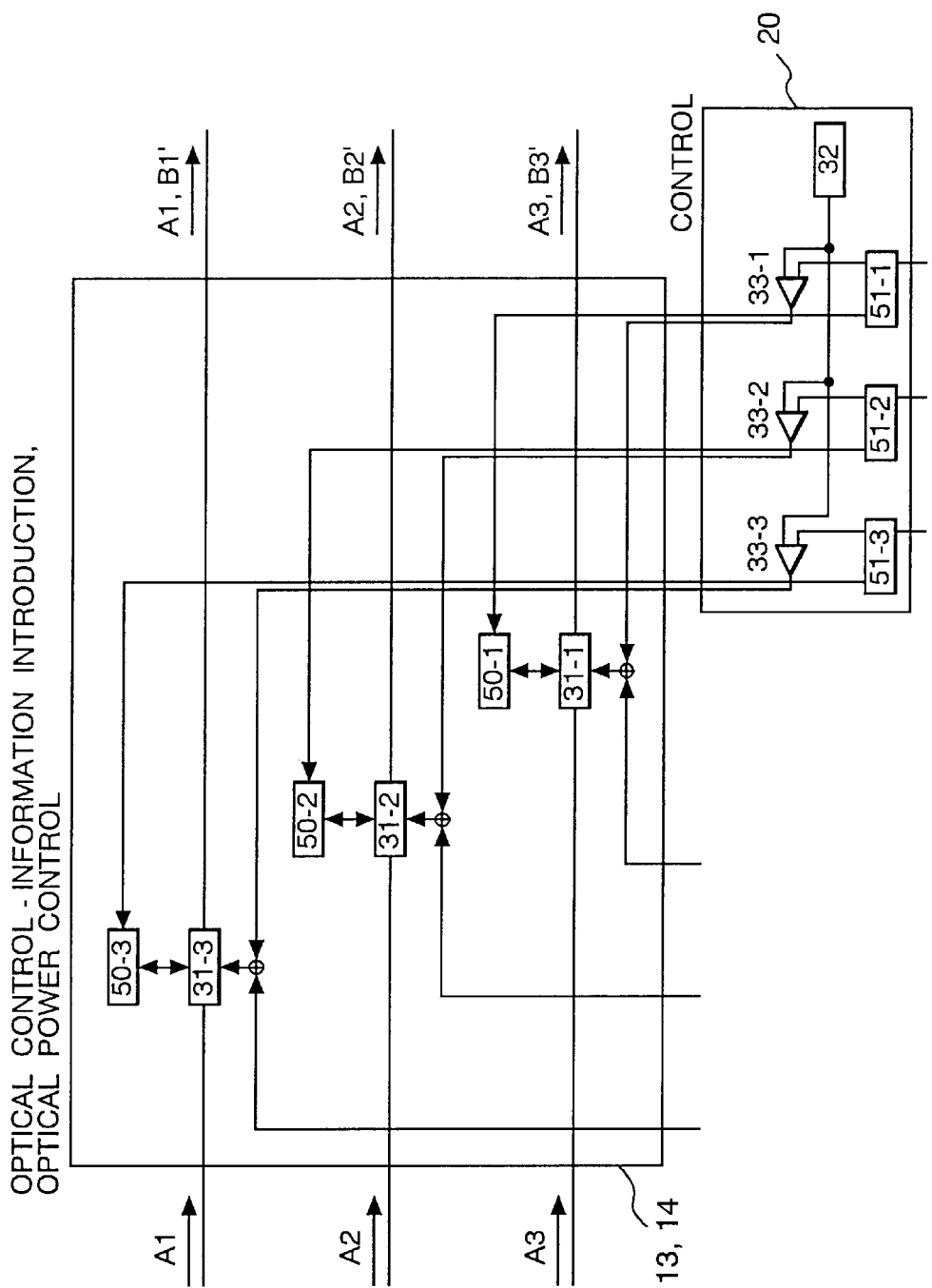
FIG. 21 is a structural block diagram showing the first countermeasure when the optical control information has been cut off due to some cause.

When the optical control information is cut off for some reason in any of the above cases, a countermeasure must be implemented in order to ensure control stability and transmission system reliability. FIG. 21 shows an example of a first countermeasure method.

Inside the optical control-information introduction unit 13 and the power control unit 14, the adjustment values of the optical variable gain adjustors 31-1, 31-2, 31-3 is stored as an average value for a fixed time in the hold circuits 50-1, 50-2, 50-3. When a cutoff or interruption of the optical control information is detected by means of the optical control information cutting detection circuits (or loss of optical control-information detection circuit) 51-1, 51-2, 51-3 installed inside the control unit 20, the detection results are transmitted to the hold circuits 50-1, 50-2, 50-3. The optical variable gain adjustors 31-1, 31-2, 31-3 up until now controlled with signals from the comparators 33-1, 33-2, 33-3 are stored as adjustment values in the hold circuits 50-1, 50-2, 50-3 in an arrangement allowing control and switching.

In a configuration of this type, even if the optical control information is cut off, the optical variable gain adjustors 31-1, 31-2, 31-3 are capable of holding correct values from the past information and are well able to maintain a reliable system allowing simple and stable control.

In an example of the second countermeasure method, though not shown in the drawing, when for instance an optical control information A2' is cut off, the average frequency value of A3' and the frequency value of the optical control information A1' is set as the optical control information A2' that is cut off. Generally, the deviation in gain in wavelength in an optical transmission system is a characteristic that changes smoothly versus the wavelength. Accordingly, the average values of the optical signal A1 and A3 which adjoin the optical signal A2 can be processed to yield information extremely close to that of the optical information A2'.

Figure 22:
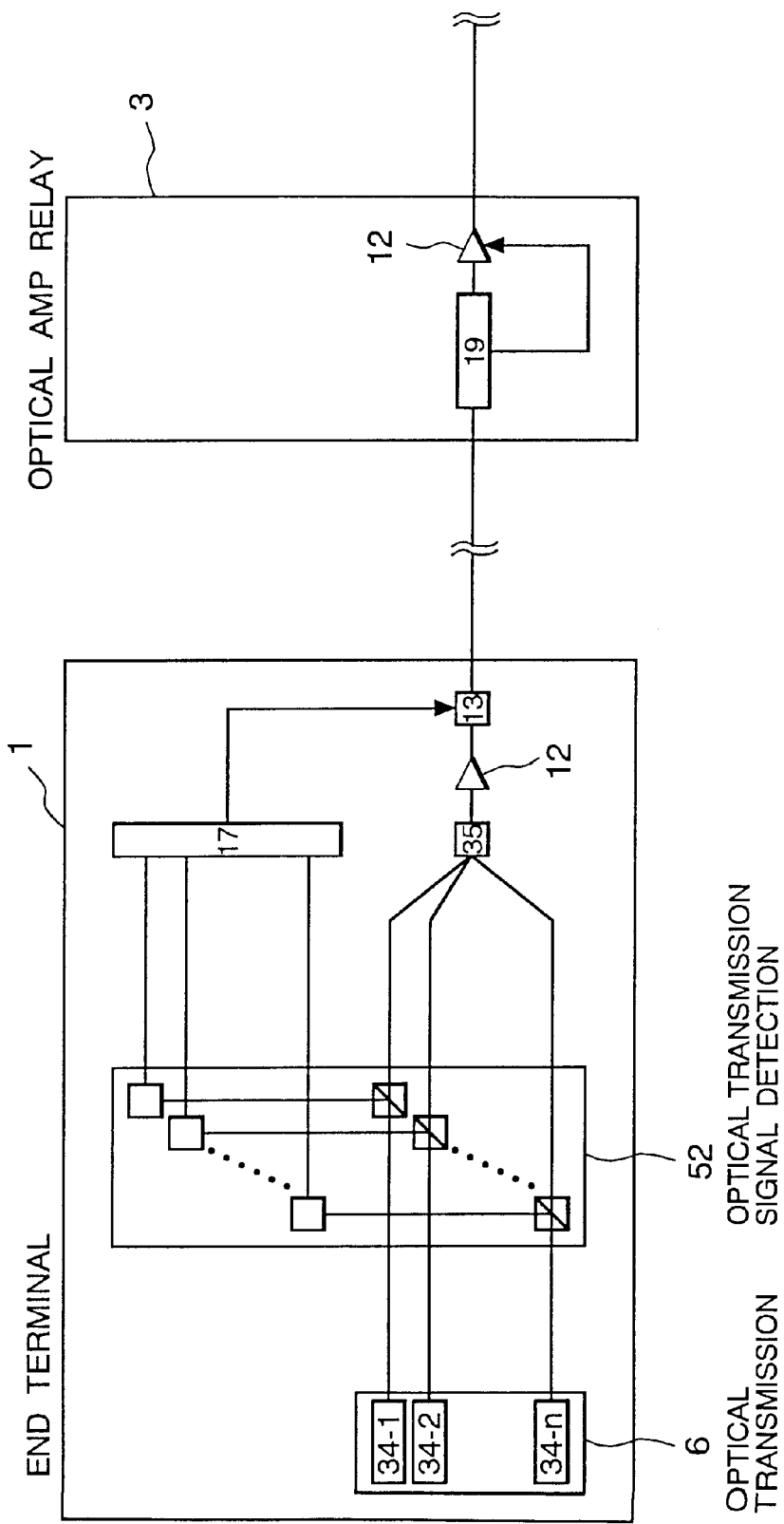
FIG. 22 is a structural block diagram showing the second countermeasure when the optical control information has been cut off due to some cause.

FIG. 22 shows an example derived from the end terminal unit 1. The optical transmission unit 6 is comprised of the optical transmitters 34-1 through 34-n. A portion of each of the optical signal that are sent are tapped off (branched off) by means of the optical transmission detection circuit 52 and this branched off light is detected and the detection results transmitted to the optical control-information generating unit 17. The presently used wavelengths are counted in the optical control-information generating unit 17 and transmitted as optical information to the optical variable gain adjustor 31 inside the optical control-information introduction unit 13 and then sent to the final stages of the optical amplifier relay unit 3 or the end terminal unit (not shown in drawing). By means of this information, the optical power and gain of the optical amplifier 12 are switched in order to obtain a specific optical output in the final stages of the optical amplifier relay unit or the end terminal unit (not shown in drawing) The switching medium in this configuration is limited to an optical amplifier and may for instance be an an optical switch or an optical receiving unit.

The position to report changes in the wavelength constant is not limited to the end terminal station, and preferably is the point where changes in the wavelength constant occur such as for instance the optical switch.

Further, if the wavelength constant to be switched to is determined beforehand, prior to counting the wavelength constant by detecting the actual optical power, then this wavelength constant can be sent as optical control information to make the configuration capable of switching to the correct gain or optical power as needed and the optical signal can be stably transmitted without delay during switching.

Figure 23:
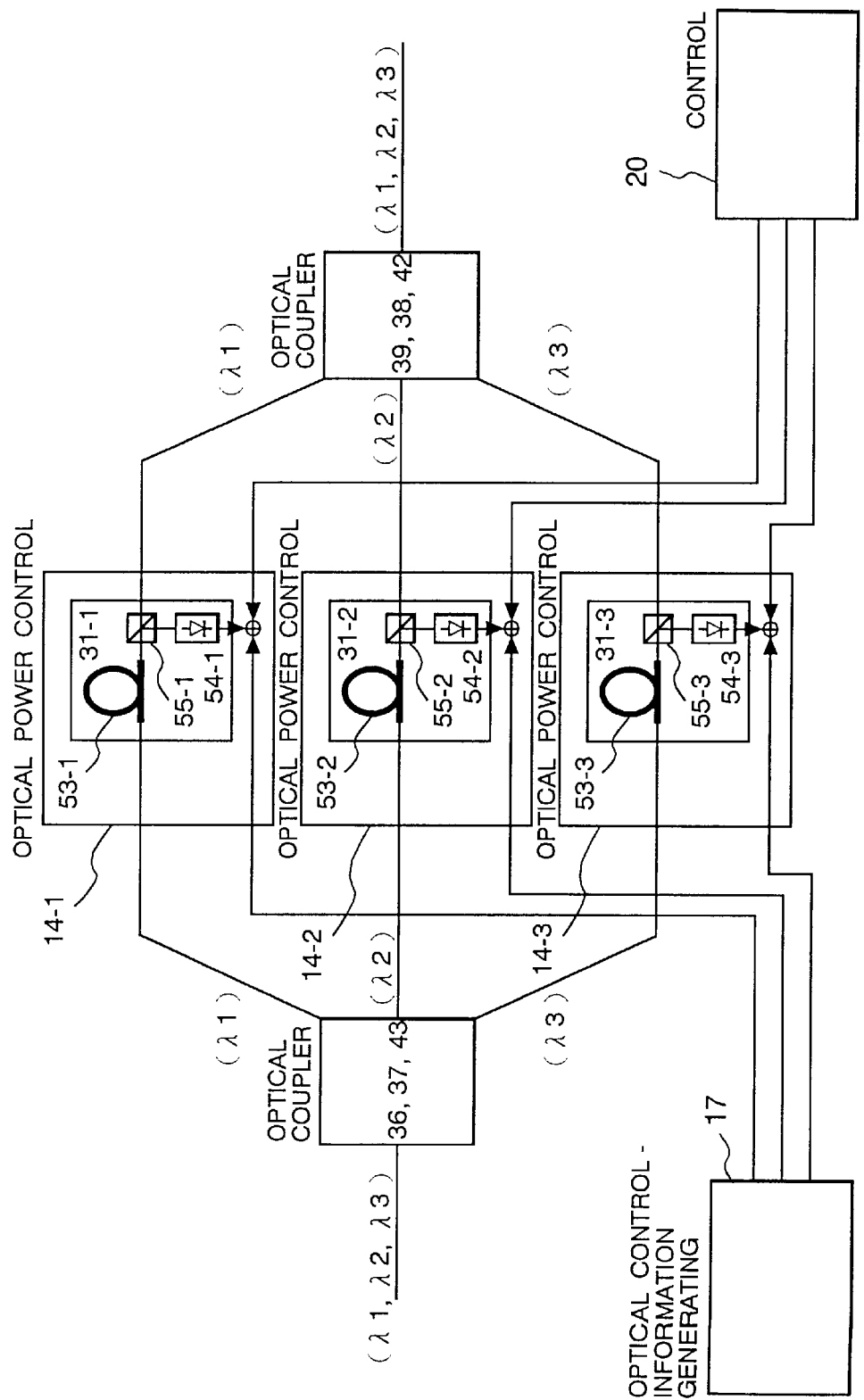
FIG. 23 is a structural block diagram showing a specific embodiment of the optical coupler and the optical power control unit.

FIG. 22 shows a specific configuration of the optical power control unit 14 and an optical coupler. The configuration of FIG. 23 is described in Japanese Patent Laid-Open No. 8-278523 and the corresponding US application 08/626951 is hereby incorporated by reference. This configuration is comprised of an optical couplers 26, 27, 43 to couple an optical signal into the signal wavelength band $\lambda 1$, $\lambda 2$, $\lambda 3$, an optical power control units 14-1, 14-2, 14-3 to adjust the optical power of $\lambda 1$, $\lambda 2$, $\lambda 3$, branched off into the respective paths, and optical couplers 39, 38, 42 to merge the adjusted wavelength bands $\lambda 1$, $\lambda 2$, $\lambda 3$.

The optical variable gain adjustors 31-1, 31-2, 31-3 inside the optical power control units 14-1, 14-2, 14-3 are comprised of rare-earth doped optical fiber 53-1, 53-2, 53-3 such as for instance optical fiber with erbium added, a pumping light source (or optical pumping source) 54-1, 54-2 54-3 such as for instance a 1480 semiconductor laser, and optical couplers 55-1, 55-2, 55-3. By adjusting the excitation light of the pumping light source 54-1, 54-2 54-3, the optical signals of the wavelength band input to the optical power control units 14-1, 14-2, 14-3 are capable of being respectively amplified or attenuated.

The configuration of FIG. 23 has optical power control unit installed on every path however the wavelength deviation can be set so that the power output or gain of one wavelength band is equivalent to a reference value. Accordingly, the optical power control unit 14-1 may for instance be omitted. Also, in the configuration of FIG. 20, the explanation is for three paths in order to simplify the description however when splitting into n paths, optical power control units can be installed in parallel and the optical coupler constant increased in order to handle the output. Further, the optical signal wavelength band $\lambda n$ is defined by the wavelength by the wavelength intervals and $\lambda n$ can contain any number of signal wavelengths.

The above information described the Japanese Patent Laid-Open No. 8-278523 however in this invention, the configuration of FIG. 23 is also comprised of a pumping light sources 54-1, 54-2 54-3 in the optical power control units 14-1, 14-2, 14-3 controlled by the optical control-information generating unit 17 or the control unit 20. This arrangement allows optical control information to be generated by the optical power control units 14-1, 14-2, 14-3 and the optical power to be adjusted at the same time.

Figure 24:
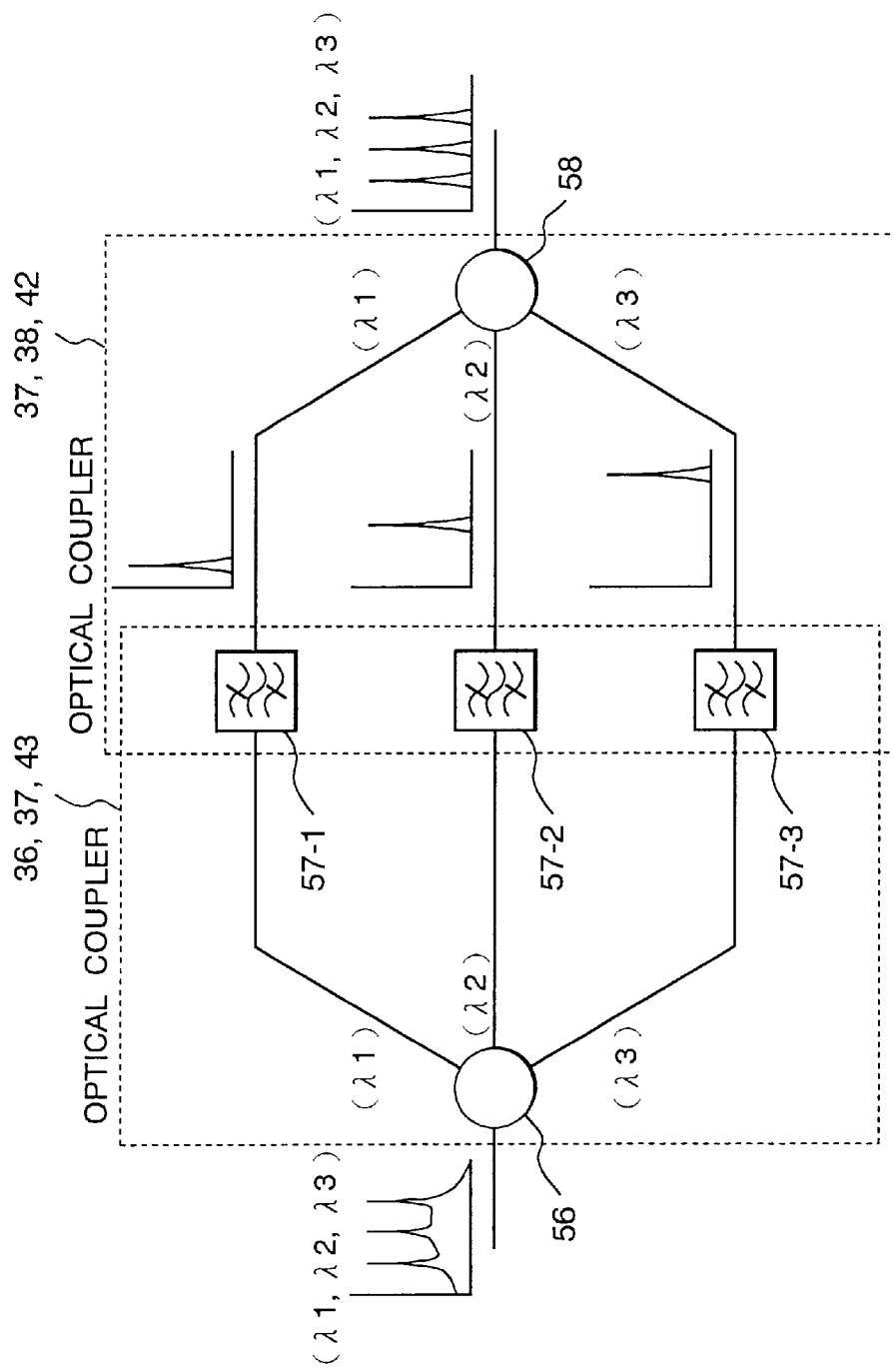
FIG. 24 is a structural block diagram describing in detail the optical coupling step.

Further, the optical coupler shown in FIG. 23 may use as one example, the configuration shown in the Japanese Patent Laid-Open No. 8-278523 and in such a case the overall configuration is shown in FIG. 24.

The optical power control units 14-1, 14-2, 14-3 are omitted from FIG. 24 in order to simplify the explanation. In the figure, the light is split into three equal parts by a 1×3 optical star coupler 56. Next, of these equal portions of light, the light of $\lambda 1$ only is passed through the optical filter 57-1 having a bandpass for $\lambda 1$, the light of $\lambda 2$ only is passed through the optical filter 57-2 having a bandpass for $\lambda 2$, and the light of $\lambda 3$ only is passed through the optical filter 57-3 having a bandpass for $\lambda 3$. These wavelengths are also capable of being coupled by a 1×3 optical star coupler.

Here, if $\lambda 1 > \lambda 2 > \lambda 3$, a low band-pass filter may also be utilized as the optical filter 57-1 as a filter to block the wavelengths $\lambda 2$, $\lambda 3$. Also, a high band-pass filter may be utilized as the optical filter 57-3 to block light not less for instance than $\lambda 3$.

These optical couplers 36, 37, 43, 38, 39, 42 may allow high precision optical power adjustment of each wavelength. When the number of overlapped wavelengths bands is increased such as with $\lambda 1, \lambda 2, \lambda 3, \lambda 4, \ldots \lambda n$, the number of optical star couplers 56, 58 may be increased correspondingly, and the number of optical filters 57 also increased to match the number of couplers.

Needless to say, the optical couplers may be capable of coupling to each wavelength band and are not limited to the 1×3 optical star couplers 56, 58. The example of the optical variable gain adjustors 31 is described in more detail using FIG. 25 as related in the Japanese Patent Laid-Open No. 8-278523. In order to simplify the description, the optical variable gain adjustors 31-n is utilized in the figure. However, for actual use a variable gain adjustor is preferably configured to match the wavelength dependence in the respective path according to the amount of attenuation, amplification or attenuation and amplification on each path, and if the variable gain adjustors arrayed in parallel are absolutely the same then such variable gain adjusters are not required.

Figure 25:
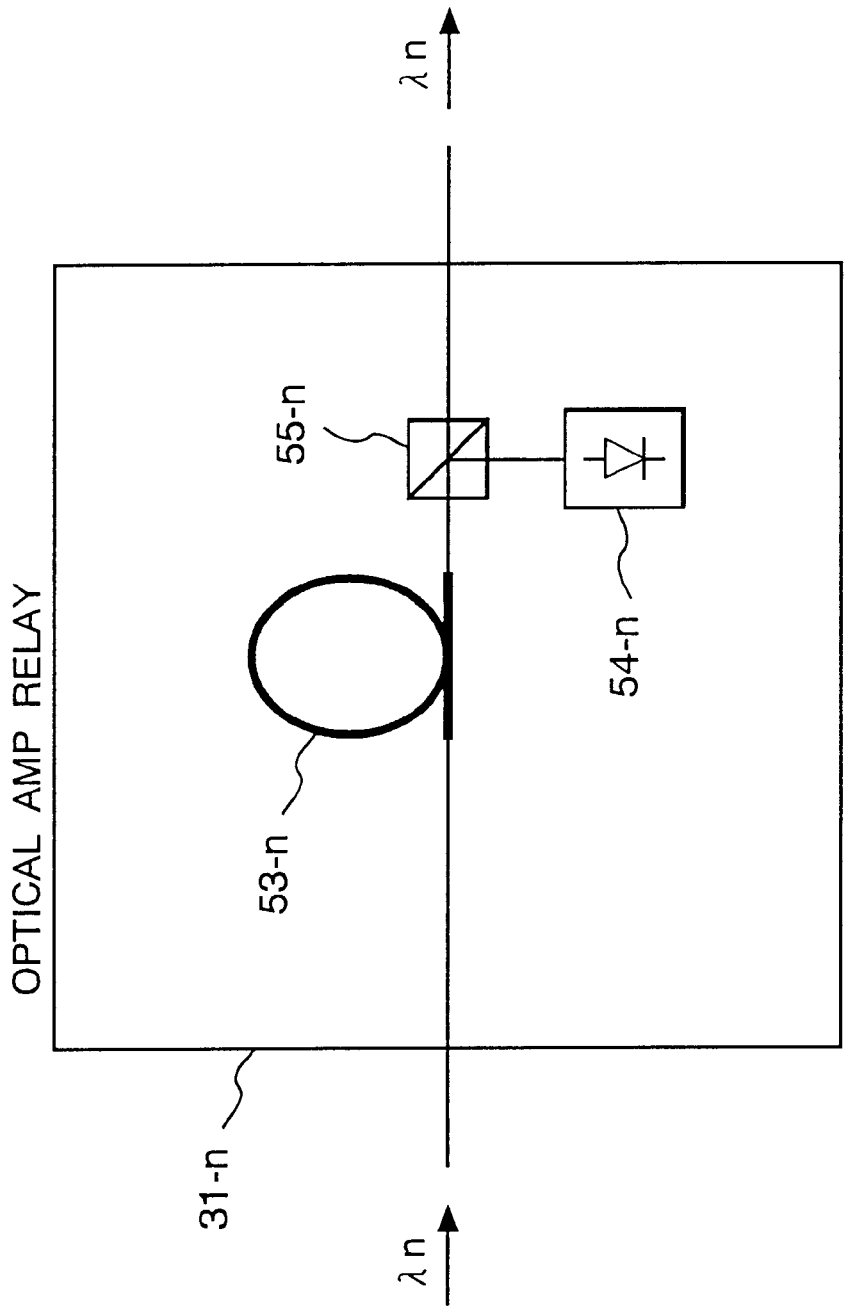
FIG. 25 is a structural block diagram describing in detail the optical variable gain adjustor.

In FIG. 25, if the pumping light source 54-n is for instance an excitation light emitted from an 820 nm light emitting diode, then the excitation light is supplied to the rear end of the (erbium) rare-earth doped fiber 53-n by way of the optical coupler 55-n and pumping performed. The $\lambda n$ is input from the front side of the (erbium) rare-earth doped fiber 53-n and after receiving amplification or attenuation is then output.

The pumping light source 54-n is controlled externally from the optical control-information generating unit 17 (not shown in drawing) or the control unit 20 (not shown in drawing). Here, the excitation light may also be input from the prestages of the (erbium) rare-earth doped fiber 53-n. Also, a semiconductor amplifier may also be utilized as the optical variable gain adjustor 31-n and in such cases the excitation current may be controlled from the optical control-information generating unit 17 (not shown in drawing) or the control unit 20.

The reason for using the optical variable gain adjustor 31-n in the configuration of FIG. 25 is given next. Generally, optical amplifiers utilized in optical amplifying mediums, function to amplify the light when excitation power is being applied, however when the excitation power being supplied is small or is zero (0), then the light is utilized as an attenuation medium. In the example in FIG. 22, the optical variable gain adjustor 31-n is comprised of a rare-earth doped fiber 54-n, a pumping light source 54-n and an optical coupler 55-n so that when the pumping (excitation) power is small the optical variable gain adjustor 31-n can function to have a negative gain, and when the pumping (excitation) power is large, the optical variable gain adjustor 31-n can function to have a positive gain.

The optical power is capable of being adjusted just by increasing or decreasing the pumping (or excitation) power so that a optical variable gain adjustor 31-n can be provided capable of being simply and easily set for optical output power, gain or deviation in wavelength on each separate wavelength. Further, the amplification wavelength band has a width sufficient to cover the band of the multiplexed (overlapped) signal so an optical variable gain adjustor 31-n can be provided for use on each of the respective wavelengths.

The erbium rare-earth doped fiber 53-n utilized in this configuration does not require an excessive amplification characteristics so an optical fiber of a dozen meters or a fiber waveguide of a dozen or so centimeters will suffice. Generally, pumping (or exciting) the rare-earth doped fiber causes an amplified spontaneous emission light discharge which is the noise components of the light. This amplified spontaneous emission has little total additive content within the rare-earth doped fiber and is capable of being suppressed, the less the power of the pumping source. Accordingly, the total additive content of erbium is preferably within 50000 ppm per meter, and the pumping light source power is preferably within 30 milliwatts. Further, the erbium need not always be in a fiber shape and may be added to the lens, etc.

In the above description, the output of the 830nm light emitting diode 54-n is within 50 milliwatts as used in the pumping light source 54-n. Generally, when using rare-earth doped fibers as amplification mediums, a high output semiconductor laser having a wavelength of 980 nm or 1480 nm will be effective in providing high gain. However in FIG. 22, the pumping light source 54-n used in the optical variable gain adjustor 31-n as described above is more than adequate for use even in low output light sources or light sources having bandwidths with low gain. Accordingly, the applicable range of the pumping light source 54-n usable in this configuration is wide and can for instance be utilized with low output light sources in for instance the vicinity of 520 nm, 660 nm, 820 nm, 980 nm and 1480 nm. The light emitting diode 54-n used in the vicinity of 830 nm in this configuration is particularly suitable in terms of a low cost and procurability and so can be used to comprise the optical variable gain adjustor 31-n at a low cost.

Figure 26:
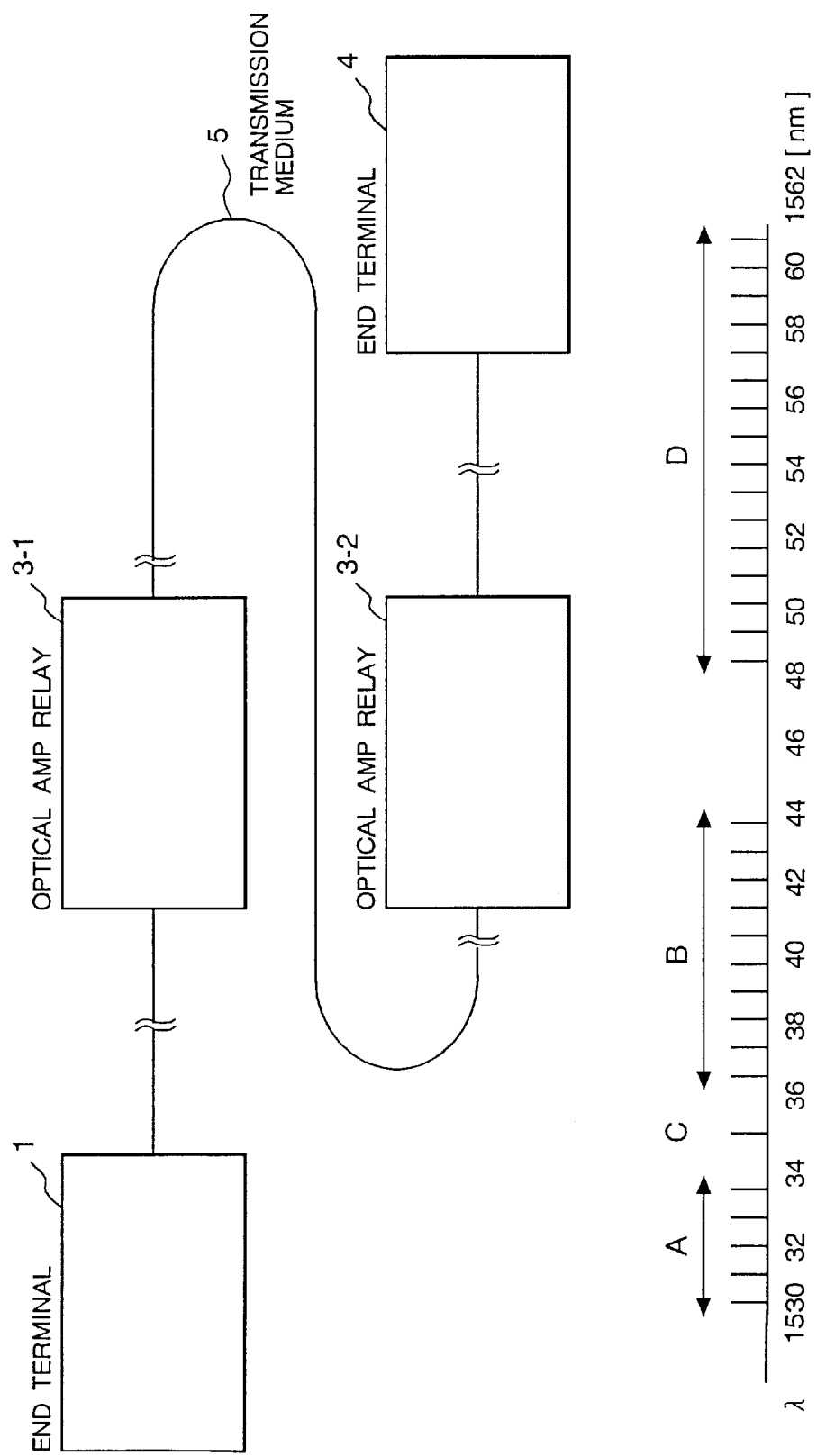
FIG. 26 is a structural block diagram showing another adaptation of this invention.

Another adaptation of this invention is shown in FIG. 26. In this figure, the end terminal unit 1, the first optical amplifier relay unit 3-1, the second optical amplifier relay unit 3-2, and the end terminal unit 4 are all connected by an approximately 90 kilometer transmission 5 in a bidirectional optical transmission system. A multiplexed wavelength signals u1 to u16, and v1 to v16 are transmitted bidirectionally between the end terminal units 1 and 4.

Figure 27:
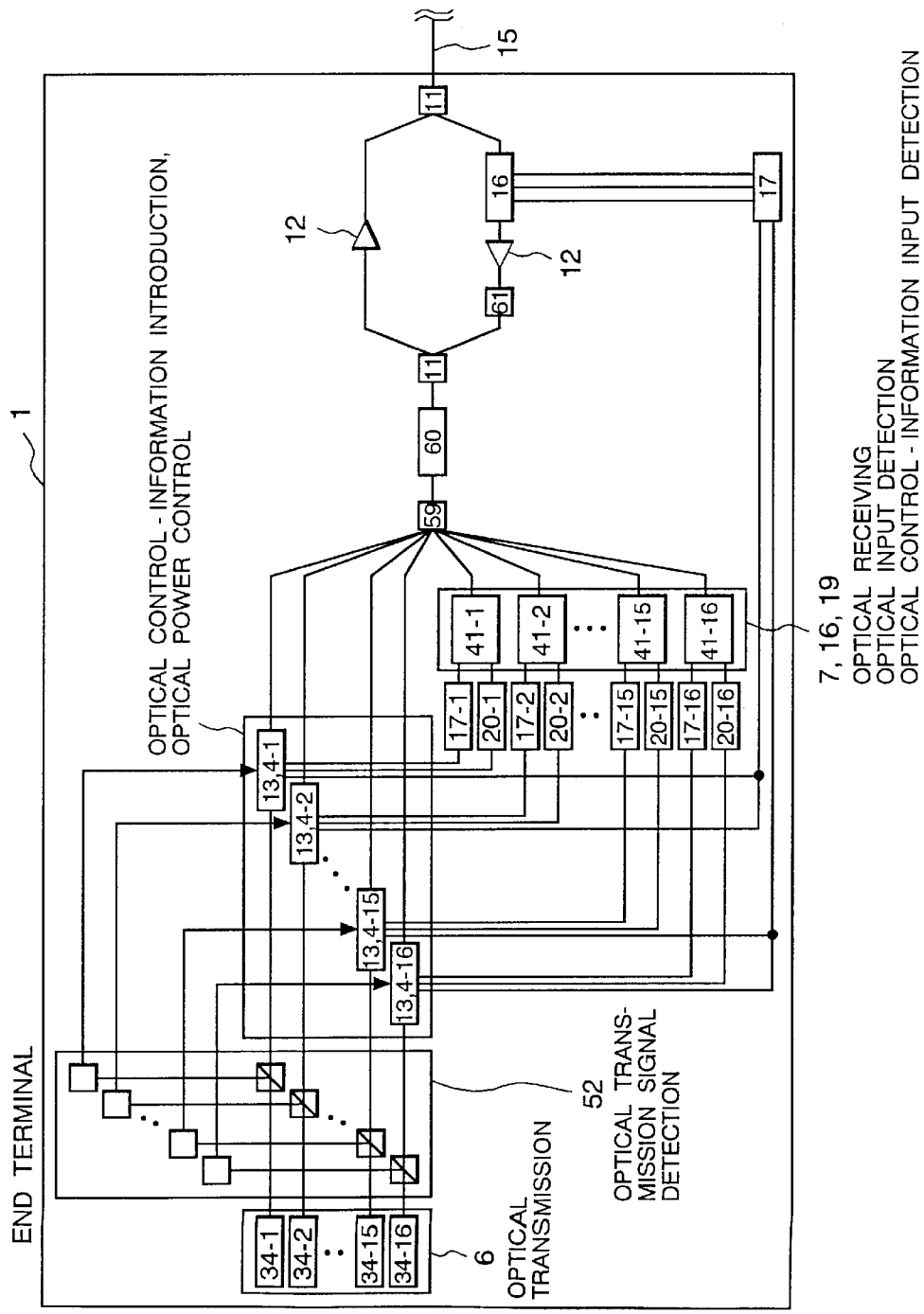
FIG. 27 is a structural block diagram showing a specific embodiment of the end terminal unit.

In FIG. 27, a detailed structural view of the end terminal units 1 and 4 is shown. The end terminal unit 1 layout is shown in the drawing. The optical transmission unit 6 is comprised of the optical transmitter 34-1 (u1=1548.51 [nm]), the optical transmitter 34-2 (u2=1549.32 [nm]), the optical transmitter 34-3 (u3=1550.12 [nm]), the optical transmitter 34-4 (u4=1550.92 [nm]), the optical transmitter 34-5 (u5=1551.72 [nm]), the optical transmitter 34-6 (u6=1552.52 [nm]), the optical transmitter 34-7 (u7=1553.33 [nm]), the optical transmitter 34-8 (u8=1554.13 [nm]), the optical transmitter 34-9 (u9=1554.94 [nm]), the optical transmitter 34-10 (u10=1555.75 [nm]), the optical transmitter 34-11 (u11=1556.55 [nm]), the optical transmitter 34-12 (u12=1557.36 [nm]), the optical transmitter 34-13 (u13=1558.17 [nm]), the optical transmitter 34-14 (u14=1558.98 [nm]), the optical transmitter 34-15 (u15=1559.75 [nm]), the optical transmitter 34-16 (u16=1560.61 [nm]) and transmits a 16 channel optical signal. Here, $\lambda 3$ is set for 1554.13±7.2 [nm]. The $\lambda 3$ is a wavelength band including at least the optical signals u1 to u16.

The transmitted optical signals are branched off at portion by the optical signal transmission detection circuit 52. The branched off (or tapped off) light is detected and the detection results transmitted to the optical variable gain adjustors 31 for the corresponding wavelength in the optical control-information introduction unit 13 and the power control unit 14. In the event a cut off of the transmission signal is detected, this arrangement functions to stop the optical variable gain adjustors 31.

Further, the optical transmission signals that passed the optical signal transmission detection circuit 52, then input the optical control information by means of the optical control-information introduction unit 13 and the power control unit 14 and also, after adjustment of the optical power, are coupled in a single fiber by means of optical couplers. The now coupled, multiplexed (overlapped) optical signal is passed through a dispersion compensator to compensate for dispersion which is characteristic of optical fibers and is also passed through a coupler. After amplification by way of an optical amplifier 12, the optical signal is then input to a optical fiber by way of an optical coupler. Here, the dispersion comparator 60 may be installed in both the prestages and poststages of the optical amplifier unit.

On the other hand in the end terminal unit 4 on the other end, the optical transmission unit 6 is comprised of th e optical transmitter 34-1 (v1=1530.33 [nm]), the optical transmitter 34-2 (v2=1531.12 [nm], the optical transmitter 34-3 (v3=1531.90 [nm]), the optical transmitter 34-4 (v4=1532.68 [nm]), the optical transmitter 34-5 (v5=1533.47 [nm]), the optical transmitter 34-6 (v6=1534.25 [nm], the optical transmitter 34-7 (v7=1535.04 [nm]), the optical transmitter 34-8 (v8=1535.82 [nm]), the optical transmitter 34-9 (v9=1538.19 [nm]), the optical transmitter 34-10 (v10=1538.98 [nm]), the optical transmitter 34-11 (v11=1539.77 [nm]), the optical transmitter 34-12 (v12=1540.56 [nm]), the optical transmitter 34-13 (v13=1541.35 [nm]), the optical transmitter 34-14 (v14=1542.14 [nm]), the optical transmitter 34-15 (v15=1542.94 [nm]), the optical transmitter 34-16 (v16=1543.73 [nm]) and transmits a 16 channel optical signal. Here, $\lambda 1$ is set for 1533.08±$\lambda$3.2 [nm] and $\lambda 2$ is set for 1540±3.2 [nm]. Also, $\lambda 2$ is a wavelength band including at least the optical signals v1 to v16.

The transmitted optical signals are branched off at portion by the optical signal transmission detection circuit 52. The branched off (or tapped off) light is detected and the detection results transmitted to the optical variable gain adjustors 31 for the corresponding wavelength in the optical control-information introduction unit 13 and the power control unit 14. In the event a cut off of the transmission signal is detected, this arrangement functions to stop the optical variable gain adjustors 31.

The optical transmission signals that passed the optical signal transmission detection circuit 52, then input the optical control information by means of the optical control-information introduction unit 13 and the power control unit 14 and also, after adjustment of the optical power, are coupled in a single fiber by means of the optical coupler 59. The now coupled, multiplexed (overlapped) optical signal is passed through a dispersion compensator 60 to compensate for dispersion which is characteristic of optical fibers and is also passed through a coupler 11. After amplification by way of an optical amplifier 12, the optical signal is then input to a optical fiber 15 by way of an optical coupler. Here, the dispersion comparator 60 may be installed in both the prestages and poststages of the optical amplifier unit 12.

In the end terminal unit 1, the optical signals v1 through v16 are input to the optical coupler 11 by way of the optical fiber 15 and then input to the optical control-information input detection unit 19. The optical control-information input detection unit 19 is involved with the optical amplifier relay unit 3 and so is described later on. The optical signal that passed the optical control-information input detection unit 19, passes through the optical amplifier 12 and the gain equalizing filter 61 and is input to the optical coupler 11. Further, after compensation of the dispersion amount in the dispersion compensator 60, the optical signal is received in the optical receivers 41-1 through 41-16 by way of the optical coupler 59 corresponding to the optical receiving unit 7 and the optical input detection unit 16 and the optical control-information input detection unit 19.

In the end terminal unit 4, the optical signals u1 through u6 from the optical fiber are input to optical coupler and then input to the optical input detection unit 16 and the optical control-information input detection unit 19. The optical control-information input detection unit 19 relates to the optical amplifier relay unit 3 and so is described later on. The optical signal that passed the optical control-information input detection unit 19, passes through the optical amplifier 12 and the gain equalizing filter 61 and is input to the optical coupler 59. Further, after compensation of the dispersion amount in the dispersion compensator 60, the optical signal is received in the optical receivers 41-1 through 41-16 by way of the optical coupler 59 corresponding to the optical receiving unit 7 and the optical input detection unit 16 and the optical control-information input detection unit 19. The gain equalizing filter 61 eliminates the wavelength gain dispersion of the optical amplifier 12.

In the end terminal units 1 and 4, the input power values detected in the optical receiving unit 7, the optical input detection unit 16 and the optical control-information input detection unit 19 are sent to the optical control-information generating unit 17 and information relating to the size of the target value for the optical power monitor value is sent from the optical control-information generating unit 17 to the optical control-information introduction unit 13. By this process, the optical control information v1' through v16' are respectively multiplexed onto the optical signals u1 through u16 and the optical control information u1' through u16' are multiplexed onto the optical signal v1 through v16. In parallel with this process, the optical control information u1' through u16' or v1' through v16' are detected by way of the optical control-information input detection unit 19 in the end terminal units 1 and 4, and the detected information is sent to the control unit 20. The control unit 20 complies with this information and makes the optical power control units 14-1 through 14-16 function to adjust the power within the specified value. In this point, the process does not differ from the above mentioned configuration.

Figure 28:
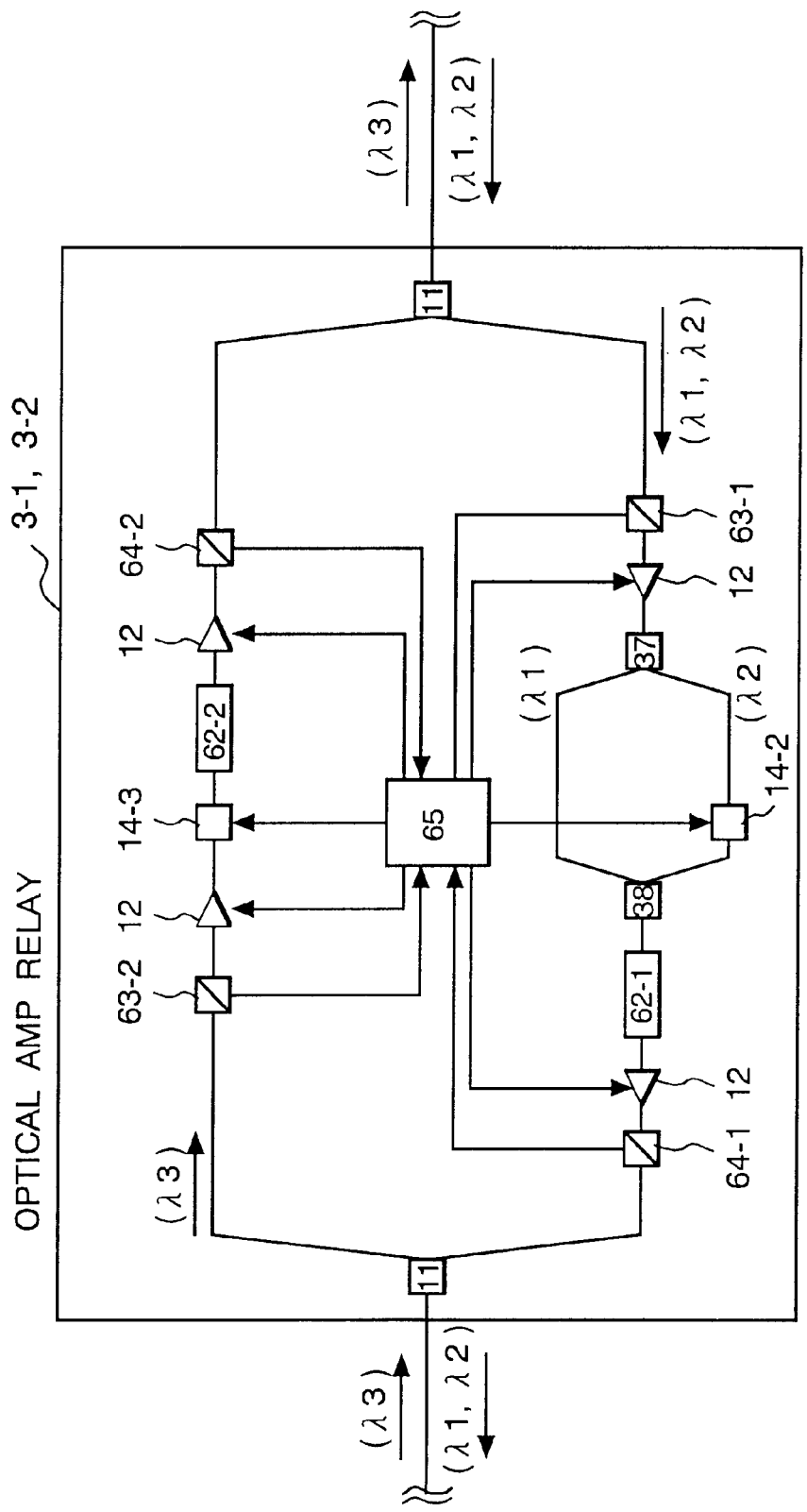
FIG. 28 is a structural block diagram showing a specific example of an embodiment of the optical amplifier relay unit.
Figure 29:
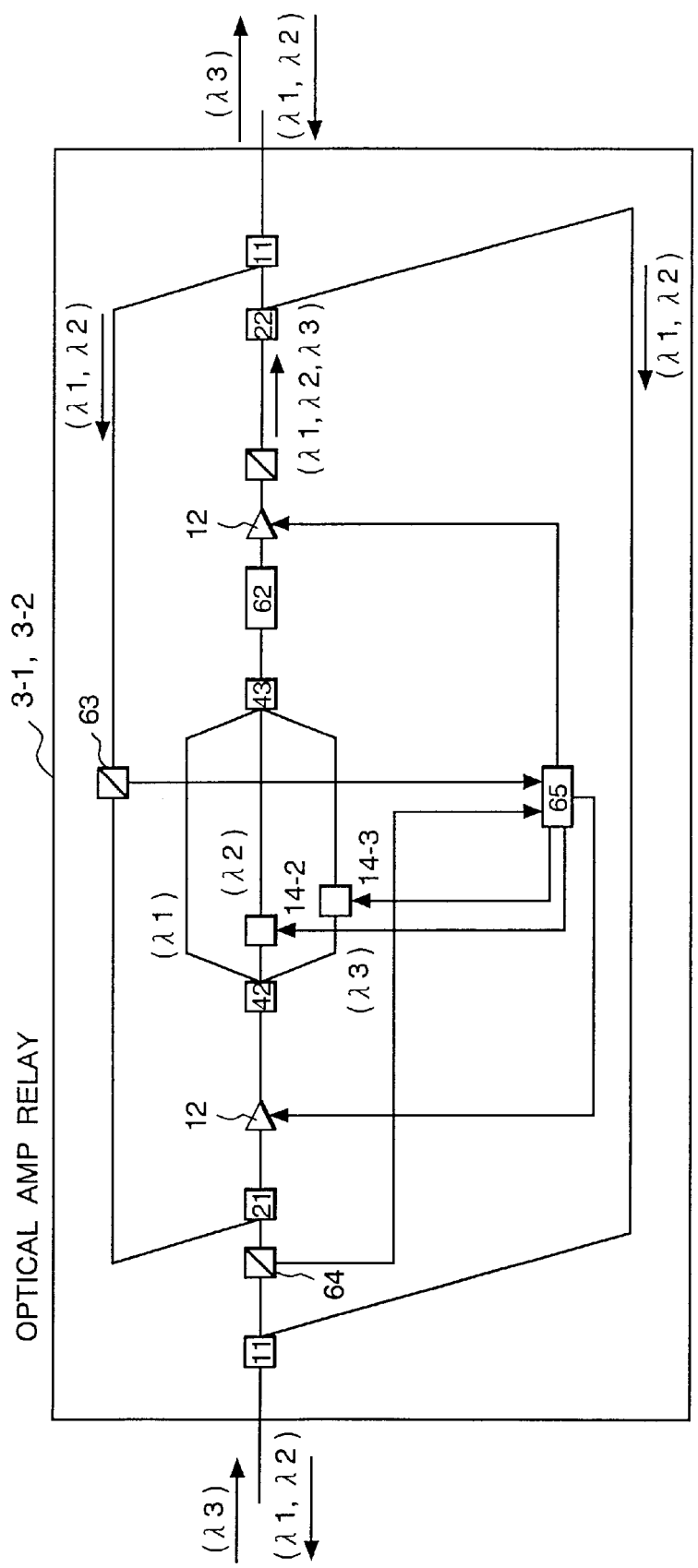
FIG. 29 is a structural block diagram showing a specific example of another embodiment of the optical amplifier relay unit.

Next, a detailed structural layout of the optical amplifier relay unit 3-1 and the optical amplifier relay unit 3-2 is shown in FIG. 28 and FIG. 29. FIG. 28 is an adaptation of the configuration explained in detail by means of FIG. 13. FIG. 29 on the other hand, is an adaptation of the configuration explained in detail by means of FIG. 18.

In FIG. 28 and FIG. 29, the optical signals $\lambda 1$ and $\lambda 2$ are input to the optical amplifier relay unit 3-1 from the right while the optical signal $\lambda 3$ is input from the left. Both FIG. 28 and FIG. 29 are explained according to the method utilized in the Japanese Patent Laid-Open No. 8-278523 for branching off (or distributing) the signal wavelength band into $\lambda 1$, $\lambda 2$ and $\lambda 3$ and performing separate adjustments of each.

The optical signals in FIG. 28 are coupled beforehand into ($\lambda 1$), ($\lambda 2$,) and ($\lambda 3$) by means of an optical coupler 11 and the optical couplers 38 and 38 divide ($\lambda 1$), ($\lambda 2$,) in two paths in order to pass different paths and undergo amplification.

In FIG. 29, since the optical signals ($\lambda 1$, $\lambda 2$, $\lambda 3$) pass a single path and are amplified, a configuration branching ($\lambda 1$) ($\lambda 2$,) and ($\lambda 3$) into three paths by means of the optical couplers 42, 43 is utilized. In any case, the effect of the invention can be increased by utilizing the method described in the Japanese Patent Laid-Open No. 8-278523.

The configuration of FIG. 28 is explained first. The optical signal $\lambda 3$ (as well as the optical control information v1' through v16') is passed through the optical input detection unit 63-2 and amplified in the optical amplifier unit 12, and after adjustment in the optical power control unit 14-3 is input to the dispersion compensator 62-2. The optical signal A3 (as well as the optical control information v1' through v16') from the dispersion compensator 62-2, is amplified by the optical amplifier 12 and after passing through the optical input detection unit 64-2, is sent along the transmission path by the optical coupler 11.

The optical input detection unit 63-2 detects a portion of the A3 (as well as the optical control information v1' through v16') and a detection signal is then derived from a portion of $\lambda 3$ (as well as the optical control information v1' through v16') by the optical input detection unit 64-2. The control unit 65 then regulates the amount of amplification from the optical amplifier 12 and also controls the optical power control unit 14-3 in this configuration.

This configuration controls only the amount of amplification from the optical amplifier 12 by means of the detection signal detected with the optical input detection unit 64-2, and the output power of $\lambda 3$ (as well as the optical control information v1' through v16') is controlled to reach +17 dBM.

On the other hand, the signal detected by the optical input detection unit 63-2 is adjusted to a certain amount by the optical power control unit 14-3. In the optical amplifier 12, the gain equalizing is wavelength dependent, changing according to the input power. The optical power control unit 14-3 as described in the Japanese Patent Laid-Open No. 8-278523, control is performed according to the input power to the optical amplifier 12 so that wavelength dependence of the gain equalizing is capable of being eliminated.

The optical signals $\lambda 1$ and $\lambda 2$ (as well as the optical control information u1' through u16') is passed through the optical input detection unit 63-2 and amplified in the optical amplifier unit 12 after which the optical coupler 37 branches the optical signals $\lambda 1$ and $\lambda 2$ into two paths. After the now branched off optical signal $\lambda 1$ is sent as is to the optical coupler 38 and the optical signal 72 adjusted in the optical power control unit 14-2, the two signals are merged in the optical coupler 38 and passed through the dispersion compensator 62-1. The optical signals 1 and $\lambda 2$ are then amplified in the optical amplifier 12, passed through the optical input detection unit 64-1 and sent to the transmission path by means of the optical coupler 11.

Based on the signal detected by the optical input detection unit 63-1 from a portion of the optical signals $\lambda 1$ and $\lambda 2$ (as well as the optical control information u1' through u16') and detected by the optical input detection unit 64-1 from a portion of the amplified optical signals $\lambda 1$ and $\lambda 2$ (as well as the optical control information u1' through u16'), the control unit 65 is configured to control both the amplification amount of the optical amplifier 12 and the optical power control unit 14-2.

In this configuration for instance, just the amplification rate of the optical amplifier 12 is controlled by means of the detection signal detected by the optical input detection unit 63-1, and with the optical signals $\lambda 1$ and $\lambda 2$ (as well as the optical control information u10 through u16') control is achieved to reach a total output power of +17 dBm. On the other hand, control of just the adjustment amount of the optical power control unit 14-2 by means of the signal detected by the optical input detection unit 64-1 so that power of the optical signals $\lambda 1$ and $\lambda 2$ are equivalent to each other or so that control is achieved to eliminate the wavelength dependence on gain equalization.

The configuration of FIG. 29 is explained next. The optical signals $\lambda 1$, $\lambda 2$ and $\lambda 3$ (as well as the optical control information u1' through u16' and v1 through v16') pass through the optical coupler 21 and after amplification in the optical amplifier 12, pass through the optical coupler 42 and are isolated into three paths. The optical signals $\lambda 1$, $\lambda 2$ and $\lambda 3$ are adjusted by means of the optical power control units 14-2, 14-3 installed on two of these three paths and by the remaining single path.

The three paths mentioned above are again merged into one path by the optical coupler 43, passed through the dispersion compensator 62 and then amplified by the optical amplifier 12. Based on a portion of the optical signals $\lambda 1$, $\lambda 2$ and $\lambda 3$ (as well as the optical control information u1' through u16' and v1' through v16') detected by the optical input detection unit 63 and a portion of the optical signals $\lambda 1$, $\lambda 2$ and $\lambda 3$ (as well as the optical control information u1' through u16' and v1' through v16 ') detected by the optical input detection unit 64; the control unit 65 in this configuration achieves control by means of the amplification rate of the optical amplifier 12 and the optical power control units 14-2, 14-3.

In this configuration for instance, the amplification rate of the optical amplifier 12 is controlled by means of the signal detected with the optical input detection unit 63 and control is achieved so that the combined optical signals $\lambda 1$, $\lambda 2$ and $\lambda 3$ (as well as the optical control information u1' through u16' and v1' through v16') from the optical amplifier 12 reach a total power of +17 dBm.

On the other hand, the adjustment amount of the optical power control unit 14 is controlled by means of the detection signal detected with the optical input detection unit 64 and the optical signals λ1, λ2 and λ3 (as well as the optical control information v1' through v16') and the optical signals λ1, λ2 and λ3 (as well as the optical control information u1' through u16') so that the respective power of these optical signals is equivalent. The controlled optical signals λ1, λ2 and λ3 (as well as the optical control information v1' through v16') and the optical signals λ1, λ2 and λ3 (as well as the optical control information u1' through u16') are once again sent bidirectionally along the optical fibers 15 and 18 by means of the optical coupler 11.

In an actual system, the length of the optical fibers connecting both ends of the optical amplifier relay unit 3-1 will not be exactly the same and the amount of optical loss will differ. Accordingly, the respective total input power of optical signals λ1, λ2 and λ3 (as well as the optical control information v1' through v16') and the optical signals λ1, λ2 and λ3 (as well as the optical control information u1' through u16') input to the optical amplifier relay unit 3-1 will differ. In the method suited for the conventional art for simply achieving a fixed control of the total power or gain of the optical amplifier 12, these differing inputs will result in differing gains or outputs, bringing about the problem that, according to the direction, the optical signal power from the optical amplifier relay unit 3-1 will vary. However, by utilizing the control in this configuration, the total power of the optical signal can be sent which will be equivalent in both directions.

Figure 30:
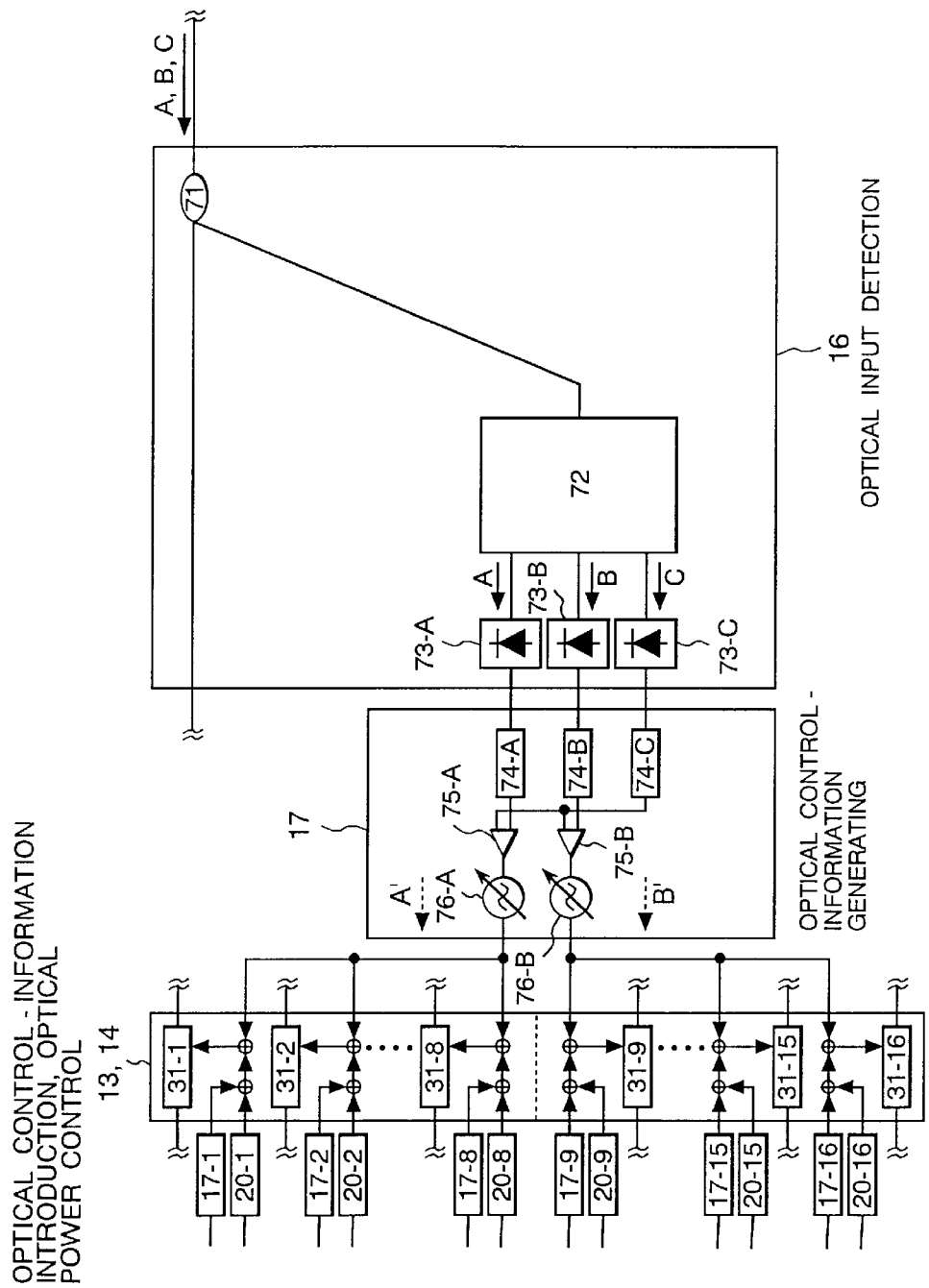
FIG. 30 is a structural block diagram showing in detail, the functions of the optical control-information input detection unit, the optical control-information generating unit, the optical power control unit, as well as the optical control-information introduction unit in the end terminal unit.

Next, the functions of the optical control-information input detection unit 19, the optical control-information generating unit 17, the optical power control unit 14 and the optical control-information introduction unit 13 in the end terminal unit 1 will be described utilizing FIG. 30.

As related before, the optical input detection unit 16 and the optical control-information input detection unit 19 control the optical variable gain adjustors 31 for each wavelength. A portion of the optical input signal groups A, B, C are split up by the optical splitter coupler 71 inside the optical input detection unit 16 and isolated into the first path, the second path and the third path by means of the optical coupler 72 and are respectively detected by the optical detectors 73-A, 73-B, 73-C. The detected input monitor values are input to the average detection circuits 74-A, 74-B, 74-C and the average monitor value matching the optical signal group C is compared with the average monitor values matching the optical signal group A and the optical signal group B in the comparators 75-A, 75-B. A frequency is generated by the variable oscillation circuits 76-A, 76-B according to the difference versus the average monitor value of the optical signal group C, and set at the optical control information group A' of the optical signal group A and the optical control information group B' of the optical signal group B.

As shown in the figure, the optical variable gain adjustors 31-1 through 31-16 divide beforehand the optical control information group A' and optical control information group B' into two groups. So that for instance, the optical signals u1 through u8 corresponding to the optical variable gain adjustors 31-1 through 31-8 are taken for optical control information group A'; and the optical signals u9 through u16 corresponding to the optical variable gain adjustors 31-9 through 31-16 are taken for optical control information group B'. This configuration makes the optical variable gain adjustors function for the group corresponding to frequencies from the variable oscillation circuits 76-A, 76-B and finds the optical control information group A' and the optical control information group B' from the end terminal unit 1.

The optical control information group A' and the optical control information group B' from the end terminal unit 1 pass through the optical amplifier relay units 3-1, 3-2 and are input to to the end terminal unit 4. The structure of the end terminal unit 4 is basically the same as the end terminal unit 1 however the optical input detection unit 16 for detecting the difference in the optical control information A, B, C of the optical signal groups is replaced by the optical control-information input detection unit 19 for detecting the optical control information groups A' and B'.

The compensation of optical loss is further easily and effectively performed when an optical amplifier is installed between the optical couplers 36 and 38.

Figure 31:
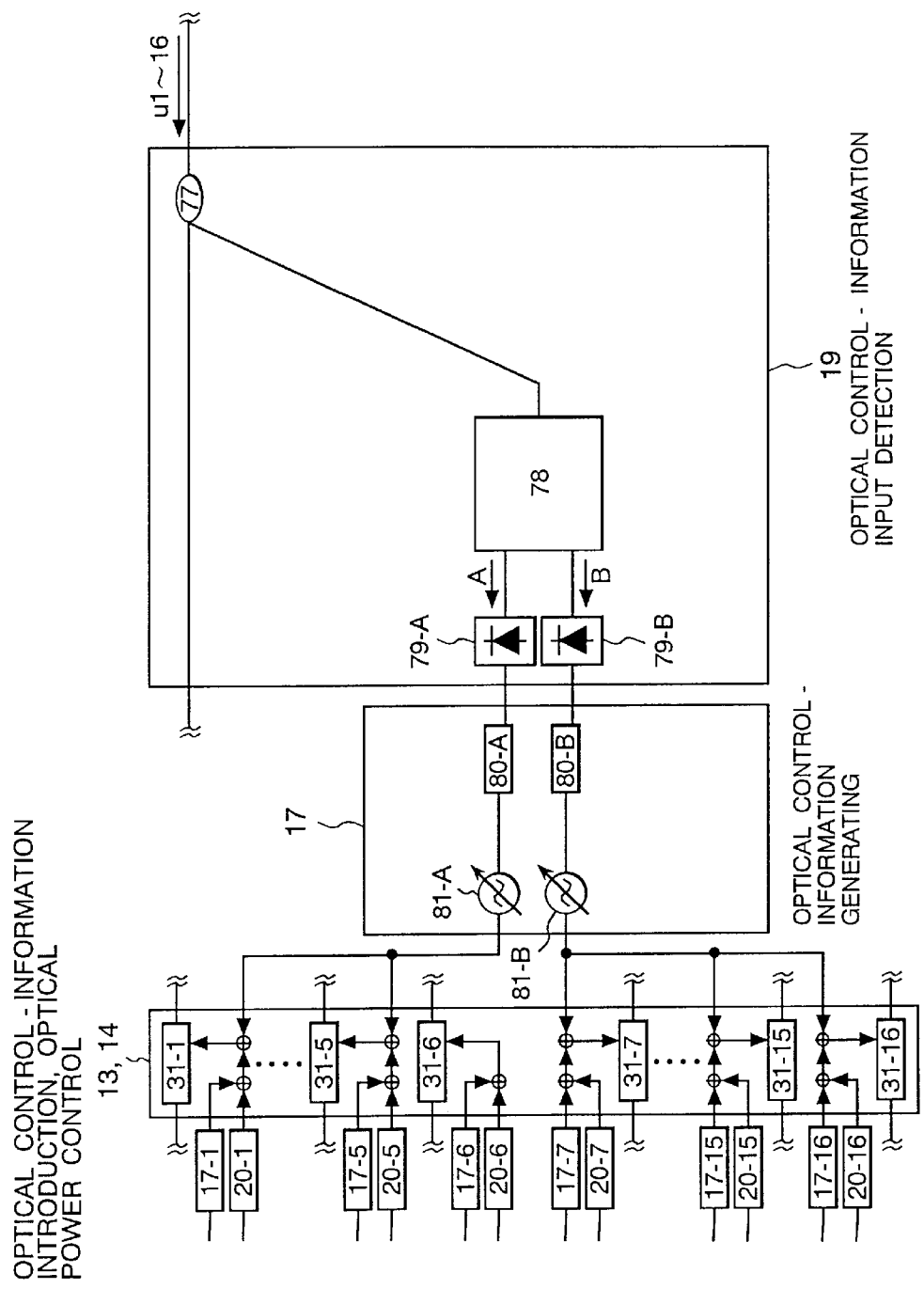
FIG. 31 is a structural block diagram showing in detail the optical control-information input detection unit in the end terminal unit.

A specific example of a configuration of an optical control-information input detection unit 19 in the end terminal unit 4 is shown in FIG. 31. After splitting (branching off) a portion of the optical signals u1 through u16 by means of the optical coupler 77, the optical control information group A' and the optical control information group B' are divided into the weighted optical signals u1 through u8 and u9 through u16. These separated optical control information group A' and optical control information group B' signals are detected by means of the optical detectors 79-A, 79-B and after detection of the frequency by the frequency detection circuits 80-A, 80-B, the optical control information group A1 is once again sent to the optical variable gain adjustors 31-1 through 31-5 corresponding to the optical signal group A, and the optical control information group B' is once again sent to the optical variable gain adjustors 31-7 through 31-16 corresponding to the optical signal group and guided out from the end terminal unit 4. In other words, the optical control-information generating unit 17 for taking in the optical signal group A, and the optical control information group B' of the end terminal unit 4, detects and reproduces the optical control information group A', and the optical control information group B' and once again the optical control information group A', and the optical control information group B1 are output.

These optical signals (per groups A' and B') are passed through the optical amplifier relay unit 3-2 and are input to the optical amplifier relay unit 3-2. Inside the optical amplifier relay unit 3-2, the optical control information group A' (optical signal group A), and the optical control information group B1 (optical signal group B) are taken into the optical control-information input detection unit 19, in a configuration where the optical power unit 14 adjusts the power to a specified value by means of the control unit 20.

In the above example, the optical signal group that weighted the optical control information group A', and the optical control information group B' is the optical signals u1 through u8 as well as u9 through u16 or the optical signal group A or the optical signal group B however a configuration may also be used that weights only a certain number within these groups. For instance, optical control information may be weighted for only the optical signals u1 through u5 and for u12 through u16. Implementing such a configuration allows expanding the wavelength intervals between groups and makes splitting the wavelength easy by means of the optical coupler 78.

Figure 32A:
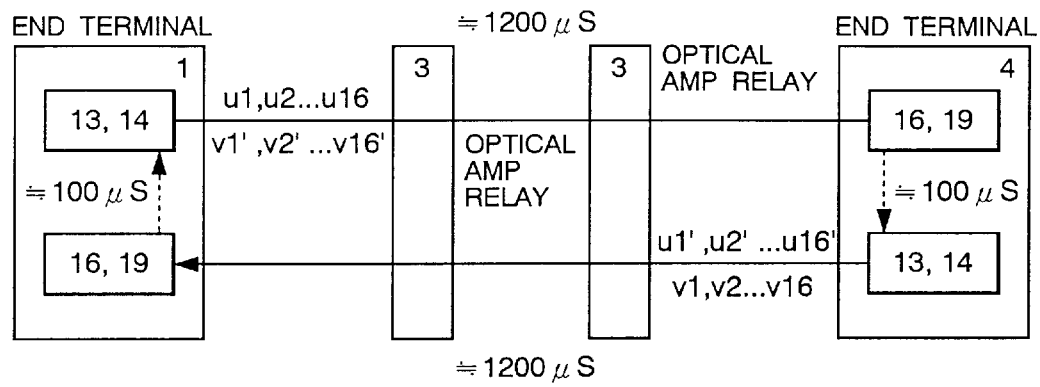
FIG. 32 is block diagrams showing the flow of optical signals and optical control information and the flow of optical signal groups and optical control information groups.
Figure 32B:
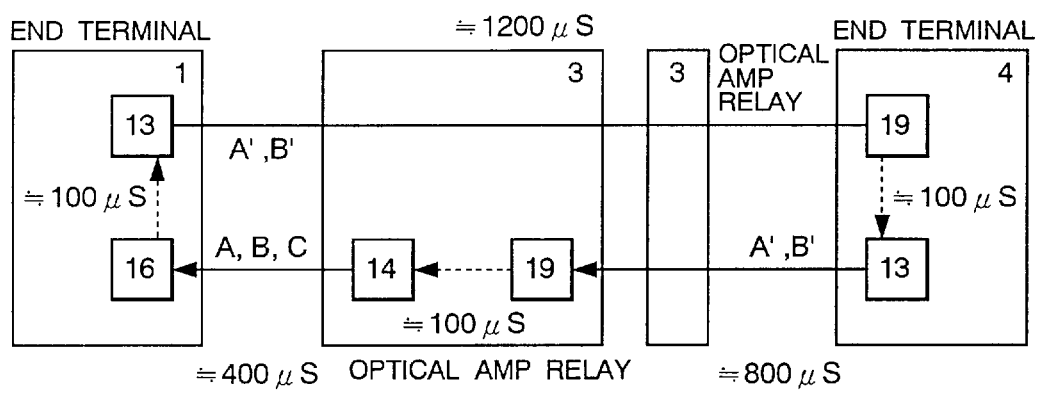
Figure 32C:
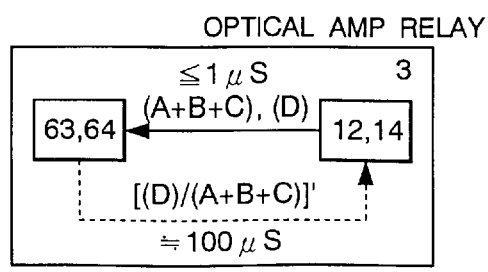

Block diagrams of the flow of the above mentioned optical signals, optical signal groups, optical control information and optical control information groups are shown in FIG. 32A, FIG. 32B and FIG. 32C.

In FIG. 32A, the optical signals v1 through v16 detected by the optical input detection unit 16 inside the end terminal unit 1 have a deviation in wavelength gain which is output as the optical control information v1 through v1 ' from the optical control-information introduction unit 13 approximately 100 μs after detection, and arrives at the optical control-information input detection unit 19 inside the end terminal unit 4 in a time of approximately 1200 μs. The optical power control unit 14 adjusts for a specified value in compliance with the optical control information v1' through v16' about 100 μs after arrival and outputs the optical signals v1 through v16. After a time of approximately 1200 μs, the optical signals v1 through v16 arrive at the end terminal unit 1.

Conversely, the wavelength gain deviation of the optical signals u1 through u16 detected by the optical input detection unit 16 inside the end terminal unit 4 is output as the optical control information u1' through u16' from the optical control-information introduction unit 13 after approximately 1200 μs have elapsed, and arrives at the optical control-information input detection unit 19 inside the end terminal unit 1 in a time of approximately 100 μs. The optical power control unit 14 adjusts for a specified value in compliance with the optical control information u1' through u16' about 100 μs after arrival and outputs the optical signals u1 through u16. After a time of approximately 1200 μs, the optical signals u1 through u16 that are sent, arrive at the end terminal unit 4.

Next, in the configuration in FIG. 32B, the wavelength gain deviation for the optical signals groups A, B, C detected by the optical input detection unit 16 inside the end terminal unit 1 is output as the optical control group information group A1' and the optical control group information group B' from the optical control-information introduction unit 13 after approximately 100 μs have elapsed, and arrive at the optical control-information input detection unit 19 inside the end terminal unit 4 in a time of approximately 1200 μs. Then, about 100 μs after arrival, in compliance with the optical control group information group A' and the optical control group information group B' an output is once again issued from the optical control-information introduction unit 13 as the optical control group information group A' and the optical control group information group B' and in a time of approximately 800 μs arrives at the optical control-information input detection unit 19 inside the optical amplifier relay unit 3-2. Approximately 100 μs after arrival, the optical power control unit 14 adjusts for a specified value in compliance with the optical control group information group A' and the optical control group information group B' and the now adjusted optical signal groups A, B, C are now output. These optical signal groups A, B, C which have been sent, arrive at the end terminal unit 1 in a time of approximately 400 μs.

Finally, in the configuration of FIG. 32C, the wavelength gain deviation for the optical signal group D and the optical signals groups (A+B+C) detected by the optical input detection units 63, 64 inside the optical amplifier relay unit 3-1 is sent after approximately 100 μs to the optical amplifier 12 or the optical power control unit 14, and the optical signals groups (A+B+C) or the optical signal group D adjusted to a specific value by the optical amplifier 12 or the optical power control unit 14 is then output. Within approximately 1 μs, the optical signals groups (A+B+C) or the optical signal group D arrive at the optical input detection units 63, 64.

The feedback group of FIG. 32C functions to eliminate uneven power distribution in the optical signal power output even if the optical signal power distribution input to the optical amplifier relay unit 3-1 from both directions is unequal.

Figure 33:
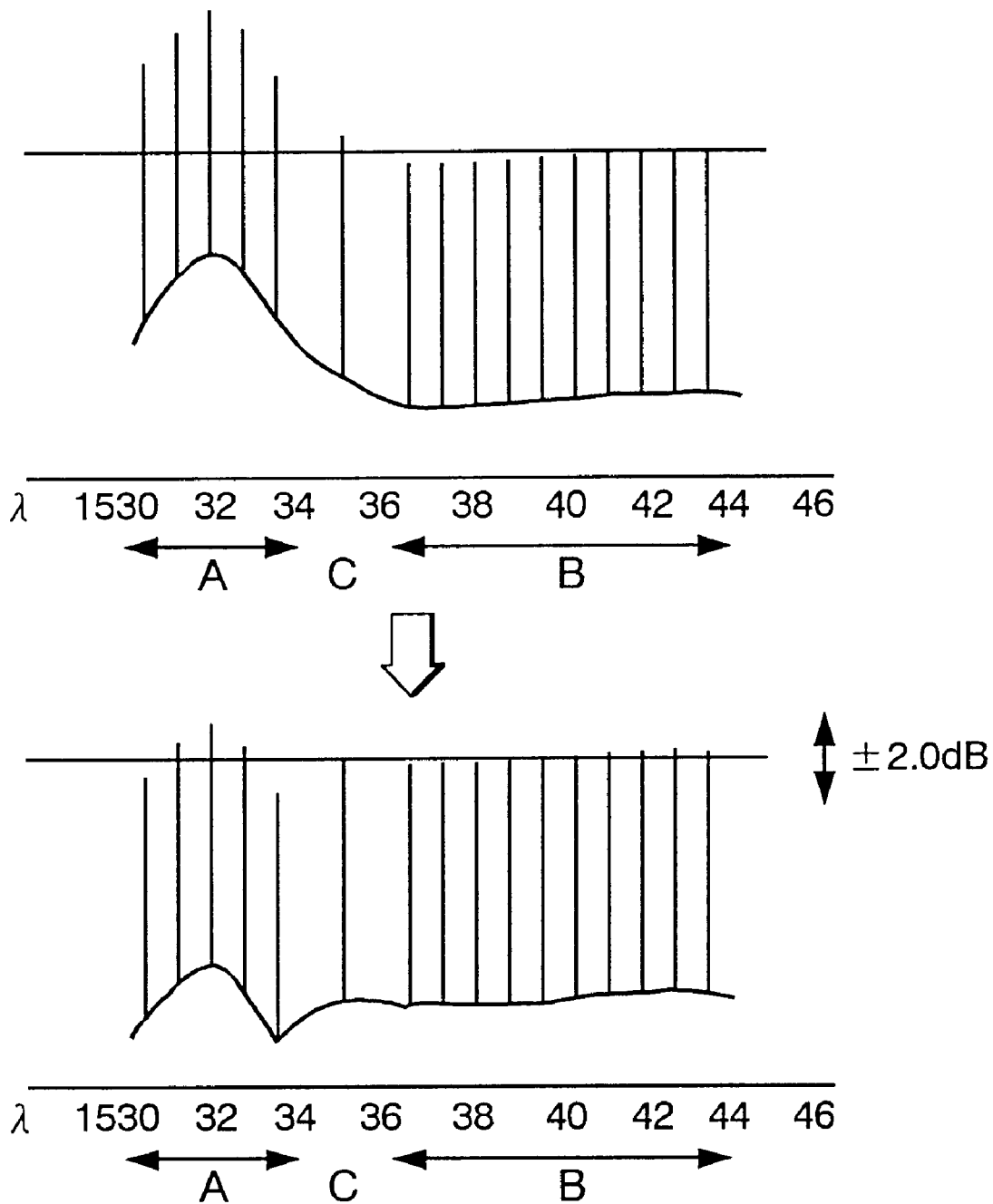
FIG. 33 is a drawing showing in detail a grouping method for controlling the wavelength gain deviation characteristic in erbium doped optical fibers.
Figure 34:
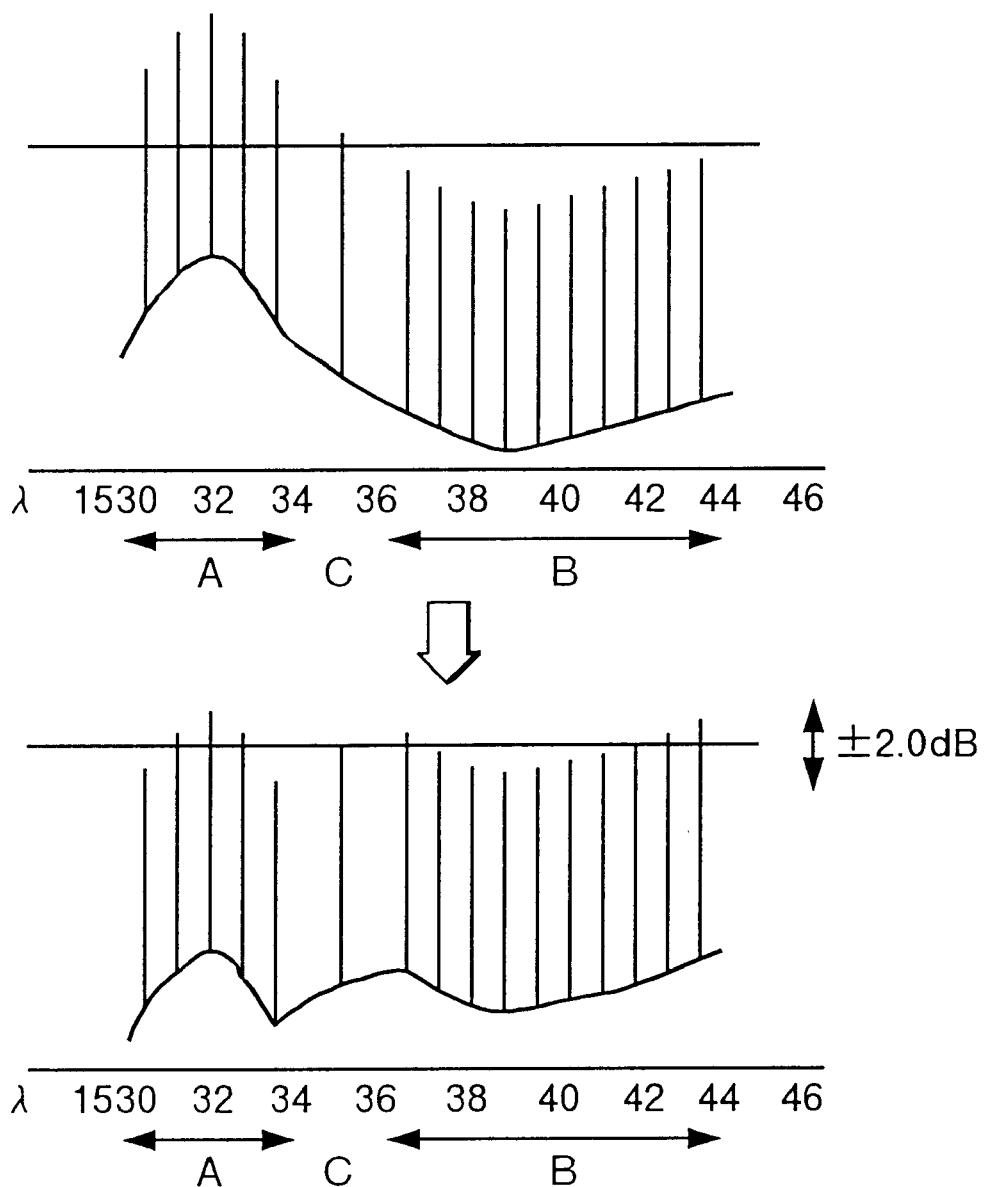
FIG. 34 is drawing showing in detail,a grouping method for controlling the wavelength gain deviation characteristic in erbium doped optical fibers.

The configuration in FIG. 32B is capable of suppressing the wavelength gain deviation for the optical signal groups A, B, C with ±1.5 dB. The wavelength gain deviation characteristics for erbium doped optical fibers are generally the two in FIG. 33 and FIG. 34 so preferably are shown separated into groups as shown in the figures.

Finally, all the respective optical signals of FIG. 32A are capable of being finely adjusted. The total wavelength gain deviation can be suppressed within ±0.2 dB. However, it is essential that the adjustment with the optical variable gain adjustor 31 in the end terminal units 1 and 4 be made so as to obtain a positive gain and the adjustment range should preferably be limited to approximately 5 dB. The reason being that adjusting for gradual attenuation using a transmit signal with a negative gain means a reduction in the signal-to-noise (S/N) ratio of the optical signal and decreases the transmission characteristic margin. Also, using an excessive adjustment range increases the respective optical signal power and increases the nonlinear effect of light in the dispersion compensator 60 and optical fiber which has the unwanted result of lowering the transmission characteristic margin.

Therefore, in this configuration, the feedback group of FIG. 32B drastically suppresses wavelength deviation and fine adjustments of wavelength deviation are the most preferred measure based on the feedback group of FIG. 32A. Due to this reason, using an optical amplifier or optical amplifier and gain equalizing filter to reduce the occurrence of wavelength gain deviations will make fine adjustments of the overall wavelength gain deviation easy to perform.

Generally, a narrow input dynamic range to the optical amplifier, in other words, narrowing the allowable range of input power is preferable in suppressing wavelength gain deviation. In the case of this configuration, the optical amplifier relay unit 3-2 is comprised merely of an optical amplifier and gain equalizing filter so that the input dynamic range to the optical amplifier relay unit 3-2 is preferably kept narrow. If a deviation in distance is present between the optical fibers, then the optical amplifier relay unit 3-2 is preferably comprised by the optical amplifier relay unit connected to the optical fiber having the shortest distance. The input optical power can be improved by making the connected optical fiber a shorter length which in turn allows the dynamic range to be narrowed. Further, by providing the types of feedback, control can be continued with normal feedback even if one or two of the feedback lines are cutoff so that the overall reliability of the optical transmission system is improved.

Preferably a digital signal processor (DSP) or a microcomputer is used in the frequency detection circuit and the comparator. Such devices are capable of digital processing of the signal and have good frequency detection characteristics.

A configuration of this type is therefore capable of suppressing a 32 channel multiplexed signal within ±0.2 dB in a simple configuration and deterioration of the signal-to-noise ratio (S/N) can also be suppressed by multiplexing so that a stable, high reliability bidirectional optical transmission system can be obtained.

This invention therefore, as described above, provides an optical transmission system capable of automatic control of the output power of the optical signal or gain on separate wavelengths, regardless of the configuration of the optical transmission system.

What is claimed is:

1. An optical transmission system including terminal devices and repeaters connected by optical fibers therebetween, at least one of the repeaters comprising:

an optical amplifier which amplifies an optical signal transmitted from an up stream optical fiber; and an optical power control unit which is connected to the optical amplifier and adjusts a gain tilt of an optical power of the amplified optical signals so as to decrease deviation between wavelengths by use of an optical control-information which is generated and transmitted from a down stream transmission apparatus.

2. An optical transmission system including terminal devices and repeaters connected by optical fibers therebetween, at least one of the repeaters comprising:

an optical amplifier control unit which adjusts a gain tilt of an optical power of an optical signal transmission from a transmission fiber so as to decrease deviation between wavelengths by use of an optical control-information which is generated and transmitted from a down stream transmission apparatus; and an optical amplifier which is connected to the optical power control unit and amplifies the adjusted optical signals.

3. A wavelength multiplexing optical transmission system including terminal devices and repeaters connected by optical fibers therebetween, at least one of the repeaters comprising:

an optical amplifier which amplifies an optical signal transmitted from a transmission fiber; and an optical power control unit which is connected to the optical amplifier and adjusts a gain tilt of an optical power of an optical signal transmitted from a transmission fiber so as to decrease deviation between wavelengths by use of an optical control-information which is generated and transmitted from a down stream transmission apparatus.

4. A wavelength multiplexing optical transmission system according to claim 3, wherein said optical power control unit comprises:

a wavelength demultiplexer which demultiplexes said optical signal to a first wavelength band optical signal and a second wavelength band optical signal;

a plurality of power control modules which adjust an optical power of said first wavelength band optical signal and said second wavelength band optical signal; and a wavelength multiplexer which multiplexes said first wavelength band optical signal and said second wavelength band optical signal.

5. A wavelength multiplexing optical transmission system including terminal devices and repeaters connected by optical fibers therebetween, at least one of the repeaters comprising:

an optical amplifier control unit which adjusts a gain tilt of an optical power of an optical signal transmitted from a transmission fiber so as to decrease deviation between wavelengths by use of an optical control-information which is generated and transmitted from a down stream transmission apparatus; and an optical amplifier which is connected to the optical power control unit and amplifies the adjusted optical signals.

6. A wavelength multiplexing optical transmission system according to claim 5, wherein said optical power control unit comprises:

a wavelength demultiplexer which demultiplexes said optical signal to a first wavelength band optical signal and a second wavelength band optical signal;

a plurality of power control modules which adjust an optical power of said first wavelength band optical signal and said second wavelength band optical signal; and a wavelength multiplexer which multiplexes said first wavelength band optical signal and said second wavelength band optical signal.

* * * * *